US010893421B2

(12) United States Patent
Maeda et al.

(10) Patent No.: US 10,893,421 B2
(45) Date of Patent: *Jan. 12, 2021

(54) COMMUNICATION SYSTEM, COMMUNICATION TERMINAL DEVICE AND PRIMARY CELL

(71) Applicant: Mitsubishi Electric Corporation, Chiyoda-ku (JP)

(72) Inventors: Miho Maeda, Tokyo (JP); Mitsuru Mochizuki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,185

(22) Filed: Aug. 6, 2019

(65) Prior Publication Data

US 2019/0364441 A1 Nov. 28, 2019

Related U.S. Application Data

(60) Continuation of application No. 15/173,058, filed on Jun. 3, 2016, now Pat. No. 10,575,191, which is a (Continued)

(30) Foreign Application Priority Data

Feb. 10, 2011 (JP) .................. 2011-027184

(51) Int. Cl.
*H04W 24/02* (2009.01)
*H04W 48/20* (2009.01)
(Continued)

(52) U.S. Cl.
CPC ............. *H04W 24/02* (2013.01); *H04L 5/001* (2013.01); *H04L 5/0098* (2013.01);
(Continued)

(58) Field of Classification Search
CPC ..... H04W 24/02; H04W 48/02; H04W 48/08; H04W 48/16; H04W 48/20; H04W 76/15; H04L 5/00; H04L 5/001; H04L 5/0098
See application file for complete search history.

(56) References Cited

U.S. PATENT DOCUMENTS 8,036,656 B2   10/2011   Jeong et al.
8,165,590 B2   4/2012    Gunnarsson et al.
(Continued)

FOREIGN PATENT DOCUMENTS

CN   101584134 A   11/2009
CN   101646235 A   2/2010
(Continued)

OTHER PUBLICATIONS

Japanese Office Action dated Aug. 27, 2019, in Patent Application No. 2018-122981, 6 pages (with unedited computer generated English translation).
(Continued)

*Primary Examiner* — Kyaw Z Soe
(74) *Attorney, Agent, or Firm* — Oblon, McClelland, Maier & Neustadt, L.L.P.

(57) ABSTRACT

The present invention has an object to provide a communication system capable of appropriately providing services while improving a data rate using carrier aggregation. In Step ST1408, of a cell1 and a cell2 of a base station A, RRC connection is established between the cell1 and a UE, and the cell1 becomes a primary cell (PCell). Then, in Step ST1418, the cell1 determines to configure the cell2 as a secondary cell (SCell) to be aggregated with the own cell. Then, the cell1 notifies the UE of the above in Step ST1419. Upon this notification, the operation of restricting access to
(Continued)

the cell2 from the UE is stopped by an MME, and thereafter, communication between the UE and the cell2 is started in Step ST1422.

4 Claims, 27 Drawing Sheets

Related U.S. Application Data division of application No. 14/704,381, filed on May 5, 2015, now Pat. No. 9,386,467, which is a division of application No. 13/984,734, filed as application No. PCT/JP2012/052663 on Feb. 7, 2012, now Pat. No. 9,066,329.

(51) Int. Cl.

| *H04W 48/16* | (2009.01) |
|---|---|
| *H04W 76/15* | (2018.01) |
| *H04L 5/00* | (2006.01) |
| *H04W 48/08* | (2009.01) |
| *H04W 48/02* | (2009.01) |
| *H04W 84/04* | (2009.01) |

(52) U.S. Cl.
CPC ........... *H04W 48/02* (2013.01); *H04W 48/08* (2013.01); *H04W 48/16* (2013.01); *H04W 48/20* (2013.01); *H04W 76/15* (2018.02); *H04W 84/045* (2013.01)

(56) References Cited

U.S. PATENT DOCUMENTS

| 8,284,700 | B2 | 10/2012 | Viorel et al. | |
|---|---|---|---|---|
| 8,340,669 | B2 | 12/2012 | Jeong et al. | |
| 8,554,213 | B2 | 10/2013 | Jeong et al. | |
| 8,774,810 | B2 | 7/2014 | Jeong et al. | |
| 8,781,472 | B2 | 7/2014 | Sander et al. | |
| 8,811,220 | B2 | 8/2014 | Viorel et al. | |
| 9,258,751 | B2 | 2/2016 | Sander et al. | |
| 9,350,501 | B2 | 5/2016 | Maeda et al. | |
| 2008/0227447 | A1* | 9/2008 | Jeong .................. | H04W 48/10 455/434 |
| 2009/0011795 | A1 | 1/2009 | Fukui et al. | |
| 2009/0047968 | A1 | 2/2009 | Gunnarsson et al. | |
| 2010/0029283 | A1 | 2/2010 | Iwamura | |
| 2010/0172267 | A1 | 7/2010 | Viorel et al. | |
| 2011/0105105 | A1* | 5/2011 | Sagfors .................. | H04L 5/001 455/422.1 |
| 2011/0170490 | A1 | 7/2011 | Bonneville et al. | |
| 2011/0223914 | A1 | 9/2011 | Hashimoto | |
| 2011/0269460 | A1 | 11/2011 | Dalsgaard | |
| 2011/0281584 | A1* | 11/2011 | Sander .............. | H04W 36/0061 455/436 |
| 2012/0028639 | A1 | 2/2012 | Jeong et al. | |
| 2012/0040705 | A1 | 2/2012 | Shindo | |
| 2012/0044910 | A1 | 2/2012 | Maeda et al. | |
| 2012/0094651 | A1 | 4/2012 | Chun et al. | |
| 2012/0115459 | A1 | 5/2012 | Deng et al. | |
| 2012/0142346 | A1 | 6/2012 | Nakata | |
| 2012/0295616 | A1 | 11/2012 | Jeong et al. | |
| 2013/0010628 | A1 | 1/2013 | Viorel et al. | |
| 2013/0183970 | A1 | 7/2013 | Chen | |
| 2014/0038610 | A1 | 2/2014 | Jeong et al. | |
| 2014/0162654 | A1 | 6/2014 | Sander et al. | |
| 2015/0208302 | A1 | 7/2015 | Uemura | |
| 2016/0165502 | A1 | 6/2016 | Sander et al. | |
| 2016/0255518 | A1 | 9/2016 | Maeda et al. | |

FOREIGN PATENT DOCUMENTS

| JP | 2010-161771 A | 7/2010 |
|---|---|---|
| JP | 2011-024144 A | 2/2011 |
| WO | WO 2009/022971 A1 | 2/2009 |
| WO | WO 2010/031796 A1 | 3/2010 |
| WO | WO 2010/085191 A1 | 7/2010 |
| WO | WO 2010/125769 A1 | 11/2010 |
| WO | WO 2010/125853 A1 | 11/2010 |
| WO | WO 2010/126257 A2 | 11/2010 |
| WO | WO 2010/140797 A2 | 12/2010 |
| WO | WO 2010/142150 A1 | 12/2010 |
| WO | WO 2010/151016 A2 | 12/2010 |

OTHER PUBLICATIONS

Office Action dated Sep. 4, 2019 in Indian Patent Application No. 6369/CHENP/2013.
Japanese Office Action dated Nov. 19, 2019 in Japanese Patent Application No. 2018-122981 (with English translation), 9 pages.
International Search Report dated Mar. 13, 2012, in PCT/JP2012/052663.
Written Opinion of the International Searching Authority dated Mar. 13, 2012, in PCT/JP2012/052663 filed Feb. 7, 2012 with English translation.
International Preliminary Report on Patentability dated Aug. 13, 2013; in PCT/JP2012/052663 filed Feb. 7, 2012.
"User throughput performance of different CA policies", NTT DOCOMO, Inc., 3GPP TSG-RAN WG2#71, Tdoc-R2-104731, Aug. 27, 2010, 8 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 10), 3GPP TS 36.300 V10.2.0, Technical Specification, (Dec. 2010) pp. 200.
3rd Generation Partnership Project; Technical Specification Group Radio Access Network; Evolved Universal Terrestrial Radio Access (E-UTRA); Radio Resource Control (RRC); Protocol Specification (Release 10), 3GPP TS 36.331 V10.0.0, Technical Specification, (Dec. 2010), 276 pages.
3rd Generation Partnership Project; Technical Specification Group Radio Access Network; Evolved Universal Terrestrial Radio Access (E-UTRA); User Equipment (UE) procedures in idle mode (Release 10) 3GPP TS 36.304 V10.0.0, Technical Specification, (Dec. 2010), 33 pages.
"LS on HNB/HeNB Open Access Mode", 3GPP SA WG1,3GPP TSG-SA1 #42, S1-083461, Oct. 13-17, 2008, 2 pages.
"LS on CSG cell identification", RAN2, 3GPP TSG-RAN WG 2 meeting #62, R2-082899, May 5-9, 2008, 2 pages.
3rd Generation Partnership Project; Technical Specification Group Radio Access Network; Evolved Universal Terrestrial Radio Access (E-UTRA); Further advancements for E-UTRA physical layer aspects (Release 9), 3 GPP TR 36.814 V9.0.0, Technical Report, (Mar. 2010), 105 pages.
3rd Generation Partnership Project; Technical Specification Group Radio Access Network; Feasibility study for Further Advancements for E-UTRA (LTE-Advanced) (Release 9), 3GPP TR 36.912 V9.3.0, Technical Report, (Jun. 2010), 202 pages.
3rd Generation Partnership Project; Technical Specification Group Radio Access Network; Evolved Universal Terrestrial Radio Access (E-UTRA); User Equipment (UE) radio transmission and reception (Release 10), 3GPP TS 36.101 V10.0.0, Technical Specification, (Oct. 2010), 188 pages.
3rd Generation Partnership Project; Technical Specification Group Services and System Aspects; Architecture aspects of Home NodeB and Home eNodeB (Release 9), 3GPP TR 23.830 V9.0.0, Technical Report , (Sep. 2009), 55 pages.
"Common information for Scell configuration", LG Electronics Inc., 3GPP TSG-RAN2 Meeting #70bis, R2-104041, Jun. 28-Jul. 2, 2010, 5 pages.
3rd Generation Partnership Project; Technical Specification Group Radio Access Network; Evolved Universal Terrestrial Radio Access Network (E-UTRAN); S1 Application Protocol (S1AP) (Release 9), 3GPP TS 36.413 V9.5.0, Technical Specification, (Dec. 2010), 241 pages.

(56) References Cited

OTHER PUBLICATIONS

"PCell Change using Reconfiguration Procedure", Alcatel-Lucent, Alcatel-Lucent Shanghai Bell, TSG-RAN WG2#71, R2-104788, Aug. 23-27, 2010, 6 pages.
Chinese Office Action dated Apr. 26, 2016, for Chinese Patent Application No. 201280008398.2. (English translation provided).
Qualcomm Europe, "Cubic Metric Issue with Carrier Aggression", 3GPP TSG-RAN WG1 #57bis, R1-092710, Jul. 2009, pp. 1-2.
Ericsson, ST-Ericsson "On technical aspects pm Heterogeneous Networks", 3G99 TSG-RAN WG1 #59bis, Jan. 2010, pp. 1-4.
Extended European Search Report dated Jul. 20, 2016 in Patent Application No. 12744419.8.
Office Action dated Dec. 13, 2016 in Japanese Patent Application No. 2016-026681 with partial English translation.
Ericsson, ST-Ericsson, "On prioritisation of scenarios for heterogeneous network operation", 3GPP TSG-RAN WG1#59, R1-094446, Nov. 9-13, 2009, 6 pages.
Fujitsu, "Femto eNB assisted eICIC for macro UE", 3GPP TSG-RAN WG1# 63b, R1-110515, Jan. 17-21, 2011, 4 pages.
NEC, "UE demodulation requirements for carrier aggregation", 3GPP TSG-RAN WG4 Ad-Hoc Meeting #2010-04, R4-103625, Oct. 11-15, 2010, 3 pages.
Office Action dated Feb. 13, 2018 in Japanese Patent Application No. 2017-052566 (with English translation).
3GPP TSG-RAN2 Meeting #70bis, "On the need of s-measure enhancement", LG Electronics Inc., 2010, R2-104028, pp. 1-4.
Office Action dated Feb. 12, 2019 in the corresponding Japanese Patent Application No. 2018-122981 with Unedited Computer-Generated English Translation 6 pages.
"Additional Measurement Reporting", 3GPP TSG RAN WG2 Meeting #70bis, Stockholm, Sweden, CATT, 7.1.1.5, R2-103527, Jun. 28-Jul. 2, 2010, 2 pages.
Office Action dated Jun. 4, 2019 in Japanese Patent Application No. 2018-122981, with English-language translation, 6 pages.
Kengo Yagyu, et al., "A Study on Control Overhead of Carrier Aggregation in LTE-Advanced", Institute of Electronics, Information and Communication Engineers, Aug. 31, 2010, with partial English translation, 6 pages.
Japanese Trial and Appeal Decision dated Nov. 4, 2020, in Japanese Application No. 2018-122981 (with computer Generated English Translation).
Japanese Office Action dated Nov. 17, 2020, in Japanese Application No. 2020-019342 (with computer Generated English Translation).

* cited by examiner

F I G. 1
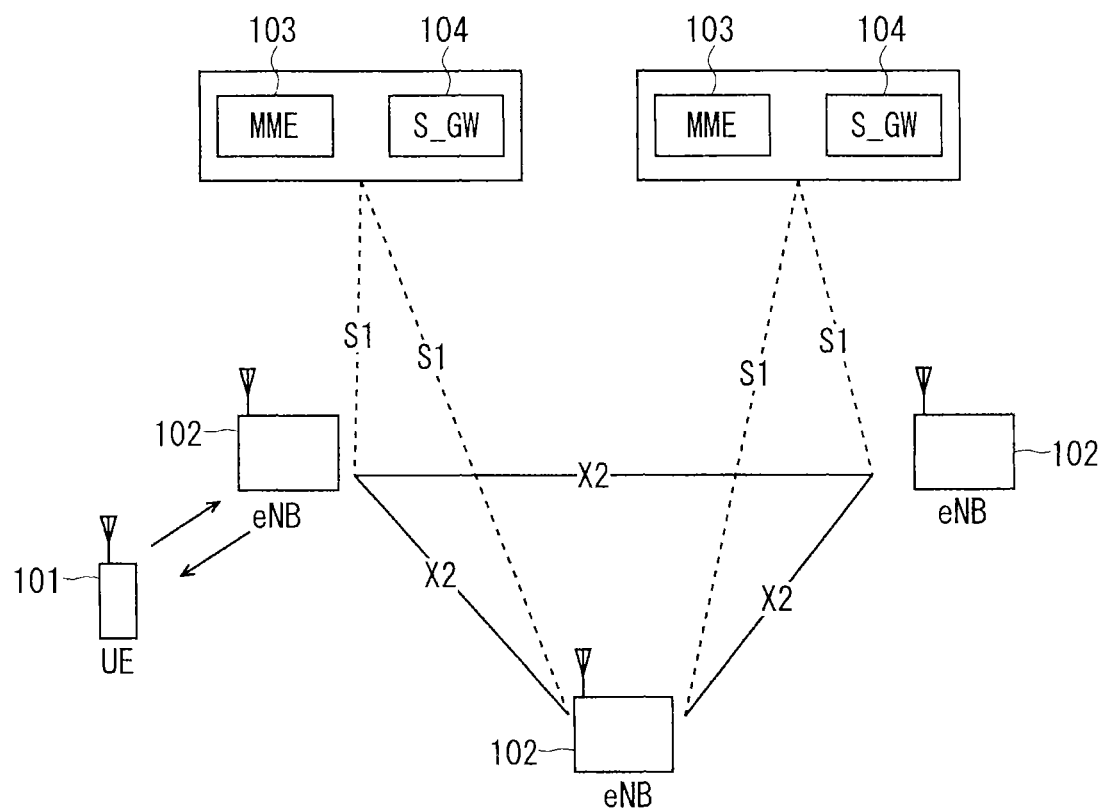

F I G . 2
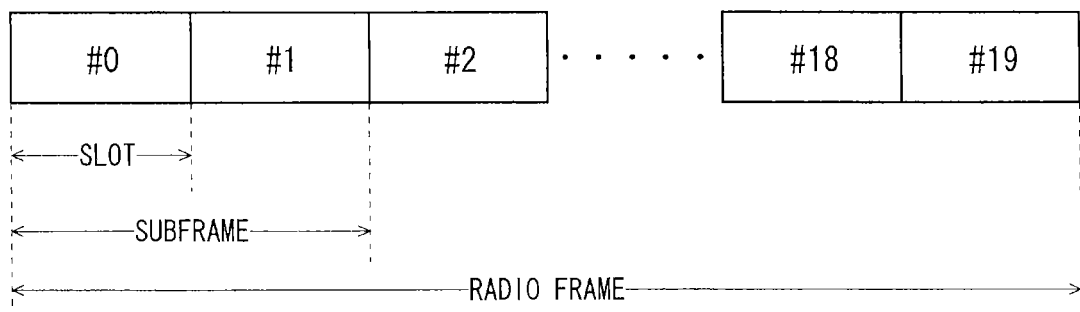

F I G. 4
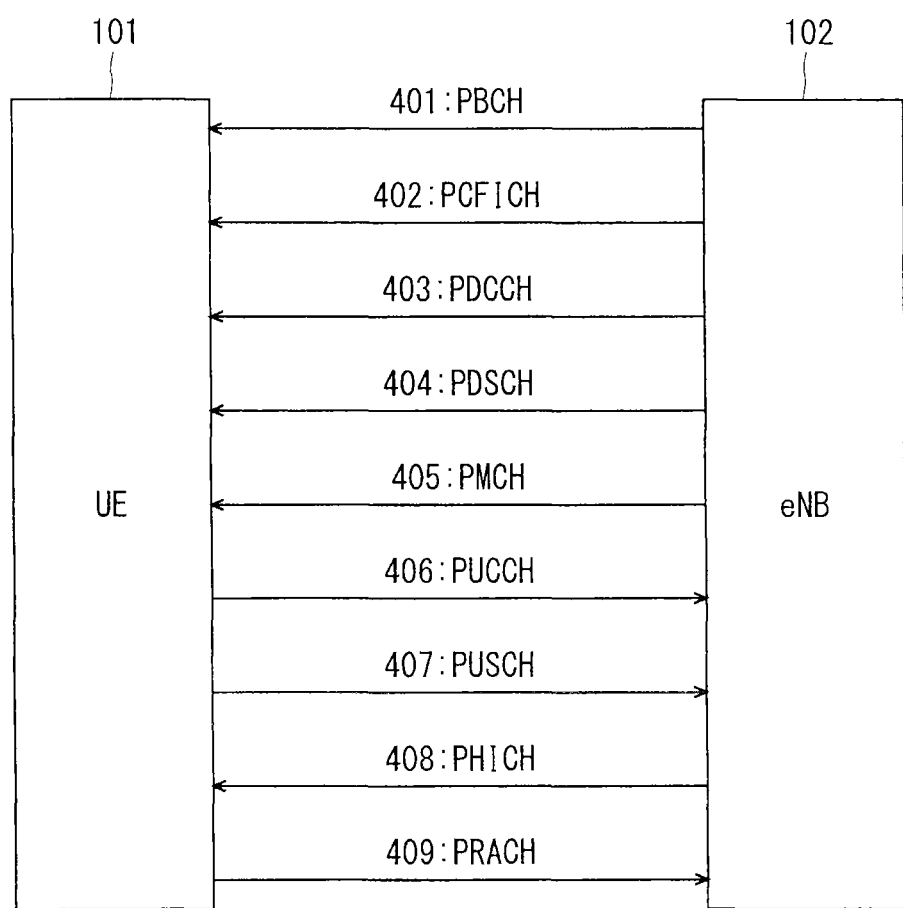

FIG. 5
(A)
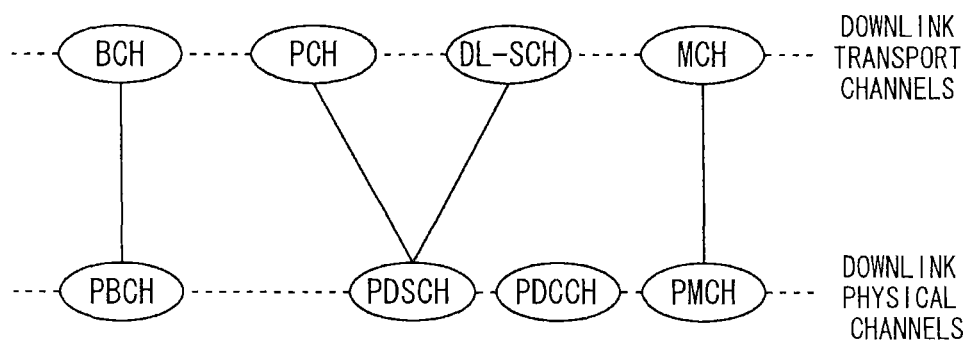
(B)
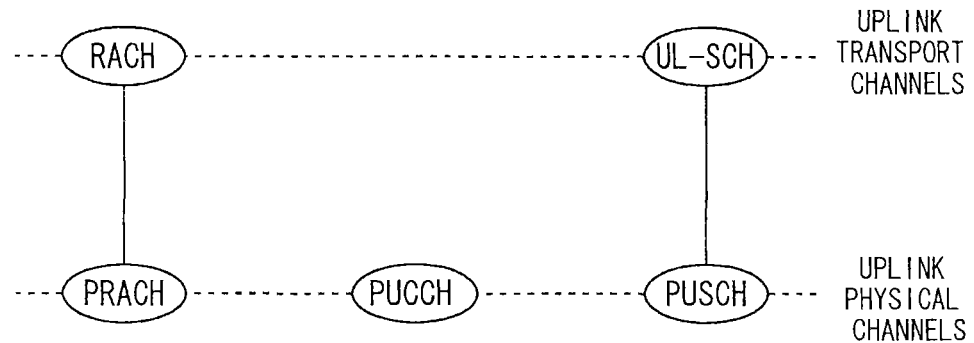

F I G. 6
(A)
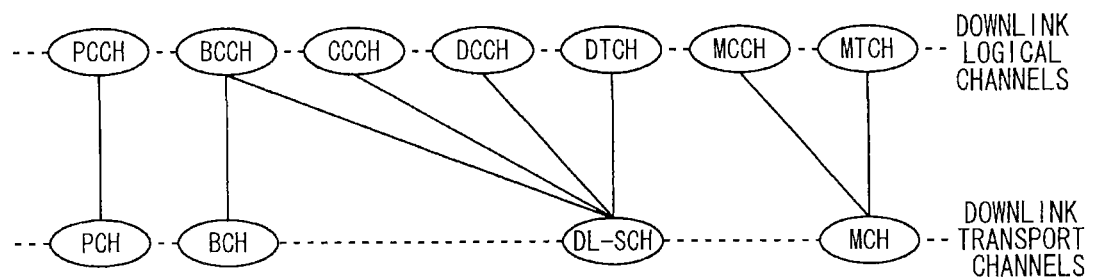
(B)
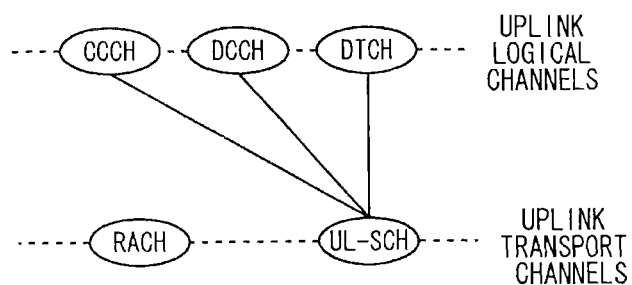

F I G. 1 0
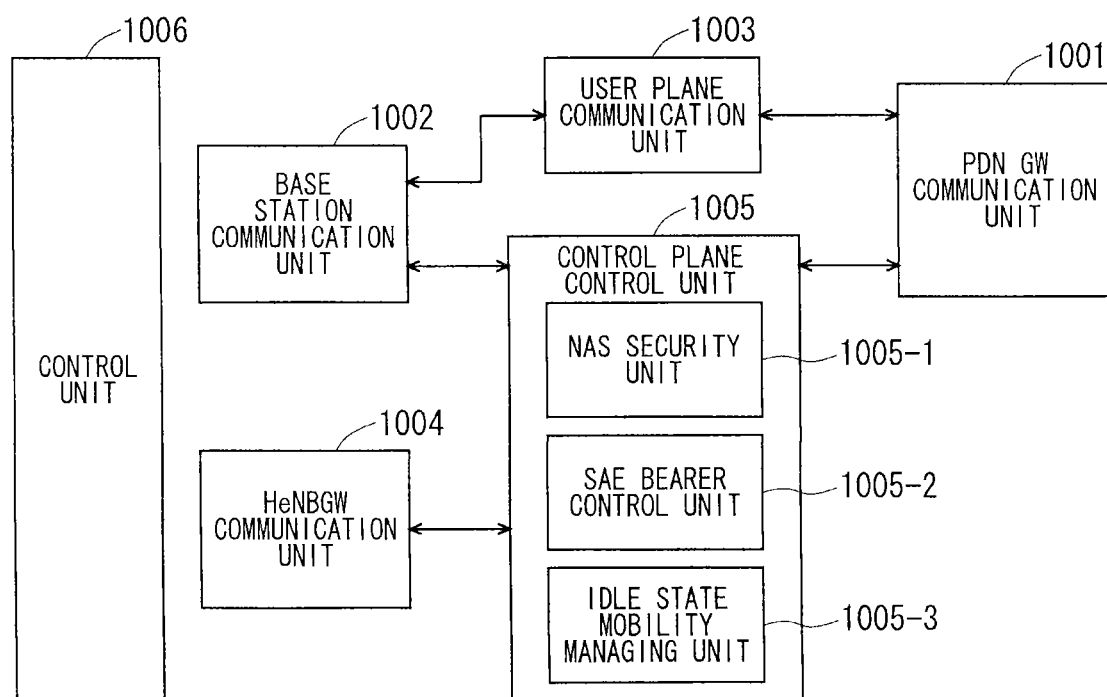

F I G . 1 1
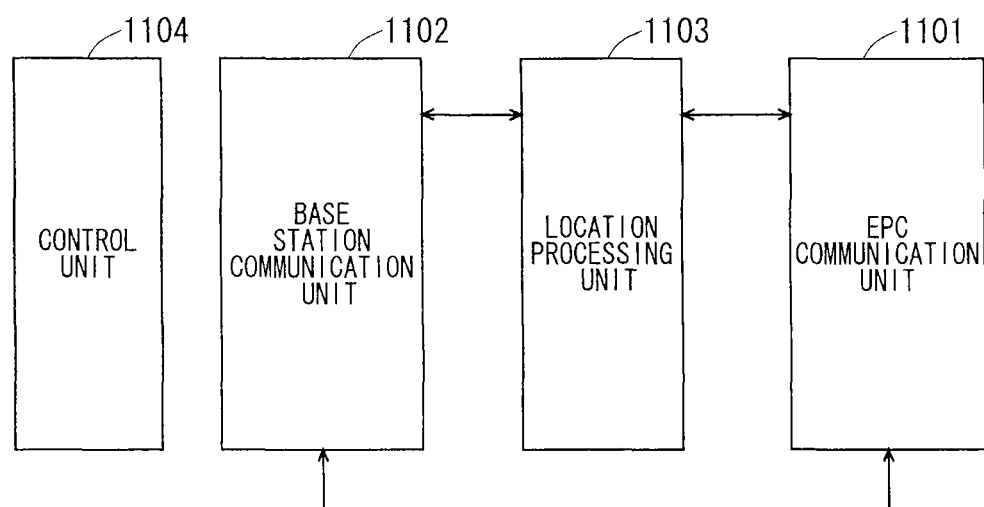

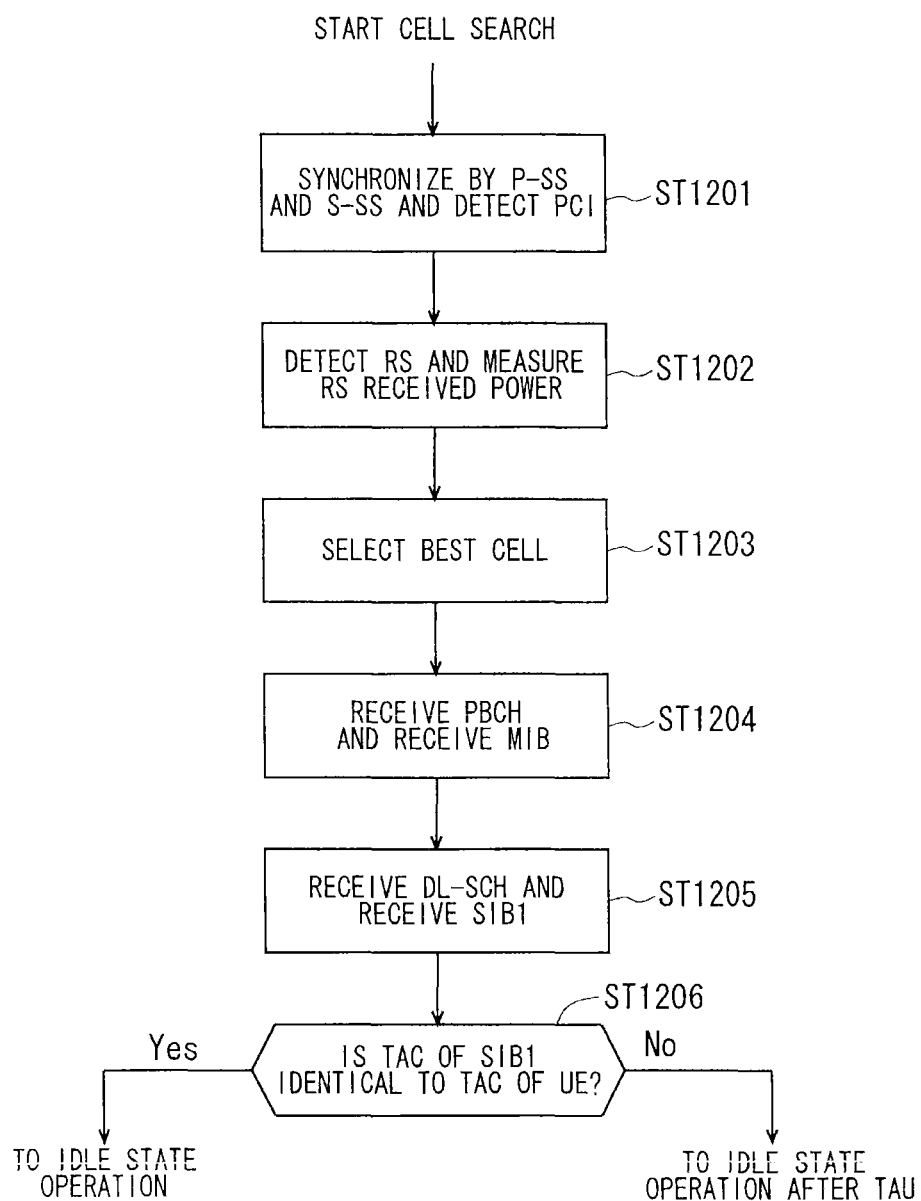
F I G . 1 2

F I G. 1 3
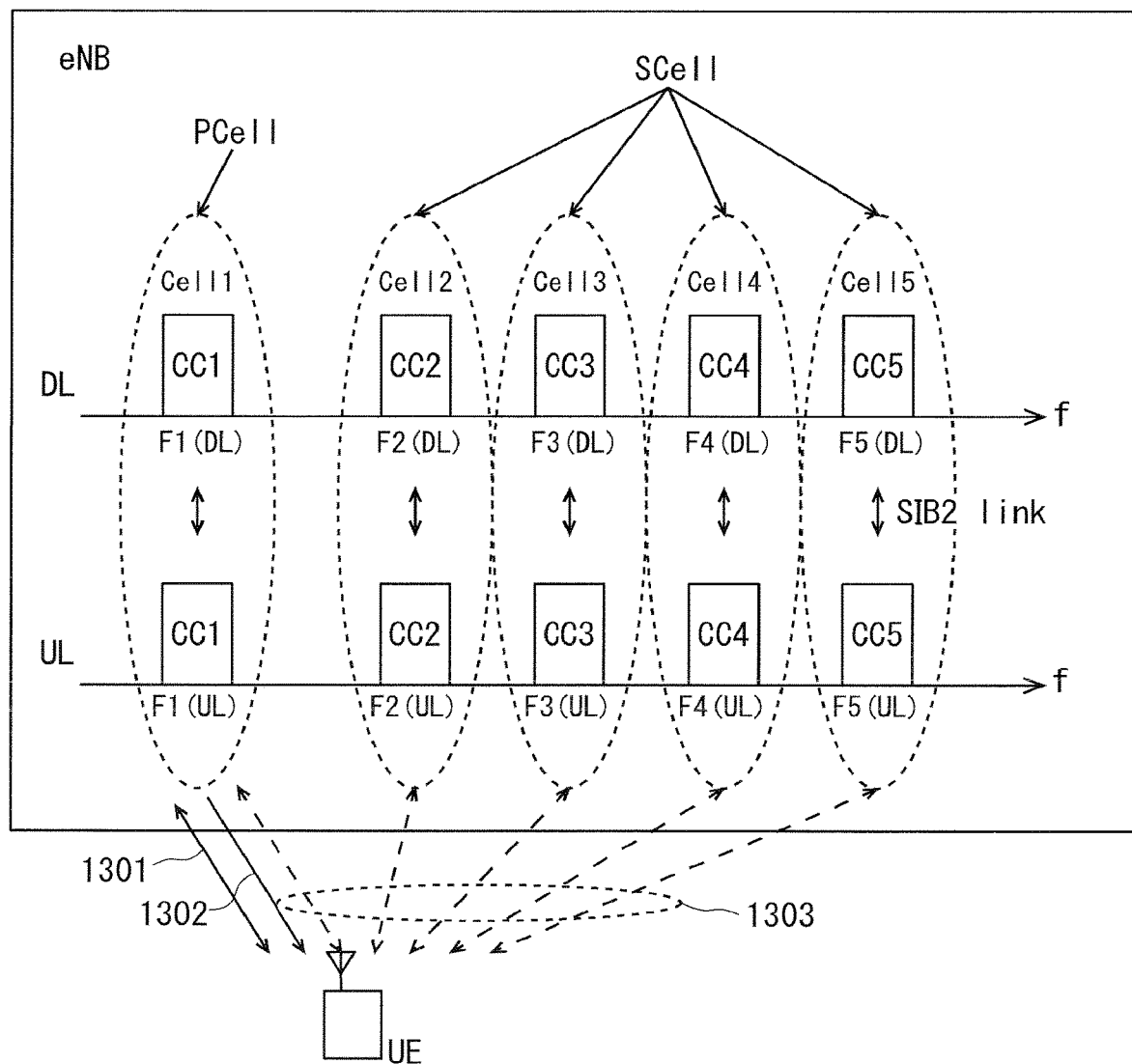

F I G. 1 5
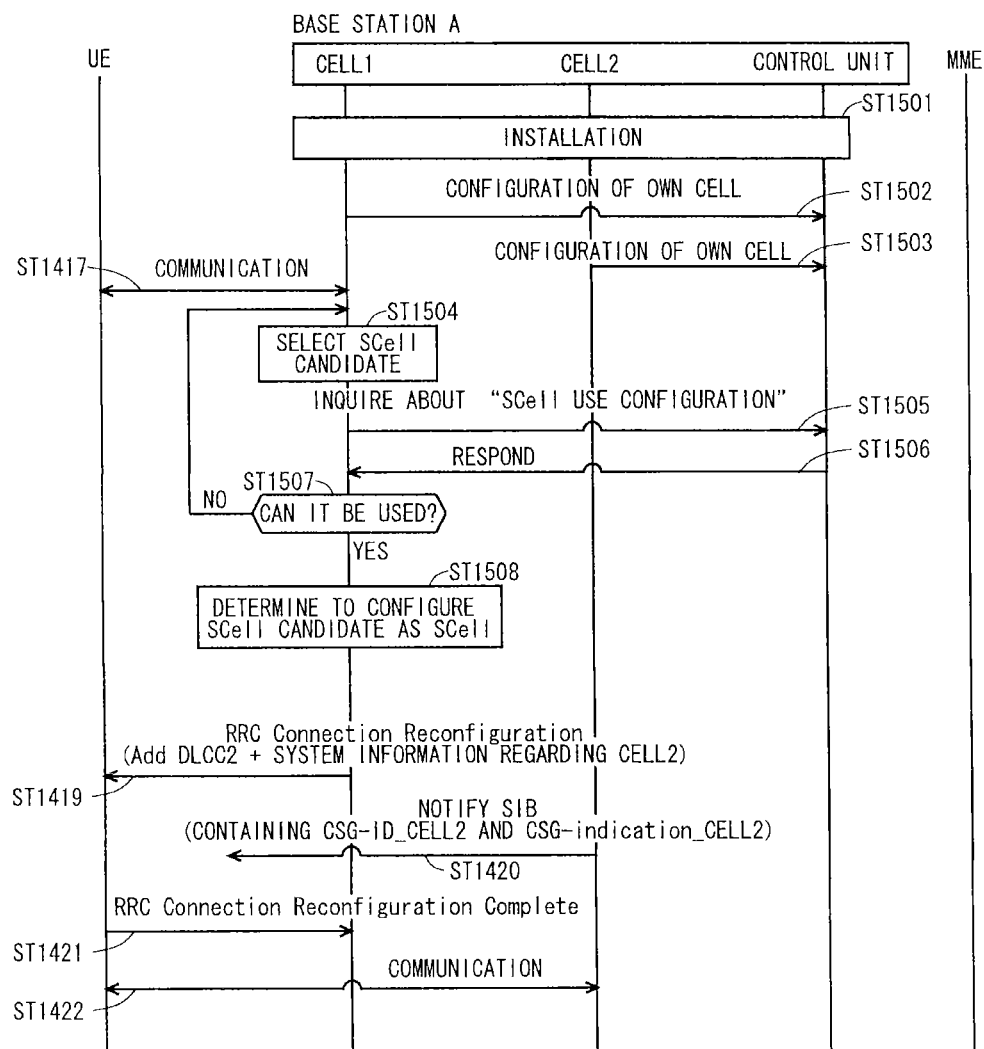

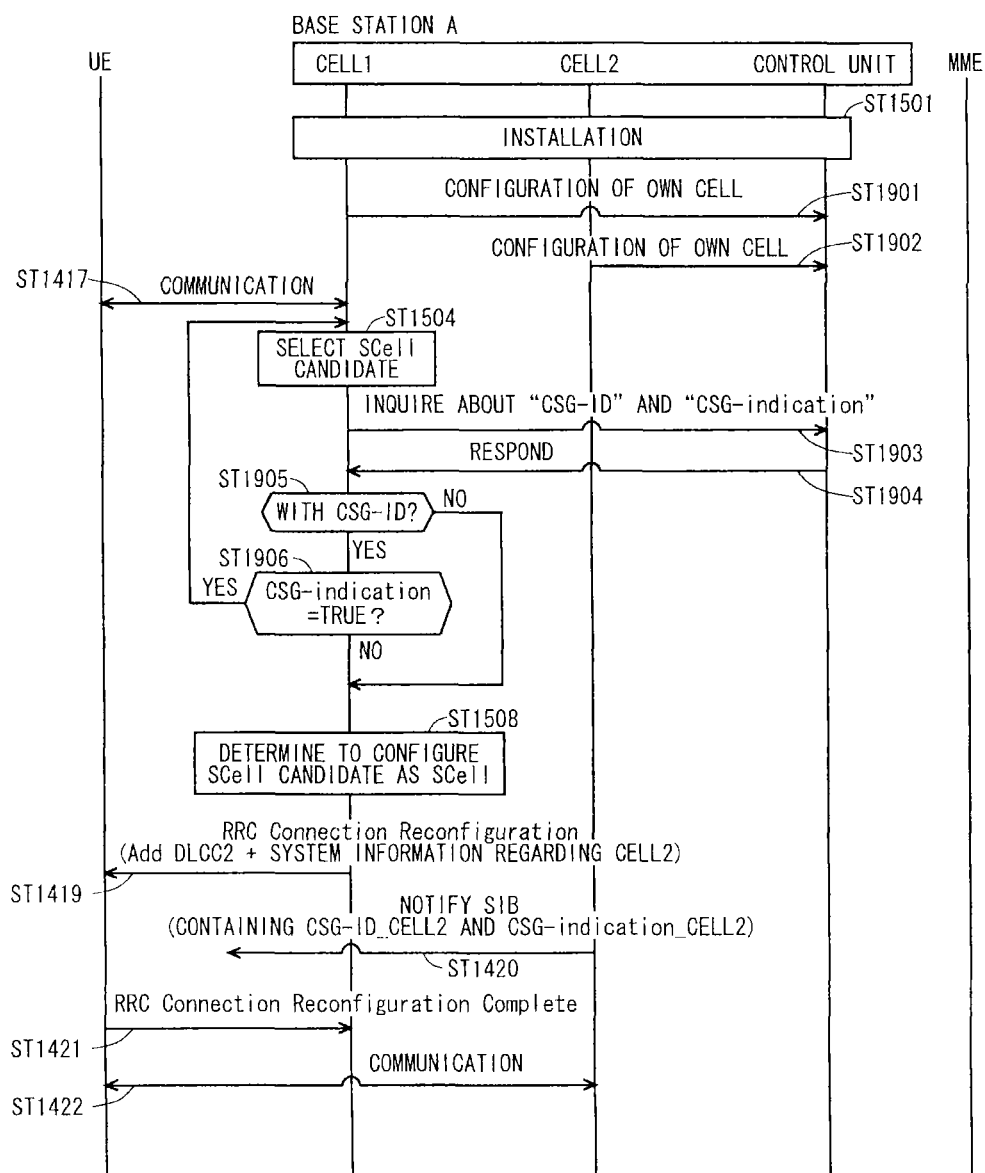

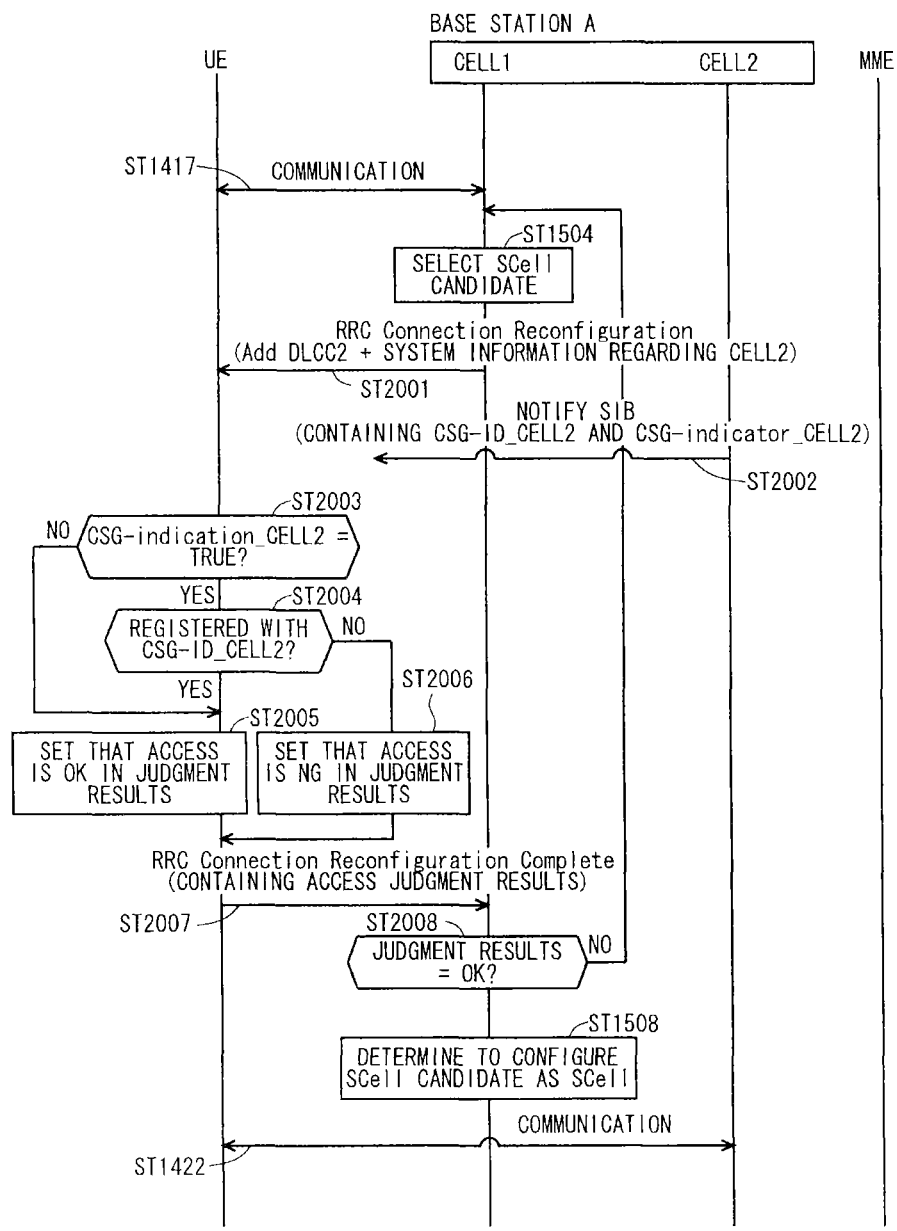
F I G . 2 0

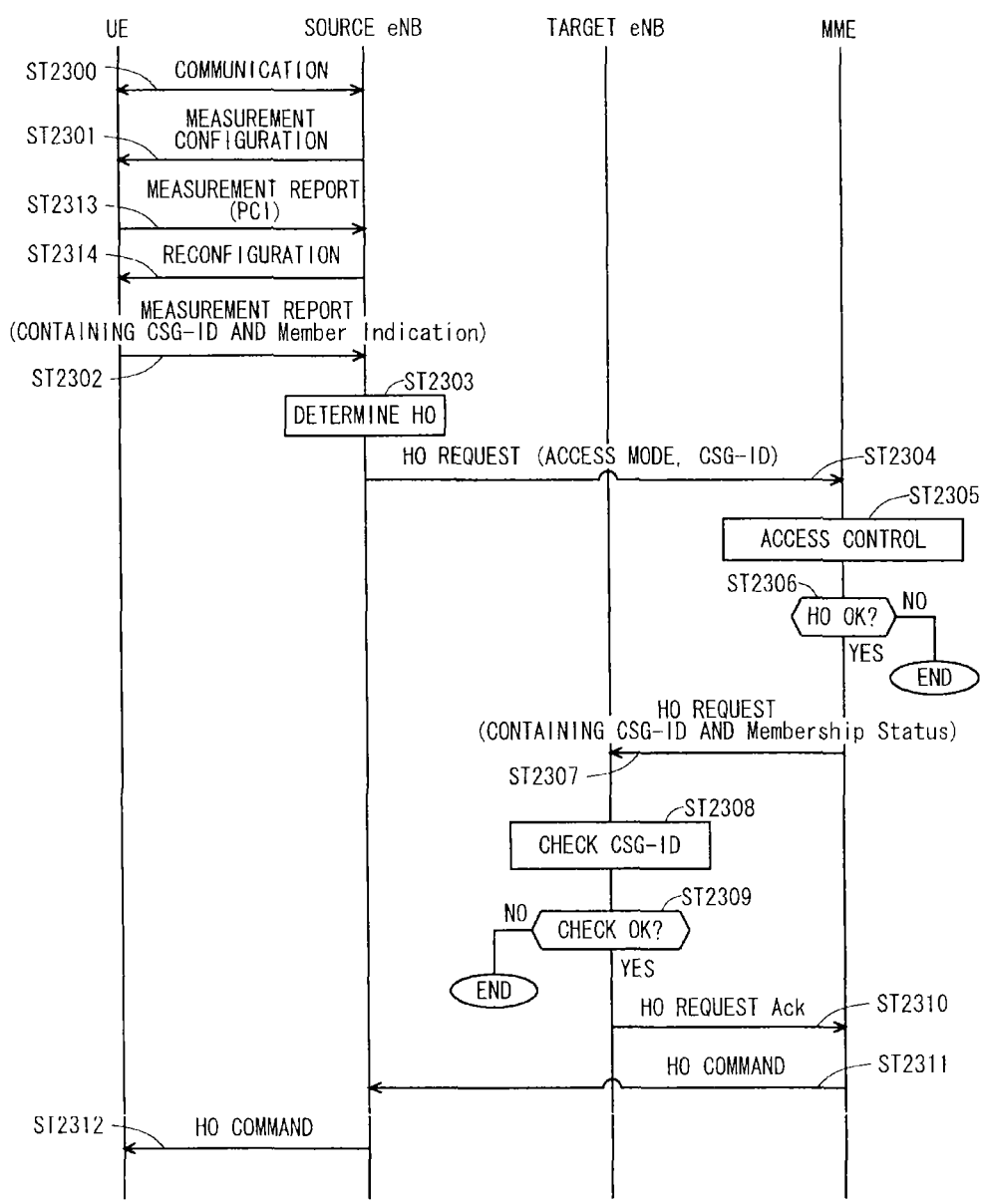
F I G . 2 3

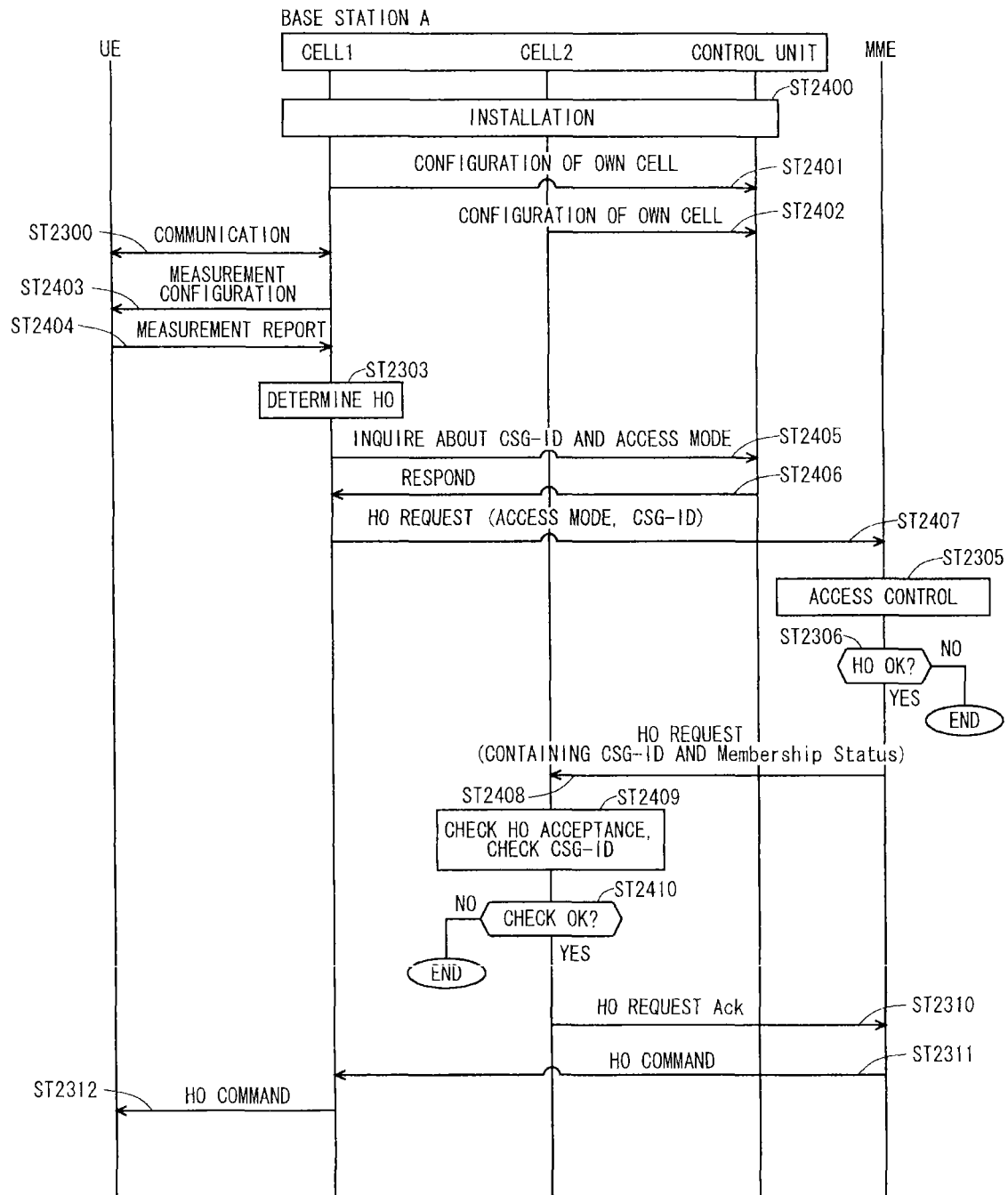

F I G. 2 6
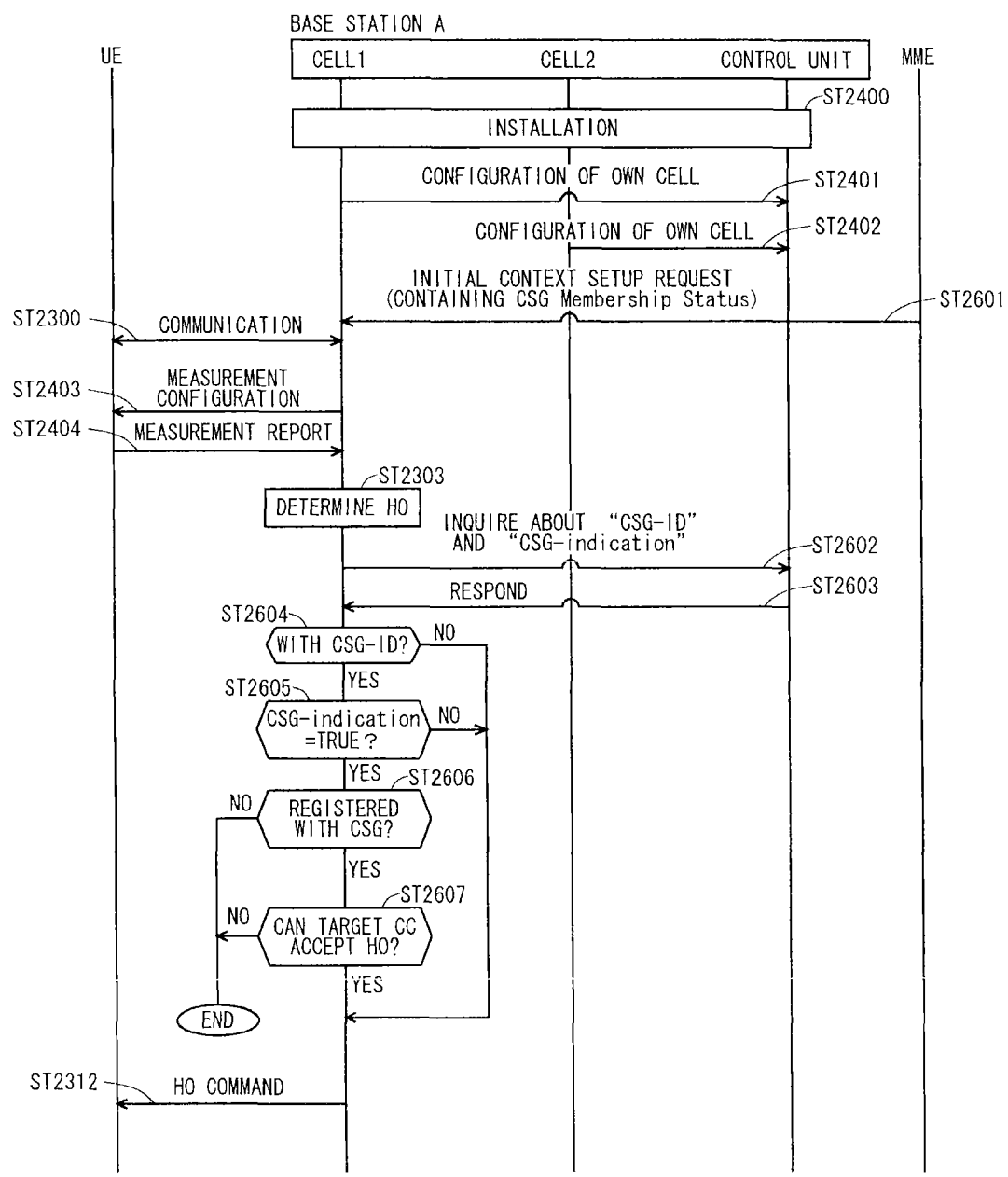

COMMUNICATION SYSTEM, COMMUNICATION TERMINAL DEVICE AND PRIMARY CELL

CROSS REFERENCE TO RELATED APPLICATIONS

This application is a continuation of U.S. application Ser. No. 15/173,058 filed Jun. 3, 2016, which is a divisional of U.S. application Ser. No. 14/704,381 filed May 5, 2015, which is a divisional of U.S. application Ser. No. 13/984,734 filed Aug. 9, 2013, which is a National Phase of PCT/JP2012/052663 filed Feb. 7, 2012, which claims priority to Japanese Application No. 2011-027184 filed Feb. 10, 2011. The entire contents of each of which are incorporated herein by reference.

TECHNICAL FIELD

The present invention relates to a communication system in which a base station device performs radio communication with a plurality of communication terminal devices.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, new communication systems referred to as long term evolution (LTE) regarding radio areas and system architecture evolution (SAE) regarding the overall system configuration including a core network (merely referred to as network as well) as communication systems independent of W-CDMA is studied in 3GPP. This communication system is also referred to as 3.9 generation (3.9 G) system.

In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz per base station. Further, differently from the W-CDMA, circuit switching is not provided but a packet communication system is only provided in the LTE.

The LTE is defined as a radio access network independent of the W-CDMA network because its communication system is configured by a new core network different from a core network (general packet radio service: GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC) or access gateway (aGW), respectively, in the LTE communication system.

Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 (Chapter 4) describes the current decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_Idle and RRC_CONNECTED. In RRC_IDLE, public land mobile network (PLMN) selection, system information (SI) broadcast, paging, cell re-selection, mobility and the like are performed. In RRC_CONNECTED, the user equipment has RRC connection, is capable of transmitting/receiving data to/from a network, and performs, for example, handover (HO) and measurement of a neighbour cell.

The current decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is a simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. With reference to FIG. 3, a radio frame including the MBSFN subframes is allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod} = \text{radioFrameAllocationOffset} \quad (1)$$

The MBSFN subframe is allocated with six bits. The leftmost bit defines the MBSFN allocation for the second subframe (#1). The second bit, third bit, fourth bit, fifth bit, and sixth-bit define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group cell (CSG cell) as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a downlink channel transmitted from the base station 102 to the user equipment 101. A BCH transport block is mapped to four subframes within a 40 ms interval. There is no explicit signaling indicating 40 ms timing. A physical control format indicator channel (PCFICH) 402 is transmitted from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a downlink channel transmitted from the base station 102 to the user equipment 101. The PDCCH notifies the resource allocation of DL-SCH (downlink shared channel that is one of the transport channels shown in FIG. 5 described below) and PCH (paging channel that is one of the transport channels shown in FIG. 5), and HARQ information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a downlink channel transmitted from the base station 102 to the user equipment 101. A DL-SCH (downlink shared channel) that is a transport channel and a PCH that is a transport channel are mapped to the PDSCH. A physical multicast channel (PMCH) 405 is a downlink channel transmitted from the base station 102 to the user equipment 101. A multicast channel (MCH) that is a transport channel is mapped to the PMCH.

A physical uplink control channel (PUCCH) 406 is an uplink channel transmitted from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the user equipment 101 to the base station 102. A UL-SCH (uplink shared channel that is one of the transport channels shown in FIG. 5) is mapped to the PUSCH.

A physical hybrid ARQ indicator channel (PHICH) 408 is a downlink channel transmitted from the base station 102 to the user equipment 101. The PHICH carries Ack/Nack that is a response to uplink transmission. A physical random access channel (PRACH) 409 is an uplink channel transmitted from the user equipment 101 to the base station 102. The PRACH carries a random access preamble.

A downlink reference signal is a known symbol in a mobile communication system. The physical layer measurement objects of a user equipment include reference symbol received power (RSRP).

The transport channels described in Non-Patent Document 1 (Chapter 5) are described with reference to FIG. 5. FIG. 5 is a diagram illustrating transport channels used in the LTE communication system. Part (A) of FIG. 5 shows mapping between a downlink transport channel and a downlink physical channel. Part (B) of FIG. 5 shows mapping between an uplink transport channel and an uplink physical channel.

Downlink transport channels are described. A broadcast channel (BCH) is broadcast to the entire coverage of a base station (cell). The BCH is mapped to the physical broadcast channel (PBCH).

Retransmission control according to a hybrid ARQ (HARD) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH).

A random access channel (RACH) shown in part (B) of FIG. 5 is limited to control information. The RACH involves a collision risk. The RACH is mapped to the physical random access channel (PRACH).

The HARQ is described. The HARQ is the technique for improving the communication quality of a channel by combination of automatic repeat request and error correction (forward error correction). The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel described in Non-Patent Document 1 (Chapter 6) is described with reference to FIG. 6. FIG. 6 is a diagram illustrating logical channels used in an LTE communication system. Part (A) of FIG. 6 shows mapping between a downlink logical channel and a downlink transport channel. Part (B) of FIG. 6 shows mapping between an uplink logical channel and an uplink transport channel.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting changes of the paging information and system information. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel for point-to-point transmission of the dedicated control information between a user equipment and a network. The DCCH is used when a user equipment is in RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of the user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

GCI represents a global cell identity. A closed subscriber group cell (CSG cell) is introduced in the LTE, long term evolution advanced (LTE-A) described below, and universal mobile telecommunication system (UMTS). The CSG is described below (see Chapter 3.1 of Non-Patent Document 3). The closed subscriber group cell (CSG cell) is a cell in which subscribers who are allowed to use can be specified by an operator (hereinafter, referred to as "cell for specific subscribers" in some cases).

The specified subscribers are allowed to access one or more cells of a public land mobile network (PLMN). One or more cells in which the specified subscribers are allowed access are referred to as "CSG cell(s)". Note that access is restricted in the PLMN. The CSG cell is part of the PLMN that broadcasts a specific CSG indication (CSG ID; CSG-ID) and broadcasts "TRUE" by CSG indication. The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling (calling of user equipments) even in an idle state. An area for tracking locations of user equipments is referred to as a tracking area.

A CSG whitelist is a list that may be stored in a universal subscriber identity module (USIM) in which all CSG IDs of the CSG cells to which the subscribers belong are recorded. Alternatively, the CSG whitelist is merely referred to as whitelist or is referred to as an allowed CSG list in some cases. The MME performs access control for the UEs accessing through CSG cells (see Chapter 4.3.1.2 of Non- Patent Document 9). Specific examples of the access by user equipments include attach, combined attach, detach, service request, and tracking area update procedure (see Chapter 4.3.1.2 of Non-Patent Document 9).

Service types of a user equipment in an idle state are described below (see Chapter 4.3 of Non-Patent Document 3). The service types of a user equipment in an idle state are classified into a limited service (also referred to as closed service), a normal service, and an operator service. The limited service includes emergency calls, an earthquake and tsunami warning system (ETWS), and a commercial mobile alert system (CMAS) on an acceptable cell described below. The normal service (also referred to as standard service) is the service for public use on a suitable cell described below. The operator service is the service for operators only on a reserved cell described below.

A "suitable cell" is described below. The "suitable cell" is a cell on which a UE may camp to obtain a normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):

(a) the cell is not a barred cell;

(b) the cell is part of a tracking area (TA), not part of the list of "forbidden LAs for roaming", where the cell needs to fulfill (1) above;

(c) the cell shall fulfill the cell selection criteria; and (d) for a cell specified as CSG cell by system information (SI), the CSG-ID is part of a "CSG whitelist" of the UE (contained in the CSG whitelist of the UE).

An "acceptable cell" is described below. This is the cell on which a UE may camp to obtain limited service. Such a cell shall fulfill all the requirements of (1) and (2) below.

(1) The cell is not a barred cell. (2) The cell fulfills the cell selection criteria.

"Barred cell" is shown in the system information. "Reserved cell" is shown in the system information.

"Camping on a cell" represents the state where a UE has completed the cell selection/reselection process and the UE has selected a cell for monitoring the system information and paging information. A cell on which the UE camps is referred to as "serving cell" in some cases.

Base stations referred to as Home-NodeB (Home-NB; HNB) and Home-eNodeB (Home-eNB; HeNB) are studied in 3GPP. HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode (also referred to as hybrid cell) is the cell that supports both the open access mode and the closed access mode.

According to 3GPP, there is a range of PCIs in all physical cell identities (PCIs), which is reserved by the network for use by CSG cells (see Chapter 10.5.1.1 of Non-Patent Document 1). Splitting the range of PCIs is referred to PCI-split as times. The PCI split information is broadcast in the system information from the base station to the user equipments being served thereby. Non-Patent Document 5 discloses the basic operation of a user equipment using PCI split. The user equipment that does not have the PCI split information needs to perform cell search using all PCIs (for example, using all 504 codes). On the other hand, the user equipment that has the PCI split information is capable of performing cell search using the PCI split information.

Further, specifications standard of long term evolution advanced (LTE-A) as Release 10 are pursued in 3GPP (see Non-Patent Document 6 and Non-Patent Document 7).

As to the LTE-A system, it is studied that a relay and a relay node (RN) are supported for achieving a high data rate, high cell-edge throughput, new coverage area, and the like. The relay node is wirelessly connected to the radio-access network via a donor cell (Donor eNB; DeNB). The network (NW)-to-relay node link shares the same frequency band with the network-to-UE link within the range of the donor cell. In this case, the UE in Release 8 can also be connected to the donor cell. The link between a donor cell and a relay node is referred to as a backhaul link, and the link between the relay node and the UE is referred to as an access link.

As the method of multiplexing a backhaul link in frequency division duplex (FDD), the transmission from DeNB to RN is carried out in a downlink (DL) frequency band, and the transmission from RN to DeNB is carried out in an uplink (UL) frequency band. As the method of dividing resources in relays, a link from DeNB to RN and a link from RN to UE are time-division multiplexed in one frequency band, and a link from RN to DeNB and a link from UE to RN are also time-division multiplexed in one frequency band. This enables to prevent, in a relay, the transmission of the relay from interfering with the reception of the own relay.

Not only a normal eNB (macro cell) but also so-called local nodes such as pico eNB (pico cell), HeNB/HNB/CSG cell, node for hotzone cells, relay node, and remote radio head (RRH) are studied in 3GPP.

The frequency bands (hereinafter, referred to as "operating bands" in some cases) usable for communication have been predetermined in the LTE. Non-Patent Document 8 describes the frequency bands. In the frequency division duplex (FDD) communication, a frequency band for downlink (hereinafter, referred to as "downlink frequency band" in some cases) and a frequency band for uplink (hereinafter, referred to as "uplink frequency band" in some cases) that is paired with the downlink frequency band have been predetermined, where the uplink frequency band differs from the downlink frequency band. This is because the downlink and uplink are necessarily required for conventional communication such as voice communication so that transmission and reception are enabled at the same time by splitting the frequencies between downlink and uplink in the FDD.

In the FDD, a default value of an interval (TX-RX frequency separation) between a carrier frequency of resources for use in downlink (hereinafter, referred to as "downlink carrier frequency" in some cases) and a carrier frequency of resources for use in uplink (hereinafter, referred to as "uplink carrier frequency" in some cases) is determined per frequency band. Non-Patent Document 8 describes a default value at the TX-RX frequency separation.

In the LTE, a cell broadcasts, to UEs being served thereby, the frequency band information and uplink carrier frequency deployed by the own cell as broadcast information. Specifically, the frequency band information is included in the SIB1. The uplink carrier frequency is included in the SIB2.

In a case where the uplink carrier frequency is not included in the SIB2, the uplink carrier frequency is derived from the downlink carrier frequency using the default value at the TX-RX frequency separation. The UE is capable of recognizing the downlink carrier frequency through cell selection or reselection and is capable of obtaining the frequency band and uplink carrier frequency deployed by the cell through reception of the broadcast information from the cell.

As disclosed in Non-Patent Document 1, the development of "long term evolution advanced (LTE-A)" specifications as Release 10 is purused in 3GPP.

Carrier aggregation (CA) is studied in the LTE-A system, in which two or more component carriers (CCs) are aggregated to support wider transmission bandwidths up to 100 MHz.

A Release 8 or 9-compliant UE, which supports LTE, is capable of transmission and reception on only the CC corresponding to one serving cell. On the other hand, it is conceivable that a Release 10-compliant UE may have the capability of transmission and reception, only reception, or only transmission on the CCs corresponding to a plurality of serving cells at the same time.

Each CC employs the configuration of Release 8 or 9, and the CA supports contiguous CCs, non-contiguous CCs, and CCs in different frequency bandwidths. The UE cannot configure the number of uplink CCs (UL CCs) equal to or more than the number of downlink CCs (DL CCs). The CCs configured by the same eNBs do not need to provide the same coverage. The CC is compatible with Release 8 or 9.

In CA, an independent HARQ entity is provided per serving cell in uplink as well as downlink. A transport block is generated per TTI for each serving cell. Each transport block and HARQ retransmission are mapped to a single serving cell.

In a case where CA is configured, a UE has single RRC connection with a NW. In RRC connection, one serving cell provides NAS mobility information and security input. This cell is referred to as primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

In each SCell, a UE is capable of using resources for uplink (UL) in addition to resources for downlink (DL). The number of DL SCCs is equal to or more than the number of UL SCCs. No SCell is used for only resources for UL. Each resource for UL belongs to only one serving cell for one UE. The number of serving cells depends on the UE capability.

The PCell is changed through only a HO procedure. The PCell is used for transmission of PUCCH. The PUCCH for HARQ of the DL-SCH without UL-SCH is transmitted through only UL PCC. Differently from Scells, the PCell is not de-activated.

Re-establishment is triggered when the PCell results in a radio link failure (RLF). Re-establishment is not triggered in a case of SCells. The NAS information is obtained from the PCell.

The SCells are reconfigured, added, or removed through RRC. Also in handover within the LTE, the SCells used together with a target PCell are added, removed, or reconfigured through RRC.

In a case of SCell addition, dedicated RRC signaling is used to transmit the all system information (SI) required for the SCell. That is, addition is performed in a connected mode, and the UE does not have to receive the SI broadcast from the SCell.

It is studied that a PCell notifies user equipments of SCell addition/modification using "RRC Connection Reconfiguration message" of dedicated RRC signaling (see Non-Patent Document 2). It is studied that SCell release is notified UEs by a PCell using "RRC Connection Reconfiguration message" of dedicated RRC signaling or is triggered by "RRC Connection re-establishment" (see Non-Patent Document 2). "RRC Connection Reconfiguration message" of dedicated RRC signaling contains "SCell To AddModList" and "SCell To ReleaseList".

In each cell, the SIB2 represents a carrier frequency of a resource for uplink.

Non-Patent Document 10 discloses that a CSG indication and a CSG-ID can be configured per cell (CC). However, Non-Patent Document 10 does not describe the method of notifying user equipments of the configuration content. Also, Non-Patent Document 10 does not pose a problem with the relationship between the CSG to which the SCell belongs and the CSG to which the user equipment belongs, and does not disclose a solution thereto.

Non-Patent Document 2 discloses that a PCell notifies user equipments of SCell addition/modification using "RRC Connection Reconfiguration message" of dedicated RRC signaling. "RRC Connection Reconfiguration message" of dedicated RRC signaling regarding SCell addition/modification does not contain a CSG indication and a CSG-ID. Non-Patent Document 2 does not describe the method of configuring the CSG indication and CSG-ID per SCell and the method of notifying user equipments of the configuration content. Also, Non-Patent Document 2 does not pose a problem with the relationship between the CSG to which the SCell belongs and the CSG to which the user equipment belongs, and does not disclose a solution thereto.

PRIOR ART DOCUMENTS

Non-Patent Documents

Non-Patent Document 1: 3GPP TS 36.300 V10.2.0
Non-Patent Document 2: 3GPP TS 36.331 V10.0.0
Non-Patent Document 3: 3GPP TS 36.304 V10.0.0 Chapter 3.1, Chapter 4.3, Chapter 5.2.4
Non-Patent Document 4: 3GPP S1-083461
Non-Patent Document 5: 3GPP R2-082899
Non-Patent Document 6: 3GPP TR 36.814 V9.0.0
Non-Patent Document 7: 3GPP TR 36.912 V9.3.0
Non-Patent Document 8: 3GPP TS 36.101 V10.0.0
Non-Patent Document 9: 3GPP TR 23.830 V9.0.0
Non-Patent Document 10: 3GPP R2-104041

SUMMARY OF INVENTION

Problem to be Solved by the Invention

It is considered that the LTE-A system supports frequency bandwidths larger than the frequency bandwidths of the LTE system, specifically, frequency bandwidths up to 100 MHz for improving a data rate. Carrier aggregation (CA) is studied as one method of supporting those. In carrier aggregation, a pair of serving cells is formed of the PCell and SCell for a user equipment.

As described above, Non-Patent Document 2 and Non-Patent Document 10 do not describe the method of notifying user equipments of the CSG indication and CSG-ID per SCell. In addition, Non-Patent Document 2 and Non-Patent Document 10 do not describe the relationship between the CSG to which the SCell belongs and the CSG to which the user equipment belongs. As a result, the operation of the communication system cannot be determined uniquely, leading to a problem that services cannot be provided appropriately.

An object of the present invention is to provide a communication system capable of appropriately providing services while improving a data rate using carrier aggregation.

Means to Solve the Problem

A communication system according to the present invention includes a communication terminal device, a base station device configured to perform radio communication with the communication terminal device, and a host node device that restricts the connection between the communication terminal device and the base station device. The base station device includes a plurality of cells formed of component carriers having different frequencies, which aggregates two or more cells of the plurality of cells and transmits and receives component carriers of the aggregated cells in parallel to perform radio communication with the communication terminal device. The plurality of cells include a cell for specific subscribers that specifies a connectable communication terminal device. Upon establishment of radio connection between any one of the plurality of cells and the communication terminal device, the connected cell configures any of other cells as an aggregable cell that is allowed to be aggregated with the own cell, the connected cell being a cell in which radio connection with the communication terminal device has been established. When the aggregable cell is configured by the connected cell, the host node device stops an operation of restricting access to the aggregable cell, and the communication terminal device stops an operation of restricting access to the aggregable cell based on cell information being information related to the cell for specific subscribers held in advance.

Further, a communication system according to the present invention includes a communication terminal device, a base station device configured to perform radio communication with the communication terminal device, and a host node device that restricts the connection between the communication terminal device and the base station device. The base station device provides a plurality of cells formed of component carriers having different frequencies, which aggregates two or more cells of the plurality of cells and transmits and receives component carriers of the aggregated cells in parallel to perform radio communication with the communication terminal device. The plurality of cells include a cell for specific subscribers that specifies a connectable communication terminal device. Upon establishment of radio connection between any one of the plurality of cells and the communication terminal device, the connected cell selects any one of the other cells as a candidate cell being a candidate for aggregable cell that is allowed to be aggregated with the own cell and notifies the communication terminal device of information related to the selected candidate cell, the connected cell being a cell in which radio connection with the communication terminal device has been established. Upon notification of the information related to the candidate cell from the connected cell, the communication terminal device judges whether or not access to the candidate cell is allowed based on cell information related to the cell for specific subscribers held in advance and notifies the connected cell of the judgment results. When judging that access to the candidate cell is allowed based on the judgment results notified from the communication terminal device, the connected cell configures the candidate cell as the aggregable cell. When the aggregable cell is configured by the connected cell, the host node device stops an operation of restricting access to the aggregable cell.

Effects of the Invention

According to the communication system of the present invention, the operation as a communication system can be stabilized while improving a data rate using carrier aggregation, which enables to appropriately provide services.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 2 is a diagram illustrating the configuration of a radio frame used in the LTE communication system.

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 10 is a block diagram showing the configuration of an MME (MME unit 73 of FIG. 7) according to the present invention.

FIG. 11 is a block diagram showing the configuration of a HeNBGW 74 shown in FIG. 7 that is a HeNBGW according to the present invention.

FIG. 12 is a flowchart showing an outline from a cell search to an idle state operation performed by a user equipment (UE) in the LTE communication system.

FIG. 13 is a diagram showing the conception of CA.

FIG. 15 is a diagram showing an example of a sequence of a communication system in a first modification of the second embodiment.

FIG. 19 is a diagram showing another example of the sequence of the communication system in the fourth embodiment.

FIG. 20 is a diagram showing an example of a sequence of a communication system in a fifth embodiment.

FIG. 23 is a diagram showing a sequence of a communication system regarding a handover method from an eNB or HeNB to a CSG cell or hybrid cell, which is disclosed in Non-Patent Document 1.

FIG. 24 is a diagram showing an example of a sequence of a communication system in an eighth embodiment.

FIG. 26 is a diagram showing an example of a sequence of a communication system in a second modification of the eighth embodiment.

EMBODIMENTS FOR CARRYING OUT THE INVENTION

First Embodiment

Figure 3:
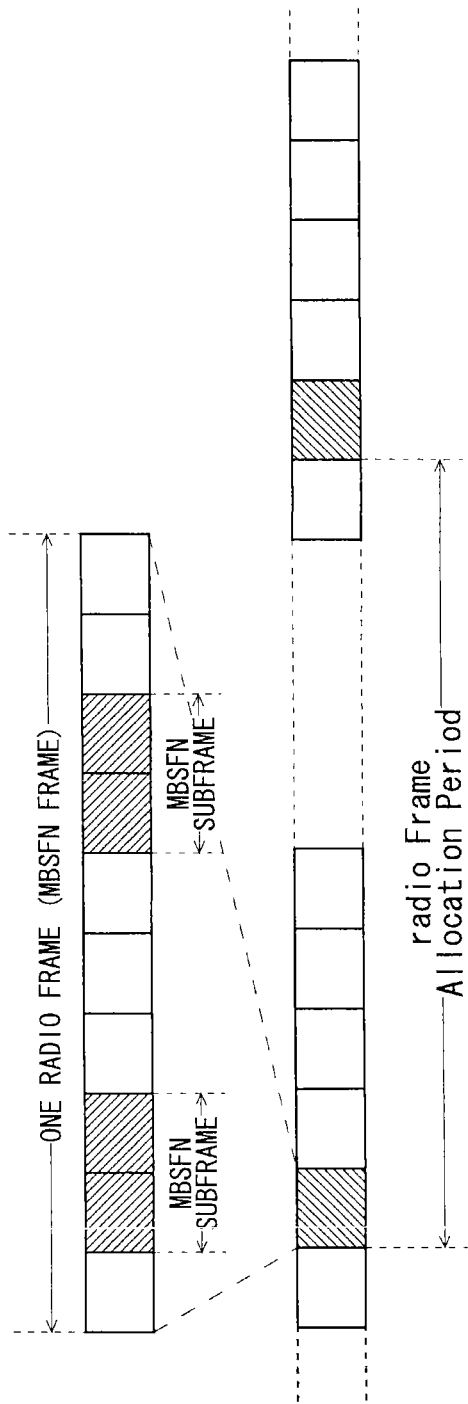
FIG. 3 is a diagram illustrating the configuration of an MBSFN frame.
Figure 7:
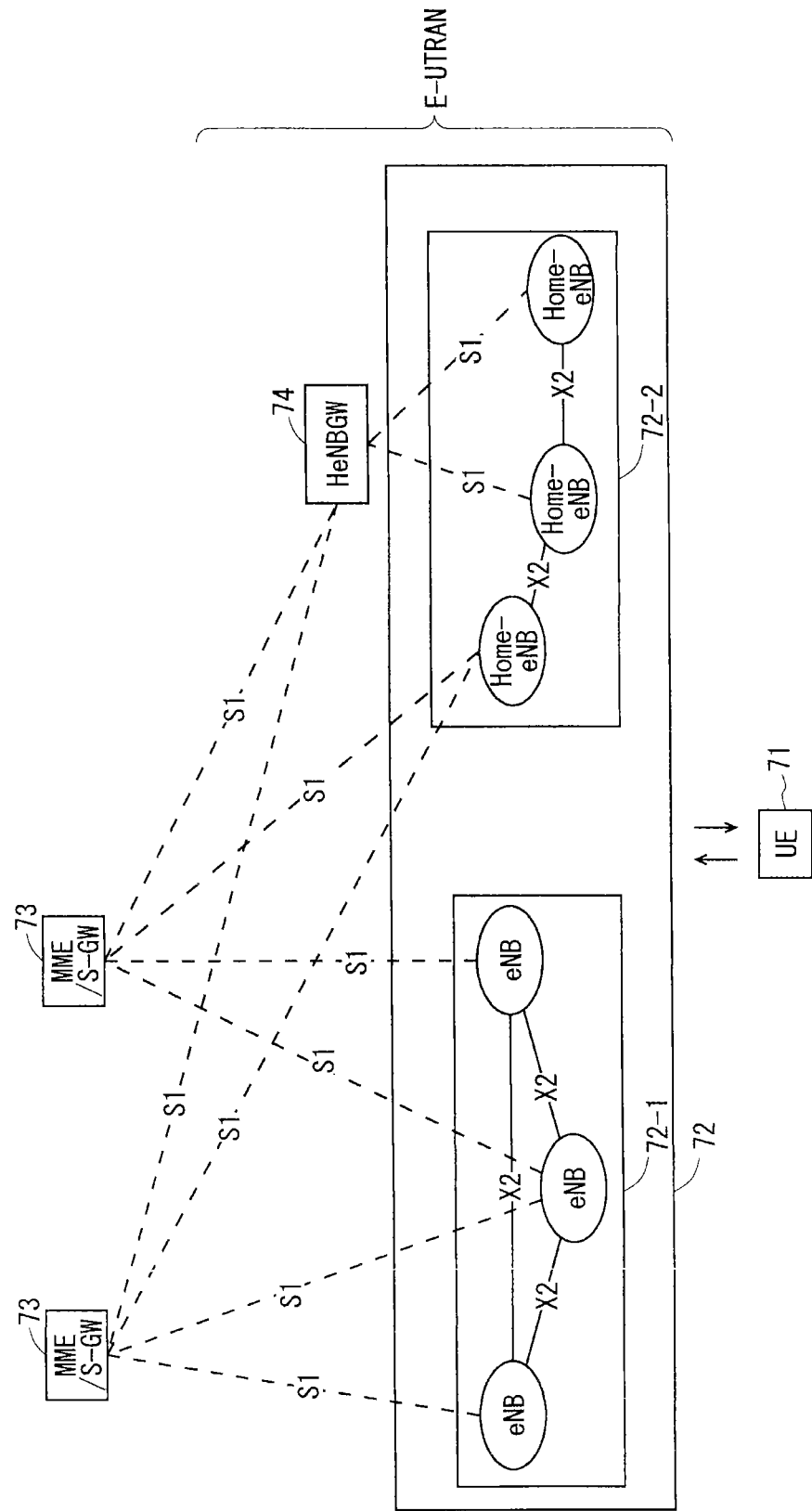
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. Currently, an overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) is studied in 3GPP and, as to E-UTRAN, the configuration as shown in FIG. 7 is proposed (see Chapter 4.6.1 of Non-Patent Document 1).

FIG. 7 is described. A user terminal device (hereinafter, referred to as "user equipment" or "UE") 71 is capable of performing radio communication with a base station device (hereinafter, referred to as "base station") 72 and transmits/receives signals through radio communication. The user terminal device is equivalent to a communication terminal device. The base stations 72 are classified into an eNB 72-1 that is a macro cell and a Home-eNB 72-2 that is a local node. The eNB 72-1 is equivalent to a large-scale base station device and has a relatively large-scale coverage as the coverage in a range in which communication is allowed with the user equipment UE 71. The Home-eNB 72-2 is equivalent to a small-scale base station device and has a relatively small-scale coverage as the coverage.

The eNB 72-1 is connected to an MME/S-GW unit (hereinafter, referred to as an "MME unit" in some cases) 73 including an MME, S-GW or MME and S-GW through an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of an S1 interface, and the control information is communicated between the Home-eNB 72-2 and the MME unit 73. A plurality of Home-eNBs 72-2 are connected to one MME unit 73. Also, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface. The MME unit 73 and HeNBGW 74 are equivalent to host node devices, and control the connection between the user equipment (UE) 71 and each of the eNB 72-1 and Home-eNB 72-2 being a base station.

Further, the configuration below is currently studied in 3GPP. The X2 interface between the Home-eNBs 72-2 is supported. The HeNBGW 74 appears to the MME unit 73 as the eNB 72-1. That is, the Home-eNBs 72-2 are connected to each other by means of the X2 interface, and control information is communicated between the Home-eNBs 72-2. The HeNBGW 74 appears to the MME unit 73 as the Home-eNB 72-2. The HeNBGW 74 appears to the Home-eNB 72-2 as the MME unit 73. The interfaces between the Home-eNBs 72-2 and the MME units 73 are the same, which are the S1 interfaces, in both of the case where the Home-eNB 72-2 is connected to the MME unit 73 through the HeNBGW 74 and the case where the Home-eNB 72-2 is directly connected to the MME unit 73. The HeNBGW 74 does not support the mobility to the Home-eNB 72-2 or the mobility from the Home-eNB 72-2 that spans the plurality of MME units 73. The Home-eNB 72-2 supports a single cell.

Figure 8:
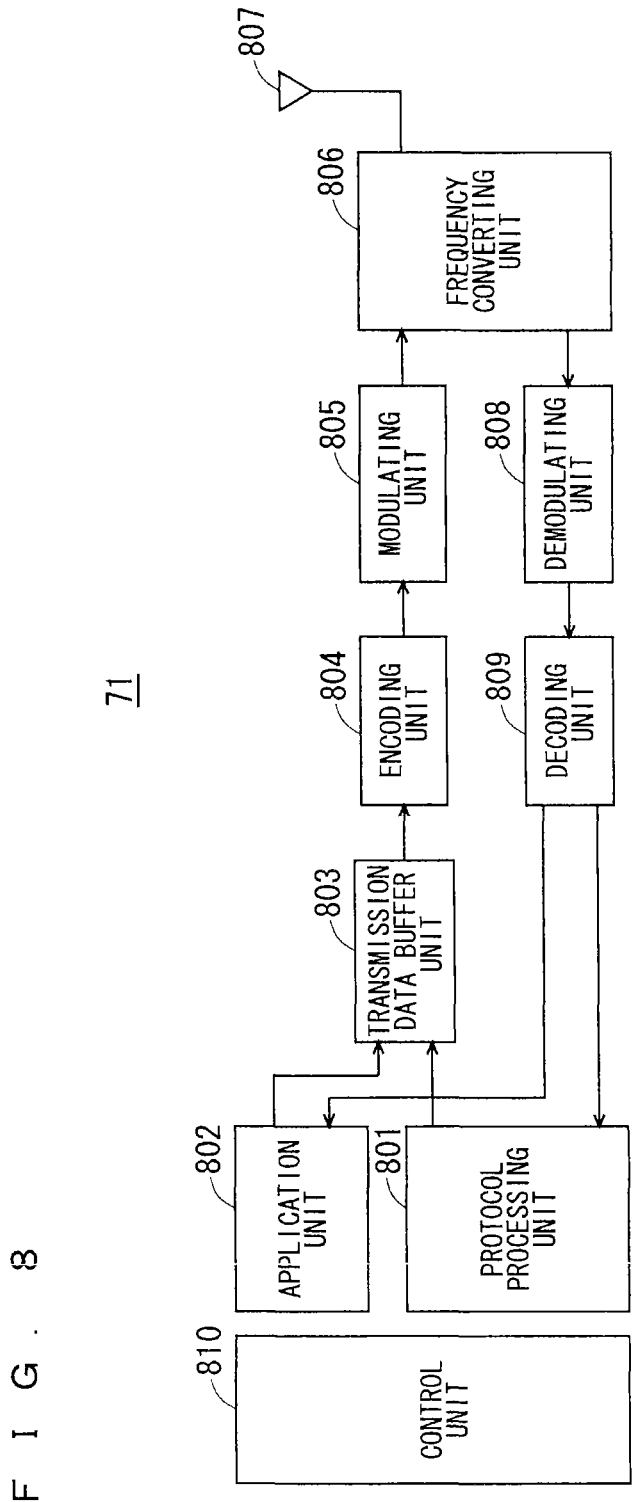
FIG. 8 is a block diagram showing the configuration of a user equipment (user equipment 71 of FIG. 7) according to the present invention.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency to a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

Figure 9:
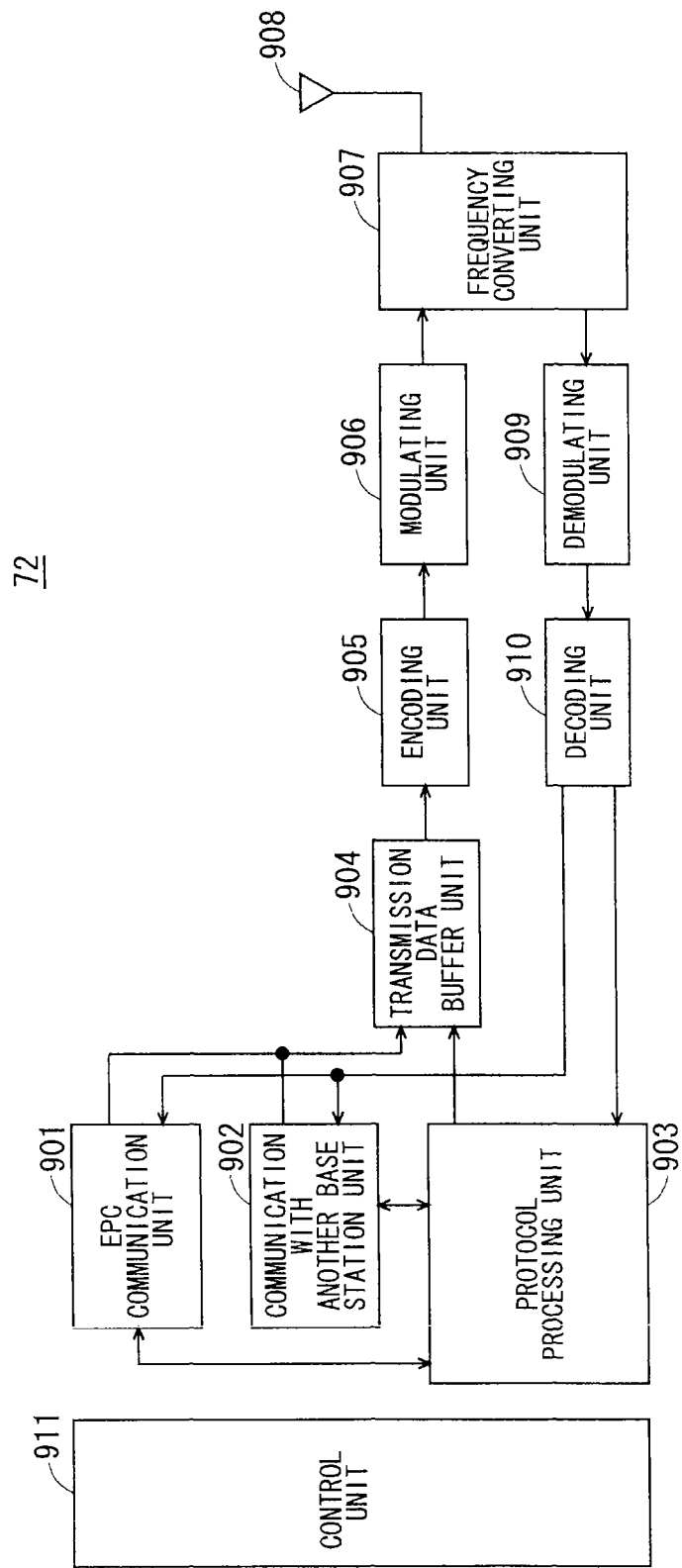
FIG. 9 is a block diagram showing the configuration of a base station (base station 72 of FIG. 7) according to the present invention.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). A communication with another base station unit 902 performs data transmission/reception to/from another base station. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted to one or a plurality of user equipments 71 through an antenna 908.

While, the reception process of the base station 72 is executed as follows. Radio signals from one or a plurality of user equipments 71 are received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by a control unit 911. This means that, though not shown in FIG. 9, the control unit 911 is connected to the respective units 901 to 910.

The functions of the Home-eNB 72-2 currently under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission/reception between the MME 73a and a PDN GW. A base station communication unit 1002 performs data transmission/reception between the MME 73a and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME 73a and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes an NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signaling in an idle state, addition, deletion, update, and search of a tracking area (TA) of one or a plurality of user equipments 71 being served thereby, and tracking area list (TA list) management.

The MME 73a begins a paging protocol by transmitting a paging message to the cell belonging to a UE registered tracking area (TA). The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (added, deleted, updated or searched). For example, it may be the relationship between one or a plurality of user equipments whose user access has been registered with a CSG-ID and the CSG cells belonging to this CSG-ID. In the whitelist management, the relationship between the user equipment and the CSG-ID is managed (added, deleted, updated, or searched). For example, one or a plurality of CSG-IDs with which user registration has been performed by a user equipment may be stored in the whitelist. The above-mentioned management related to the CSG may be performed by another part of the MME 73a. A series of processes by the MME 73a is controlled by a control unit 1006. This means that, though not shown in FIG. 10, the control unit 1006 is connected to the respective units 1001 to 1005.

The function of the MME 73a currently under discussion of 3GPP is described below (see Chapter 4.6.2 of Non-Patent Document 1). The MME 73a performs access control for one or a plurality of user equipments being members of closed subscriber groups (CSGs). The MME 73a recognizes the execution of paging optimization as an option.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME 73a by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73a through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP is described below (see Chapter 4.6.2 of Non-Patent Document 1). The HeNBGW 74 relays an S1 application. The HeNBGW 74 terminates the S1 application that is not linked to the user equipment 71 though it is a part of the procedures toward the Home-eNB 72-2 and towards the MME 73a. When the HeNBGW 74 is deployed, the procedure that is not linked to the user equipment 71 is communicated between the Home-eNB 72-2 and the HeNBGW 74 and between the HeNBGW 74 and the MME 73a. The X2 interface is not set between the HeNBGW 74 and another node. The HeNBGW 74 recognizes the execution of paging optimization as an option.

Next, an example of a typical cell search method in a mobile communication system is described. FIG. 12 is a flowchart showing an outline from a cell search to an idle state operation performed by a user equipment (UE) in the LTE communication system. When starting the cell search, in Step ST1201, the user equipment synchronizes the slot timing and frame timing by a primary synchronization signal (P-SS) and a secondary synchronization signal (S-SS) transmitted from a neighbour base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (specified).

Next, in Step ST1202, the user equipment detects a reference signal RS (cell-specific reference signal (CRS)) transmitted from the base station per cell and measures the received power (also referred to as RSRP). The code corresponding to the PCI one by one is used for the reference signal RS, and separation from another cell is enabled by correlation using the code. The code for RS of the cell is derived from the PCI specified in Step ST1201, which makes it possible to detect the RS and measure the RS received power.

Next, in Step ST1203, the user equipment selects the cell having the best RS reception quality (for example, cell having the highest RS received power, that is, best cell) from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information related to the access to the cell, information related to cell selection, and scheduling information of other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC in the tracking area (TA) list that has been already possessed by the user equipment. In a case where the TAC received in Step ST1205 is identical to the TAC included in the TA list as a result of the comparison, the user equipment enters an idle state operation in the cell. In a case where the TAC received in Step ST1205 is not included in the TA list as a result of the comparison, the user equipment requires a core network (EPC) (including MME and the like) to change a TA through the cell for performing tracking area update (TAU). The core network updates the TA list based on an identification number (such as a UE-ID) of the user equipment transmitted from the user equipment together with a TAU request signal. The core network transmits the updated TA list to the user equipment. The user equipment rewrites (updates) the TAC list of the user equipment with the received TA list. After that, the user equipment enters the idle state operation in the cell.

As to the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG.

Note that one CSG may contain a plurality of CSG cells. After being registered with any one of the CSG cells, the user equipment can access another CSG cell of the CSG to which the registered CSG cell belongs.

Alternatively, the Home-eNB in the LTE and LTE-A or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID and TAC are associated with global cell identity (GCI).

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

Splitting of all physical cell identities (PCIs) into ones reserved for CSG cells and the others reserved for non-CSG cells is discussed in 3GPP (see Non-Patent Document 1). There is a range of PCIs in all the PCIs, which is reserved by the network for use by CSG cells (see Chapter 10.5.1.1 of Non-Patent Document 1). Splitting the range of PCIs is referred to PCI-split as times. The PCI split information is broadcast in the system information from the base station to the user equipments being served thereby. Non-Patent Document 5 discloses the basic operation of a user equipment by PCI split. The user equipment that does not have the PCI split information needs to perform cell search using all the PCIs (for example, using all 504 codes). On the other hand, the user equipment that has the PCI split information is capable of performing cell search using the PCI split information.

Further, it has been determined that the PCIs for hybrid cells are not contained in the PCI range for CSG cells in 3GPP (see Chapter 10.7 of Non-Patent Document 1).

According to 3GPP, there are two modes in the method of selecting or reselecting a CSG cell by a user equipment. One is an automatic mode. The feature of the automatic mode is described below. The user equipment performs selection or reselection with the use of an allowed CSG list (allowed CSG ID list) in the user equipment. After the completion of PLMN selection, the user equipment camps on one cell in the selected PLMN only in a case of a non-CSG cell or a CSG cell with a CSG ID present in the allowed CSG list. The user equipment disables an autonomous search function of the CSG cell if the allowed CSG list of the user equipment is empty (see Chapter 5.2.4.8.1 of Non-Patent Document 3).

The second is a manual mode. The feature of the manual mode is described below. The user equipment shows a list of available CSGs in the currently selected PLMN to a user. The list of CSGs provided to the user by the user equipment is not limited to the CSGs included in the allowed CSG list stored in the user equipment. The user selects the CSG based on the list of CSGs, and then the user equipment camps on the cell with the selected CSG ID, to thereby attempt registration (see Non-Patent Document 3).

The HeNB and HNB are required to support various services. For example, an operator causes a predetermined HeNB and HNB to register user equipments therein and permits only the registered user equipments to access the cells of the HeNB and HNB, which increases radio resources available for the user equipments and enables high-speed communication. In such a service, the operator correspondingly sets a higher charge compared with a normal service.

In order to achieve the above-mentioned service, the closed subscriber group cell (CSG cell) accessible only to the registered (subscribed or member) user equipments is introduced. It is required to install a large number of closed subscriber group cells (CSG cells) in shopping malls, apartment buildings, schools, companies and the like. For example, the following manner of use is required; the CSG cells are installed for each store in shopping malls, for each room in apartment buildings, for each classroom in schools, and for each section in companies such that only the users who have registered with the respective CSG cells are permitted to use those CSG cells. The HeNB/HNB is required not only to complement the communication outside the coverage of the macro cell (area complementing HeNB/HNB) but also to support various services as described above (service providing HeNB/HNB). This also leads to a case where the HeNB/HNB is installed within the coverage of the macro cell.

As described above, CA is studied in the LTE-A system, in which two or more CCs are aggregated to support transmission bandwidths up to 100 MHz, which are wider than the frequency bandwidths of the LTE system.

FIG. 13 is a diagram showing the concept of CA. An eNB shown in FIG. 13 configures a cell n configured by a DL CCn and a UL CCn which is associated with the DL-CCn by a DL/UL link via SIB2. The carrier frequency of the DL CCn is denoted by Fn (DL), and the carrier frequency of the UL CCn is denoted by Fn (UL). Here, n is an integer of one to five.

A UE camps on the cell1 and performs RRC connection indicated by an arrow 1301. As a result, the cell1 becomes a PCell.

After that, the eNB notifies the UE of the information related to the CCs to be aggregated through dedicated RRC signaling indicated by an arrow 1302. The information related to a cell m configured by a DL CCm and a UL CCm, for example, system information is notified as the information related to the CCs. Here, m is an integer of two to five. The eNB notifies the UE of the information related to the CCs in this manner, whereby the cell2 to the cell5 become SCells.

As described above, the eNB performs CA for the UE with the cell1 to the cell5. Then, the UE performs communication with the cell1 to the cell5 based on CA, as indicated by an arrow 1303.

A configuration example of a UE that supports CA is described. It suffices that in the configuration shown in FIG. 8 described above, a part or the whole of the modulating unit 805, frequency converting unit 806, antenna 807, and demodulating unit 808 is caused to support a wider bandwidth. In the transmitter, a part or the whole of the modulating unit 805, frequency converting unit 806, and antenna 807 may be caused to operate in a band including a predetermined number of contiguous UL CCs. In the receiver, a part or the whole of the antenna 807, frequency converting unit 806, and demodulating unit 808 may be caused to operate in a band including a predetermined number of contiguous DL CCs. This enables to support CA by a predetermined number of contiguous UL CCs or DL CCs.

As another method, it suffices that a plurality of a part or the whole of the modulating unit 805, frequency converting unit 806, antenna 807, and demodulating unit 808 are provided in parallel to operate in a band including a predetermined number of non-contiguous UL CCs or DL CCs. In the transmitter, a plurality of a part or the whole of the modulating unit 805, frequency converting unit 806, and antenna 807 may be provided in parallel so as to operate in a band including a predetermined number of non-contiguous UL CCs. In the receiver, a plurality of a part or the whole of the antenna 807, frequency converting unit 806, and demodulating unit 808 may be provided in parallel so as to operate in a band including a predetermined number of non-contiguous DL CCs. This enables to support CA with a predetermined number of non-contiguous UL CCs or DL CCs. Alternatively, the two configurations described above may be appropriately combined.

A configuration example of an eNB that supports CA is described. It suffices that in the configuration shown in FIG. 9 described above, the protocol processing unit 903 performs the process for a UE for which CA is performed per cell configured by an eNB, and the transmission data buffer unit 904, encoding unit 905, modulating unit 906, frequency converting unit 907, antenna 908, demodulating unit 909, and decoding unit 910 are configured per cell. This enables to perform CA for a UE by cells configured by an eNB.

A problem to be solved in the first embodiment is described below. Non-Patent Document 10 discloses that a CSG indication and a CSG-ID can be configured per cell (CC). However, Non-Patent Document 10 does not describe the method of notifying user equipments of the configuration content. As a result, the operation of the communication system cannot be determined uniquely, leading to a problem that services cannot be provided appropriately.

A solution in the first embodiment is described below. Each cell (CC) notifies user equipments being served thereby of the CSG indication and CSG-ID configured per cell (CC). The CSG indication and CSG-ID of the SCell are notified user equipments during a call, that is, in RRC_CO-NNECTED, by "RRC Connection Reconfiguration message" of dedicated RRC signaling from the PCell.

The first embodiment described above can achieve the following effects. The method of notifying user equipments of the CSG indication and CSG-ID configured per cell (CC) is determined uniquely, which enables to stably provide services. The first embodiment can improve a data rate using stable carrier aggregation.

Second Embodiment

A problem to be solved in a second embodiment is described below. In a case where the first embodiment is used, the following problem occurs. As described above, in access from a user equipment through a CSG cell, an MME performs access control, that is, restricts access from a UE to a CSG cell. That is, a base station does not restrict access to the CSG. As a result, for a UE unregistered with the CSG to which a cell belongs, the cell (CC) may be configured as a SCell to become active.

Therefore, in a communication system, the following problem occurs if an MME performs access control in access from a user equipment through a CSG cell. Considered here is a case in which a base station configures, for a user equipment unregistered with a CSG to which a cell belongs, the cell as a SCell. In this case, after the cell is configured as a SCell, access from the user equipment through the cell is not permitted through access control by the MME. In such a case, carrier aggregation cannot be performed. In a case where a cell belonging to the CSG is provided by a base station as described above, a problem that a data rate cannot be improved using carrier aggregation arises.

In a case where a base station configures, for a user equipment unregistered with a CSG to which a cell belongs, the cell as a SCell, the following problem occurs in the user equipment. It is uncertain whether the user equipment performs communication through the cell (CC) in accordance with the SCell addition or modification to be notified from a PCell or judges that it cannot access the cell (CC) by CSG access restriction based on a whitelist stored in a USIM of the user equipment. This leads to a problem that an operation of a user equipment becomes unstable. Accordingly, an operation of a communication system cannot be determined uniquely, leading to a problem that services cannot be provided appropriately.

A solution in the second embodiment is described below. In a case of configuring a cell as a SCell, the communication system can provide normal services to user equipments through the cell. In a case where the SCell is configured, the user equipment judges to be able to receive normal services through the cell.

In a case of configuring a cell as a SCell, even when the cell (SCell) belongs to a CSG and the user equipment is unregistered with the CSG, the communication system may provide normal services to the user equipment through the cell. In a case where a cell is configured as a SCell, the user equipment may judge to be able to receive normal services through the cell even if it has been unregistered with the CSG to which the cell (SCell) belongs.

The following two (1) and (2) are disclosed as specific examples of the case of configuring a cell as a SCell.

(1) The configuration content as a Scell is notified to a user equipment. Specific examples of the configuration content include a CSG-ID and a CSG indication per CC.

(2) The configuration content as a Scell is not notified to a user equipment. Specific examples of the configuration content include a CSG-ID and a CSG indication per CC. The following two (a1) and (a2) are disclosed as specific examples of the case where a cell does not notify the user equipment of the configuration content. (a1) Case where a notification of the configuration content is omitted. Specific examples of the configuration content include a CSG-ID and a CSG indication per CC. (a2) Case where a SCell does not belong to a CSG. That is, a case where a SCell is not a CSG cell.

The following two (1) and (2) are disclosed as specific examples of the case where a cell is configured as a SCell.

(1) The configuration content as a Scell is received. Specific examples of the configuration content include a CSG-ID and a CSG indication per CC.

(2) The configuration content as a Scell is not received.

The solution in the second embodiment described above is performed, whereby a data rate using carrier aggregation can be improved even in a case where a cell belonging to a CSG is provided by a base station. Also, the operation of a user equipment can be determined uniquely, which enables to appropriately provide services.

A specific example of the operation of an MME is disclosed below. The MME does not perform access control for a user equipment through a cell configured as a SCell by a base station. The MME may not perform access control for a user equipment through a CSG cell configured as a SCell by a base station. The MME may only perform access control for a user equipment through a PCell. The MME may only perform access control for a user equipment through a PCell belonging to the CSG. The MME may only perform access control for a user equipment through a PCell being a CSG cell.

The following two (1) and (2) are disclosed as specific examples of the operation of the base station.

(1) In a case of performing carrier aggregation, a base station can configure any cell of the base station as a SCell. Alternatively, in a case of performing carrier aggregation, the base station may enable to configure any cell as a SCell even if a cell belonging to the CSG is provided by the base station.

(2) In a case of performing carrier aggregation, the base station can render any cell provided by the base station active as a SCell. Alternatively, in a case of performing carrier aggregation, the base station may render any cell active as a SCell even if a cell belonging to the CSG is provided by in the base station.

A specific example of the operation of the user equipment is disclosed below. A user equipment does not perform CSG access restriction on a cell notified of the configuration content as a SCell (hereinafter, merely referred to as "SCell" in some cases). The following three (1) to (3) are disclosed as specific examples of the method in which a user equipment does not perform CSG access restriction.

(1) Even in a case where the configuration content as a SCell contains a CSG-indication and a CSG-ID of the SCell, a user equipment does not perform access restriction using the CSG-indication and CSG-ID. For example, a user equipment does not compare the CSG-ID of the SCell contained in the configuration content as a SCell and the CSG-ID in the USIM of the user equipment. Alternatively, even in a case where the CSG-ID of the SCell contained in the configuration content as a SCell does not match the CSG-ID contained in the USIM of the user equipment, the user equipment may not perform judgment that access is not allowed. Still alternatively, a user equipment may not notify the CSG-indication and CSG-ID of the SCell by the configuration as a SCell.

(2) A user equipment does not perform access restriction using the CSG-indication and CSG-ID that are broadcast from a cell configured as a SCell using the broadcast information. For example, a user equipment does not compare the CSG-ID broadcast from the cell configured as a SCell using the broadcast information and the CSG-ID in the USIM of the user equipment. Alternatively, even in a case where the CSG-ID broadcast from the cell configured as a SCell using the broadcast information does not match the CSG-ID contained in the USIM of the user equipment, the user equipment may not perform such judgment that access is not allowed. Alternatively, a user equipment may not receive or may ignore the CSG-ID broadcast from a cell configured as a SCell using the broadcast information. Alternatively, a user equipment may not receive or may ignore the SIB1 broadcast from the cell configured as a SCell. Alternatively, a user equipment may not receive or may ignore the SIB broadcast from a cell configured as a SCell. Alternatively, a user equipment may not receive or may ignore the broadcast information broadcast from a cell configured as a SCell.

(3) Combination of (1) and (2) above.

As to a CSG cell, the deployment in which services are preferentially provided to CSG members belonging to the same CSG is studied as described above. Specific examples of the preferential treatment probably include the preferential allocation of resources to CSG members and the discount of communication costs for CSG members. It is conceivable that along with the above, the charging setting may differ between CSG members and non-CSG members.

Specific examples of the charging setting in a case where the second embodiment is used are described below. A core network side is conceivable as a specific example of the judging entity. The following two (1) and (2) are disclosed as specific examples of the entity on the core network side; (1) MME and (2) home subscriber server (HSS).

The following three (1) to (3) are disclosed as specific examples of the charging setting. (1) Charging for use of SCells unregistered with a CSG is set to be similar to charging of the members registered with the CSG. (2) Charging for use of SCells unregistered with a CSG is set to be similar to charging of the members unregistered with the CSG. (3) Charging for use of SCells unregistered with a CSG is set to be similar to that in a case of PCells.

The following three (1) to (3) are disclosed as specific examples of handling services. (1) The use of SCells unregistered with a CSG is handled similarly to that of services for members registered with the CSG. (2) The use of SCells unregistered with a CSG is handled similarly to that of services for members unregistered with the CSG. (3) The use of SCells unregistered with a CSG is handled as in the case of PCell.

Figure 14:
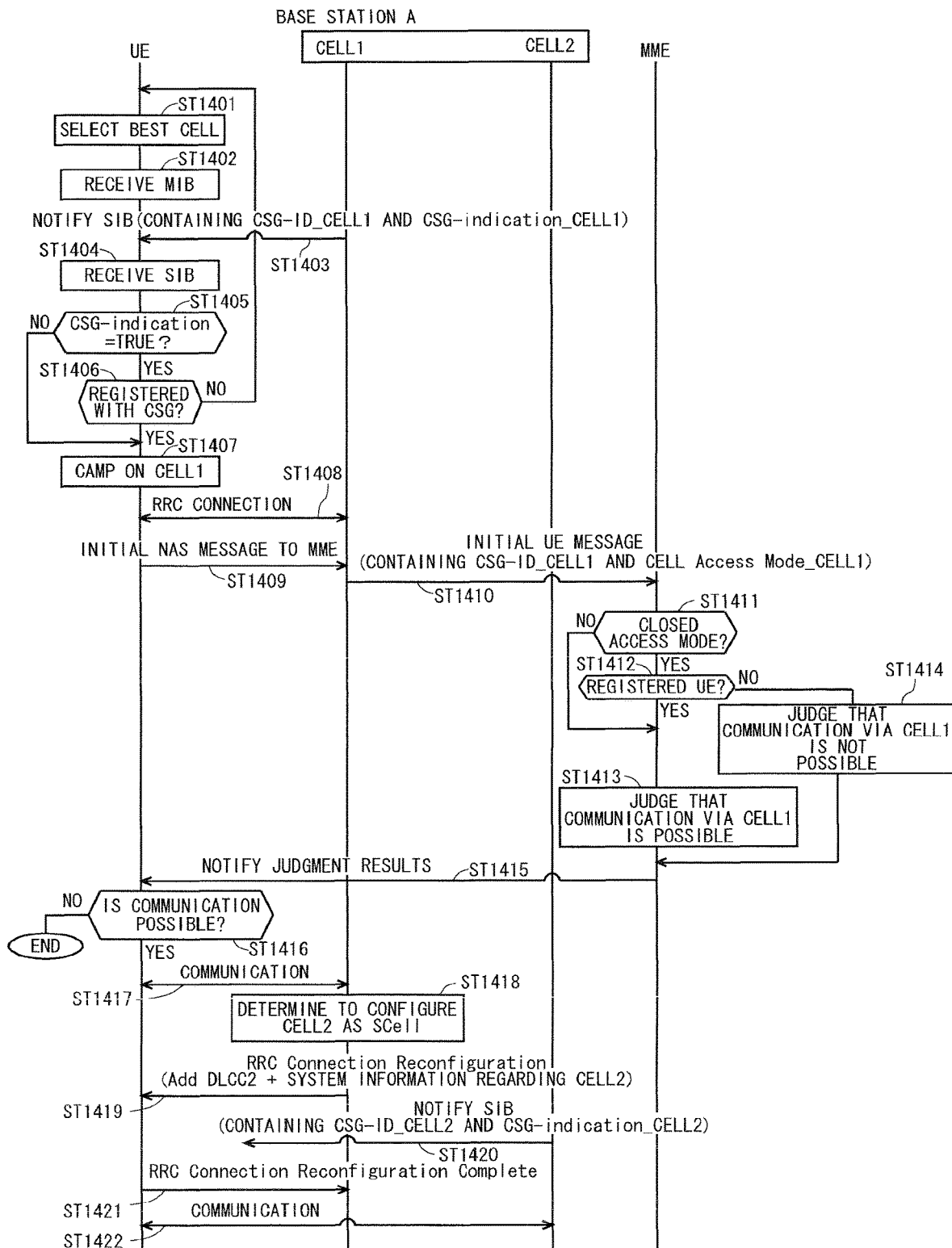
FIG. 14 is a diagram showing an example of a sequence of a communication system in a second embodiment.

Next, a specific example of a sequence of a communication system in the second embodiment is described with reference to FIG. 14. FIG. 14 is a diagram showing an example of the sequence of the communication system in the second embodiment. This operation example describes a case in which a base station A providing a plurality of cells (CCs) including a cell1 and a cell2 is present, where a UE selects the cell1 of the base station A as the best cell and camps on the cell1 to start communication, and thereafter, the cell2 is configured as a SCell. The plurality of cells of the base station A are formed of component carriers having different frequencies. The base station A aggregates two or more cells among a plurality of cells, that is, performs carrier aggregation (CA) and transmits/receives component carriers of the aggregated cells in parallel to perform radio communication with UEs.

In Step ST1401, the UE selects a cell having the best RS reception quality, for example, the best cell having the highest RS reception power. In this operation example, in Step ST1401, the UE selects the cell1 of the base station A as the best cell. When selecting the best cell in Step ST1401, the UE moves to Step ST1402.

In Step ST1402, the UE receives the MIB of the best cell selected in Step ST1401. Specifically, the UE receives the PBCH of the best cell selected in Step ST1401 and obtains a BCCH being the broadcast information. The MIB containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1403, the base station A notifies the UE of the SIB. The SIB1 of the SIB contains the information related to access to the cell, for example, CSG identity (CSG-ID), CSG indication, information related to cell selection, and scheduling information of other SIB (SIBk; k is an integer equal to or larger than two).

Specifically, in a case where the cell operates in an open access mode or hybrid access mode, the CSG indication is set to "FALSE", which is broadcast from the cell. Meanwhile, in a case where the cell operates in a closed access mode, the CSG indication is set to "TRUE", which is broadcast from the cell. In the case where the CSG indication is set to "TRUE", the user equipment can access the cell only in a case where the CSG identity (CSG-ID) matches the CSG identity (CSG-ID) in the whitelist stored in, for example, the USIM of the user equipment (see Non-Patent Document 2).

In this operation example, the cell1 broadcasts "CSG-indication_cell1" to the UE as a CSG indication and broadcasts "CSG-ID_cell1" to the UE as a CSG identity.

In Step ST1404, the UE receives the SIB. Specifically, based on the cell configuration information of the MIB, the UE receives the DL-SCH of the cell and obtains the SIB1 in the broadcast information BCCH. The UE receives other SIB based on the scheduling information of the other SIB in the SIB1. When receiving the SIB in Step ST1404 in this manner, the UE moves to Step ST1405.

In Step ST1405, the UE judges whether or not the CSG indication (CSG-indication) in the SIB received in Step ST1404 is "TRUE". In other words, the UE judges whether or not the access mode of the SCell is a closed access mode. In a case of judging that the CSG indication is "TRUE" in Step ST1405, the UE moves to Step ST1406. In a case of judging that the CSG indication is not "TRUE", that is, is "FALSE" in Step ST1405, the UE moves to Step ST1407.

In Step ST1406, the UE judges whether or not the own UE has been registered with the CSG indicated by the CSG identity in the SIB received in Step ST1404. The UE may judge whether or not the CSG identity in the SIB received in Step ST1404 matches the CSG identity in the whitelist stored in, for example, the USIM of the UE.

In a case of judging that the own UE has been registered in Step ST1406, the UE moves to Step ST1407. Alternatively, in a case of judging that the CSG identity in the received SIB matches the CSG identity in the whitelist stored in, for example, the USIM of the UE in Step ST1406, the UE may move to Step ST1407.

In a case of judging that the own UE has been unregistered in Step ST1406, the UE returns to Step ST1401 to select another cell as the best cell. Alternatively, in a case of judging that the CSG identity in the received SIB does not match the CSG identity in the whitelist stored in, for example, the USIM of the UE in Step ST1406, the UE may return to Step ST1401 to select another cell as the best cell.

In Step ST1407, the UE camps on the cell selected in Step ST1401. In this operation example, the UE camps on the cell1 of the base station A.

In Step ST1408, the UE performs RRC connection with the cell to which the UE has camped on in Step ST1407. In a base station by which carrier aggregation can be performed, the cell with which RRC connection has been performed is referred to as PCell. The PCell corresponds to a connected cell. In this operation example, the UE performs RRC connection with the cell1 of the base station A.

In Step ST1409, the UE notifies the MME of the initial NAS via the cell with which RRC connection has been performed. In this operation example, the UE notifies the MME of the initial NAS message via the cell1 of the base station A.

In Step ST1410, the cell1 notifies the MME of the NAS message received from the UE in Step ST1409. As a specific example of the method of notifying the NAS message, the cell1 maps the NAS message received from the UE to "INITIAL UE MESSAGE" and notifies the MME of the NAS message. This notification includes the CSG identity and cell access mode of the base station (cell), in addition to the NAS message received from the UE in Step ST1409 (see TS 36.413 V9.5.0 (hereinafter, referred to as "Non-Patent Document 11") by 3GPP). In this operation example, the cell1 notifies the MME of the CSG-ID_cell1 and Cell Access Mode_cell1 as the CSG identity and cell access mode, respectively.

In Step ST1411, the MME judges whether or not the cell access mode received in Step ST1410 is "closed access mode". In a case of judging that the cell access mode is "closed access mode" in Step ST1411, the MME moves to Step ST1412. In a case of judging that the cell access mode is not "closed access mode", that is, is "open access mode" or "hybrid access mode" in Step ST1411, the MME moves to Step ST1413.

In Step ST1412, the MME judges whether or not the UE has been registered with the CSG identity received in Step ST1410. In a case of judging that the UE has been registered in Step ST1412, the MME moves to Step ST1413. In a case of judging that the UE has not been registered, that is, has been unregistered in Step ST1412, the MME moves to Step ST1414. In a case of judging whether or not the UE has been registered in Step ST1412, the MME may inquire the HSS or use the information stored in the HSS.

In Step ST1413, the MME judges that communication with the UE via the cell that has notified the NAS message from the UE in Step ST1410 is possible. In this operation example, the MME judges that communication with the UE via the cell1 of the base station A is possible.

In Step ST1414, the MME judges that communication with this UE via the cell that has notified the NAS message from the UE in Step ST1410 is not possible.

In Step ST1415, the MME notifies the UE that has notified the NAS message via a cell in Step ST1409 of the judgment results as to whether or not communication with the UE via the cell is possible. In this operation example, the MME notifies the UE of the judgment results that communication with the UE via the cell1 is possible.

In Step ST1416, the UE judges whether or not communication via the cell is possible based on the judgment results received in Step ST1415. In a case of judging that communication is possible in Step ST1416, the UE moves to Step ST1417. In a case of judging that communication is not possible in Step ST1416, the UE ends the process and moves to other process. The other process is not specific to the present invention, which is not described here. In this operation example, the UE judges that communication via the cell is possible.

In Step ST1417, the cell starts communication with the UE. In this operation example, the cell1 starts communication with the UE as a PCell.

In Step ST1418, the cell determines to configure another cell as a SCell. The SCell corresponds to an aggregable cell and can be aggregated with the PCell. In this operation example, the cell1 serving as a PCell determines to configure the cell2 as a SCell. In the present embodiment, CSG access restriction is not performed in determining a SCell. Specifically, the processes corresponding to Steps ST1410 to ST1415 are not performed in the determination of a SCell in Step ST1418.

In Step ST1419, the cell notifies, using dedicated RRC signaling, the UE of a SCell to be added or a SCell to be modified and the configuration content of the cell. In this operation example, the cell2 as a SCell to be added and the configuration content of the cell2 are notified using "RRC Connection Reconfiguration message" of dedicated RRC signaling. On that occasion, the system information of the cell2 is notified as well.

In the present embodiment, when a SCell is added or modified, the UE does not perform CSG access restriction on the SCell. Specifically, the UE does not perform the processes corresponding to Steps ST1405 and ST1406 using the configuration content of the cell2 received in Step ST1419 or the system information of the cell2 received in Step ST1419.

In Step ST1420, the cell2 broadcasts the SIB to UEs being served thereby. Specifically, the information related to access to the cell2 is broadcast. For example, "CSG-ID_cell2" or the like and "CSG-indication_cell2" or the like are broadcast as the CSG identity and the CSG indication, respectively. In the present embodiment, when a SCell is added or modified, the UE does not perform CSG access restriction on the SCell. Specifically, the UE does not perform the processes corresponding to Steps ST1405 and ST1406 using the system information of the cell2 broadcast from the cell2 in Step ST1420. Alternatively, the UE may not receive the system information of the cell2 broadcast from the cell2 in Step ST1420.

In Step ST1421, the UE notifies the cell being a PCell that the configuration of a SCell to be added or SCell to be modified has been finished, which had been received in Step ST1419. This is notified using, for example, "RRC Connection Reconfiguration Complete". In this operation example, the UE notifies the cell1 being a PCell that the configuration of a SCell has been finished.

In Step ST1422, the cell being a SCell starts communication with the UE. In this operation example, the cell2 starts communication with the UE as a SCell.

The second embodiment described above can achieve the following effects. The operation as a communication system can be stabilized while improving a data rate using carrier aggregation, which enables to appropriately provide services.

The present embodiment can be used in combination with the first embodiment described above.

First Modification of Second Embodiment

The present modification describes a point to be further improved in the second embodiment described above. The present modification mainly describes a portion different from the solution in the second embodiment described above, and a portion not to be described is similar to the second embodiment.

Each cell (CC) can be configured whether or not it can be used as a SCell. This configuration may be also referred to as "SCell use configuration". The PCell determines to configure a cell as a SCell in accordance with "SCell use configuration" of each cell. The PCell determines to configure, as a SCell, a cell indicating that it can be used in "SCell use configuration". The PCell does not configure a cell indicating that it cannot be used as a SCell in "SCell use configuration".

The following three (1) to (3) are disclosed as specific examples of the SCell use configuration. (1) Whether or not a cell can be used. (2) Indication that a cell can be used, where an effect of a smaller amount of information compared with the specific example (1) can be achieved. (3) Indication that a cell cannot be used, where an effect of a smaller amount of information compared with the specific example (1) can be achieved.

The following three (1) to (3) are disclosed as specific examples of the method in which a PCell knows "SCell use configuration" of another cell.

(1) Before determining to configure a cell as a SCell, the PCell selects a SCell candidate cell. The PCell inquires the SCell candidate cell about "SCell use configuration" of the SCell candidate cell. Alternatively, a base station or a control unit of the base station may determine "SCell use configuration" of each cell.

(2) Each cell notifies the control unit of the base station of "SCell use configuration" of the own cell. Before determining to configure a cell as a SCell, the PCell selects a SCell candidate cell. The PCell inquires the control unit of the base station about "SCell use configuration" of the SCell candidate cell. Before the inquiry from the PCell, the control unit of the base station may notify each cell (PCell) of "SCell use configuration" of each cell. Alternatively, the base station or the control unit of the base station may determine "SCell use configuration" of each cell.

(3) Each cell notifies another cell of "SCell use configuration" of the own cell. Alternatively, the base station or the control unit of the base station may determine "SCell use configuration" of each cell.

The PCell may select a SCell candidate cell set including one or a plurality of cells before determining to configure a cell as a SCell. It suffices that the SCell candidate cell set is configured based on, for example, UE capability. As a specific example of the configuration method based on UE capability, a PCell selects a SCell candidate cell or a SCell candidate cell included in the SCell candidate cell set from the cells belonging to a frequency band at which a UE is allowed transmission and reception. This leads to an effect that a control delay when a SCell is determined can be prevented. It suffices that a SCell candidate cell is selected from a SCell candidate cell set.

"SCell use configuration" may be changed. "SCell use configuration" can be changed, which leads to an effect that cells can be operated flexibly.

"SCell use configuration" may be changed based on the conditions of "SCell use configuration". The following six (1) to (6) are disclosed as specific examples of the conditions of "SCell use configuration". (1) Load state of the cell. For example, in a case where load is high or there are a large number of user equipments being served by a cell, "SCell use configuration" is set to "cannot be used", whereby the cell can reserve radio resources for user equipments being served thereby. (2) Access mode of the cell. Specific examples of the access mode include an open access mode, a closed access mode, and a hybrid access mode. (3) Transmission power of the cell. (4) Coverage of the cell. (5) Power-on state or low-consumption-power operation state of the cell. (6) Combination of (1) to (5) above.

The following five (1) to (5) are disclosed as specific examples of the timing at which "SCell use configuration" is notified.

(1) Periodically. This enables to support a change of "SCell use configuration".

(2) At the time of change. This enables to support a change of "SCell use configuration", similarly to the specific example (1). Also, an effect that the number of notification times is reduced compared with the specific example (1) can be achieved.

(3) At the time when a base station is installed. This achieves an effect that control is made more easily compared with the specific example (1).

(4) At the time when an operation of each cell is started. This can achieve an effect that control is made more easily compared with the specific example (1). Also, an effect that a more flexible operation can be made per cell compared with the specific example (3) can be achieved.

(5) At the time of power-on of each cell. This can achieve an effect that control is made more easily compared with the specific example (1). Also, an effect that a more flexible operation can be made per cell compared with the specific example (3) can be achieved.

Next, a specific example of a sequence of a communication system in the first modification of the second embodiment is described with reference to FIG. 15. FIG. 15 is a diagram showing an example of the sequence of the communication system in the first modification of the second embodiment. The processes of Steps ST1401 to ST1416 of FIG. 14 in the first modification of the second embodiment are similar to those of the second embodiment, which are not illustrated and described here. Illustration and description are given from the process of Step ST1417 of FIG. 14. The sequence shown in FIG. 15 is similar to the sequence shown in FIG. 14, where the same steps are denoted by the same step numbers and common description is not given here.

This operation example describes a case in which a base station A providing a plurality of cells (CCs) including a cell1 and a cell2 is present, where a UE selects the cell1 of the base station A as the best cell and camps on the cell1 to start communication, and thereafter, the cell2 is configured as a SCell. A case in which each cell notifies the control unit of the base station of "SCell use configuration" of the own cell is disclosed as a specific example of the method in which a PCell knows "SCell use configuration" of another cell. The case of the time when a base station is installed is disclosed as a specific example of the timing at which "SCell use configuration" is notified.

In Step ST1501, a base station is installed. In this operation example, the base station A providing a plurality of cells (CCs) including the cell1 and cell2 is installed.

In Steps ST1502 and ST1503, each cell of the base station notifies a control unit of the base station of the configuration of the own cell. The configuration of the own cell includes "SCell use configuration". In this operation example, in Step ST1502, the cell1 notifies the control unit of "SCell use configuration" of the cell1 being the own cell. In Step ST1503, the cell2 notifies the control unit of "SCell use configuration" of the cell2 being the own cell.

Then, the processes of Steps ST1401 to ST1407 shown in FIG. 14 described above are performed, so that the UE selects the cell1 of the base station A as the best cell and camps on the cell1. Then, the processes of Steps ST1408 to ST1416 shown in FIG. 14 described above are performed, and then, the process moves to Step ST1417.

In Step ST1417, a cell being a PCell starts communication with the UE. In this operation example, the cell1 starts communication with the UE as a PCell.

In Step ST1504, the cell being a PCell selects another cell as a SCell candidate. In this operation example, the cell1 serving as a PCell selects the cell2 as a SCell candidate.

In Step ST1505, the cell being a PCell inquires the control unit about the configuration of a cell being a SCell candidate selected in Step ST1504. The cell being a PCell may inquire the control unit about "SCell use configuration" of the SCell candidate. In this operation example, the cell1 being a PCell inquires the control unit about "SCell use configuration" of the cell2 selected as a SCell candidate.

In Step ST1506, the control unit responds to the inquiry from the cell being a PCell in Step ST1505. The control unit may notify the cell being a PCell of "SCell use configuration" of an inquiry target cell. In this operation example, the control unit notifies the cell1 being a PCell of "use is allowed" being "SCell use configuration" of the cell2 being an inquiry target cell.

In Step ST1507, the cell being a PCell judges whether or not the cell being a SCell candidate selected in Step ST1504 can be used as a SCell. In this judgment, the response results to the inquiry, which have been received from the control unit in Step ST1506, are used.

In a case of judging that the cell being a SCell candidate selected in Step ST1504 can be used as a SCell in Step ST1507, the cell being a PCell moves to Step ST1508. In a case of judging that the cell being a SCell candidate selected in Step ST1504 cannot be used as a SCell in Step ST1507, the cell being a PCell returns to Step ST1504 to select another cell as a SCell candidate.

In this operation example, the cell1 being a PCell judges that the cell2 being a SCell candidate can be used as a SCell, and then moves to Step ST1508.

In Step ST1508, the cell being a PCell determines to configure the cell being a SCell candidate as a SCell. In this operation example, the cell1 being a PCell determines to configure the cell2 being a SCell candidate as a SCell. In this modification, CSG access restriction is not performed in determination of a SCell, as in the second embodiment. Specifically, in the determination of a SCell in Step ST1508, the processes corresponding to Steps ST1410 to ST1415 shown in FIG. 14 described above are not performed.

The first modification of the second embodiment described above can achieve the following effects in addition to the effects of the second embodiment. Whether or not a cell can be used as a SCell can be configured on a cell basis of the base station. This enables to configure whether or not a radio resource is occupied for user equipments that use the cell as a Pcell on a cell basis. Therefore, cells can be operated with more precision.

The present modification can be used in combination with the first embodiment described above.

Third Embodiment

A problem to be solved in a third embodiment is described below. In a case where the second embodiment described above is used, the following problem occurs. A CSG is a cell for specific subscribers, in which subscribers who are allowed to use can be specified by an operator. This leads to a problem that the second embodiment in which the user equipment unregistered with the CSG to which a cell belongs uses a resource of the cell contradicts the gist of the CSG.

As to the CSG cell, such an operation that CSG members belonging to the same CSG are preferentially provided with services is studied. Specific examples of the preferential treatment include the preferential allocation of resources to CSG members and discount of communication costs for CSG members. Along with this, the charging setting may differ between the CSG members and non-CSG members.

In a case where the second embodiment is used, if the user which belongs to a CSG wishes to receive some services or apply for charging setting, the user will end up in using CCs unregistered with the CSG by the setting from the PCell irrespective of his/her wish. This causes a problem that a user-friendly communication system cannot be constructed.

A solution in the third embodiment is described below. The present embodiment describes a portion different from the solution in the second embodiment described above, and a portion not to be described is similar to the second embodiment.

The base station can configure a cell (CC) belonging to the same CSG as that of a PCell as a SCell. The base station may render a cell (CC) belonging to the same CSG as that of a PCell active as a SCell. Alternatively, in a case where a PCell belongs to the CSG, the base station can configure a cell (CC) belonging to the same CSG as that of the PCell as a SCell. In a case where a PCell belongs to the CSG, the base station may render a cell (CC) belonging to the same CSG as that of a PCell active as a SCell. Still alternatively, in a case where a PCell does not belong to the CSG, the base station can configure the cell (CC) that does not belong to the CSG as a SCell. In a case where a PCell does not belong to the CSG, the base station may render a cell (CC) that does not belong to the CSG active as a SCell.

Also in the third embodiment, as to the PCell, CSG access restriction in a user equipment and an MME are performed, as in the second embodiment. Therefore, the use of the solution in the present embodiment enables to prevent a user equipment unregistered with a CSG to which a cell belongs from using a resource of the cell as a SCell.

A specific example of the operation of the MME is disclosed below. The MME omits access control for a user equipment via a cell configured as a SCell by the base station, as in the case of the access control for a user equipment via a PCell. The MME may only perform access control for a user equipment via a PCell. The MME may only perform access control for a user equipment via a PCell belonging to the CSG. The MME may only perform access control for a user equipment via a PCell being a CSG cell.

The following three (1) to (3) are disclosed as specific examples of the method in which a PCell knows whether or not another cell belongs to a CSG or knows a CSG-ID to which another cell belongs.

(1) Before determining to configure a cell as a SCell, the PCell selects a SCell candidate cell. The PCell inquires the SCell candidate cell about whether or not the SCell candidate cell belongs to a CSG and about a CSG-ID to which the SCell candidate cell belongs.

The PCell may inquire about "CSG indication" and "CSG-ID" in place of inquiring about "whether or not belonging to the CSG" and "CSG-ID". In that case, in a case where a response from the SCell does not contain a CSG-ID and a CSG indication is "FALSE", it may be judged that such an indication that the SCell does not belong to a CSG is shown. In a case where a response from a SCell contains a CSG-ID and a CSG indication is "TRUE", the PCell may judge that such an indication that the SCell belongs to a CSG is shown. In a case where a response from a SCell contains a CSG-ID and a CSG indication is "FALSE", the PCell may judge that such an indication that the SCell belongs to a CSG is shown.

The PCell may inquire about "CSG-ID" in place of inquiring about "whether or not belonging to the CSG" and "CSG-ID". In that case, in a case where a response from a SCell does not contain a CSG-ID, the PCell may judge that that such an indication that the SCell does not belong to a CSG is shown. Meanwhile, in a case where a response from a SCell contains a CSG-ID, the PCell may judge that that such an indication that the SCell belongs to a CSG is shown.

(2) Each cell notifies the control unit of the base station of "whether or not the own cell belongs to a CSG" and, in a case where the own cell belongs to the CSG, notifies "CSG-ID". Before determining to configure a cell as a SCell, a PCell selects a SCell candidate cell. The PCell inquires the control unit about whether or not a SCell candidate cell belongs to the CSG and about a CSG-ID to which the SCell candidate cell belongs. In place of inquiring about "whether or not belonging to the CSG" and about "CSG-ID", the PCell may inquire about "CSG indication" and "CSG-ID". The information shown by the combination of "CSG indication" and "CSG-ID" is similar to that of the specific example (1) described above. Alternatively, the PCell may inquire about "CSG-ID" in place of inquiring about "whether or not belonging to the CSG" and "CSG-ID". The information shown by "CSG-ID" is similar to that of the specific example (1) described above.

(3) Each cell notifies another cell of "whether or not the own cell belongs to a CSG" and, in a case where the own cell belongs to the CSG, notifies "CSG-ID". In place of notifying "whether or not belonging to the CSG" and "CSG-ID", each cell may notify "CSG indication" and "CSG-ID". The information shown by the combination of "CSG indication" and "CSG-ID" is similar to that of the specific example (1) described above. Alternatively, each cell may notify "CSG-ID" in place of notifying "whether or not belonging to the CSG" and "CSG-ID". The information shown by "CSG-ID" is similar to that of the specific example (1) described above.

"Whether or not belonging to the CSG" in the specific examples (1) to (3) may be "indication of belonging to a CSG" or "indication of not belonging to the CSG".

A specific example of the timing at which "whether or not belonging to the CSG" and "CSG-ID" are notified is similar to the specific example of the timing at which "SCell use configuration" is notified in the first modification of the second embodiment described above, which is not described here.

The PCell may select a SCell candidate cell set before determining to configure a cell as a SCell. A specific example of the SCell candidate cell set is similar to that of the first modification of the second embodiment described above, which is not described here.

A specific example of the operation of the user equipment is disclosed below. The user equipment omits CSG access restriction on a cell whose configuration content has been notified as a SCell, similarly to the access control on a PCell. The following three (1) to (3) are disclosed as specific examples of the method in which a user equipment omits CSG access restriction.

(1) Even in a case where the configuration content as a SCell contains the CSG-indication and CSG-ID of a SCell, the user equipment does not perform access restriction using the CSG-indication and CSG-ID. For example, the CSG-ID of the SCell contained in the configuration content as a SCell and the CSG-ID in the USIM of the user equipment are not compared with each other. Alternatively, through the configuration as a SCell, the CSG-indication and CSG-ID of the SCell may not be notified.

(2) Access control using the CSG-indication and CSG-ID, which are broadcast from the cell configured as a SCell using the broadcast information, is not performed. For example, the CSG-ID broadcast from the cell configured as a SCell using the broadcast information and the CSG-ID in the USIM of the user equipment are not compared with each other. Alternatively, the CSG-ID broadcast from the cell configured as a SCell using the broadcast information may not be received or may be ignored. Alternatively, the SIB1 broadcast from the cell configured as a SCell may not be received or may be ignored. Alternatively, the SIB broadcast from the cell configured as a SCell may not be received or may be ignored. Alternatively, the broadcast information broadcast from the cell configured as a SCell may not be received or may be ignored.

(3) Combination of (1) and (2) described above.

Figure 16:
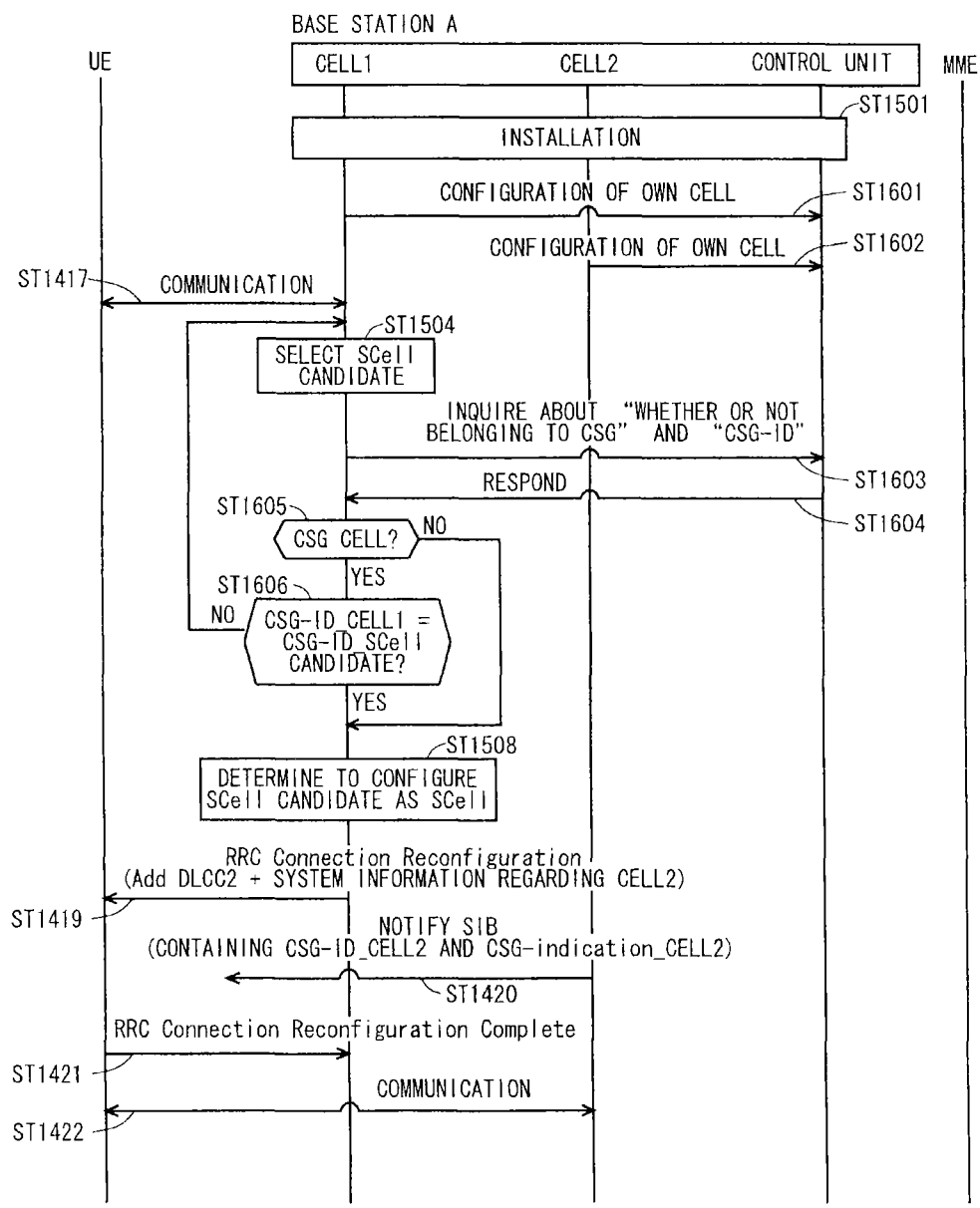
FIG. 16 is a diagram showing an example of a sequence of a communication system in a third embodiment.

Next, a specific example of a sequence of a communication system in a third embodiment is described with reference to FIG. 16. FIG. 16 is a diagram showing an example of the sequence of the communication system in the third embodiment. The processes of Steps ST1401 to ST1416 of FIG. 14 in the third embodiment are similar to those of the second embodiment, which are not illustrated and described here. Illustration and description are given from the process of Step ST1417 of FIG. 14. The sequence shown in FIG. 16 is similar to the sequences shown in FIGS. 14 and 15, where the same steps are denoted by the same step numbers and common description is not given here.

This operation example describes a case in which a base station A providing a plurality of cells (CCs) including a cell1 and a cell2 is present, where the UE selects the cell1 of the base station A as the best cell and camps on the cell1 to start communication, and thereafter, the cell2 is configured as a SCell. A case in which each cell notifies the control unit of the base station of "whether or not the own cell belongs to a CSG" and, if the own cell belongs to the CSG, notifies "CSG-ID" is disclosed as a specific example of the method in which a PCell knows whether or not another cell belongs to a CSG and knows a CSG-ID to which another cell belongs. The case of the time when a base station is installed is disclosed as a specific example of the timing at which "whether or not belonging to the CSG" and "CSG-ID" are notified.

In Step ST1501, a base station is installed. In this operation example, the base station A providing a plurality of cells (CCs) including the cell1 and cell2 is installed.

In Steps ST1601 and ST1602, each cell of the base station notifies the control unit of the base station of the configuration of the own cell. The configuration of the own cell contains "whether or not belonging to the CSG" and, in a case where the own cell belongs to the CSG, further contains a "CSG-ID". In this operation example, in Step ST1601, the cell1 notifies the control unit of "whether or not the cell1 being the own cell belongs to the CSG" and, in a case where the cell1 belongs to the CSG, notifies "CSG-ID" of the cell1. In Step ST1602, the cell2 notifies the control unit of "whether or not the cell2 being the own cell belongs to a CSG" and, in a case where the cell2 belongs to the CSG, notifies "CSG-ID" of the cell2.

Then, the processes of Steps ST1401 to ST1407 shown in FIG. 14 described above are performed, so that the UE selects the cell1 of the base station A as the best cell and camps on the cell1. Then, the processes of Steps ST1408 to ST1416 shown in FIG. 14 described above are performed, and then, the process moves to Step ST1417.

In Step ST1417, the cell being a PCell starts communication with the UE. In this operation example, the cell1 starts communication with the UE as a PCell.

In Step ST1504, the cell being a PCell selects another cell as a SCell candidate. In this operation example, the cell1 serving as a PCell selects the cell2 as a SCell candidate.

In Step ST1603, the cell being a PCell inquires the control unit about the configuration of the cell being a SCell candidate selected in Step ST1504. The cell being a PCell may inquire the control unit about "whether or not the SCell candidate cell belongs to a CSG" and, in the case of belonging to a CSG, "CSG-ID". In this operation example, the cell1 being a PCell inquires the control unit about "whether or not the cell2 selected as a SCell candidate belongs to a CSG" and, in the case of belonging to the CSG, inquires about "CSG-ID".

In Step ST1604, the control unit responds to the inquiry from the cell being a PCell in Step ST1603. The control unit may notify the cell being a PCell of "whether or not an inquiry target cell belongs to a CSG" and, in the case of belonging to the CSG, may inquire about "CSG-ID. In this operation example, the control unit notifies the cell1 being a PCell of "whether or not the cell2 being an inquiry target cell belongs to a CSG" and, in the case of belonging to the CSG, notifies "CSG-ID".

In Step ST1605, the cell being a PCell judges whether or not the cell being a SCell candidate selected in Step ST1504 belongs to the CSG. In this judgment, the response results to the inquiry received from the control unit in Step ST1604 are used. In a case of judging that the cell being a SCell candidate selected in Step ST1504 belongs to the CSG in Step ST1605, the cell being a PCell moves to Step ST1606. In a case of judging that the cell being a SCell candidate selected in Step ST1504 does not belong to the CSG, the cell being a PCell moves to, for example, Step ST1508, which is not specific to the present embodiment.

In Step ST1606, the cell being a PCell judges whether or not the CSG to which the cell being a SCell candidate selected in Step ST1504 is identical to the CSG to which the own cell belongs. In this judgment, the response results to the inquiry received from the control unit in Step ST1604 are used.

In a case of judging that the CSG (CSG-ID SCell candidate) to which the cell being a SCell candidate selected in Step ST1504 belongs is identical to the CSG (CSG-ID_cell1) to which the own cell belongs in Step ST1606, the cell being a PCell moves to Step ST1508. In a case of judging that the CSG to which the cell being a SCell candidate selected in Step ST1504 belongs differs from the CSG to which the own cell belongs, the cell being a PCell returns to Step ST1504 to select another cell as a SCell candidate.

Through the processes of Steps ST1605 and ST1606, only a cell (CC) belonging to the same CSG as that of the PCell can be configured as a SCell, which is specific to the present embodiment.

In Step ST1508, the cell being a PCell determines to configure the cell being a SCell candidate as a SCell. In this operation example, the cell1 being a PCell determines to configure the cell2 being a SCell candidate as a SCell. In the present embodiment, CSG access restriction is omitted assuming that it is similar to access control for a user equipment via the PCell in the decision of a SCell. Specifically, in the determination of a SCell in Step ST1508, the processes corresponding to Steps ST1410 to ST1415 shown in FIG. 14 described above are not performed.

Figure 17:
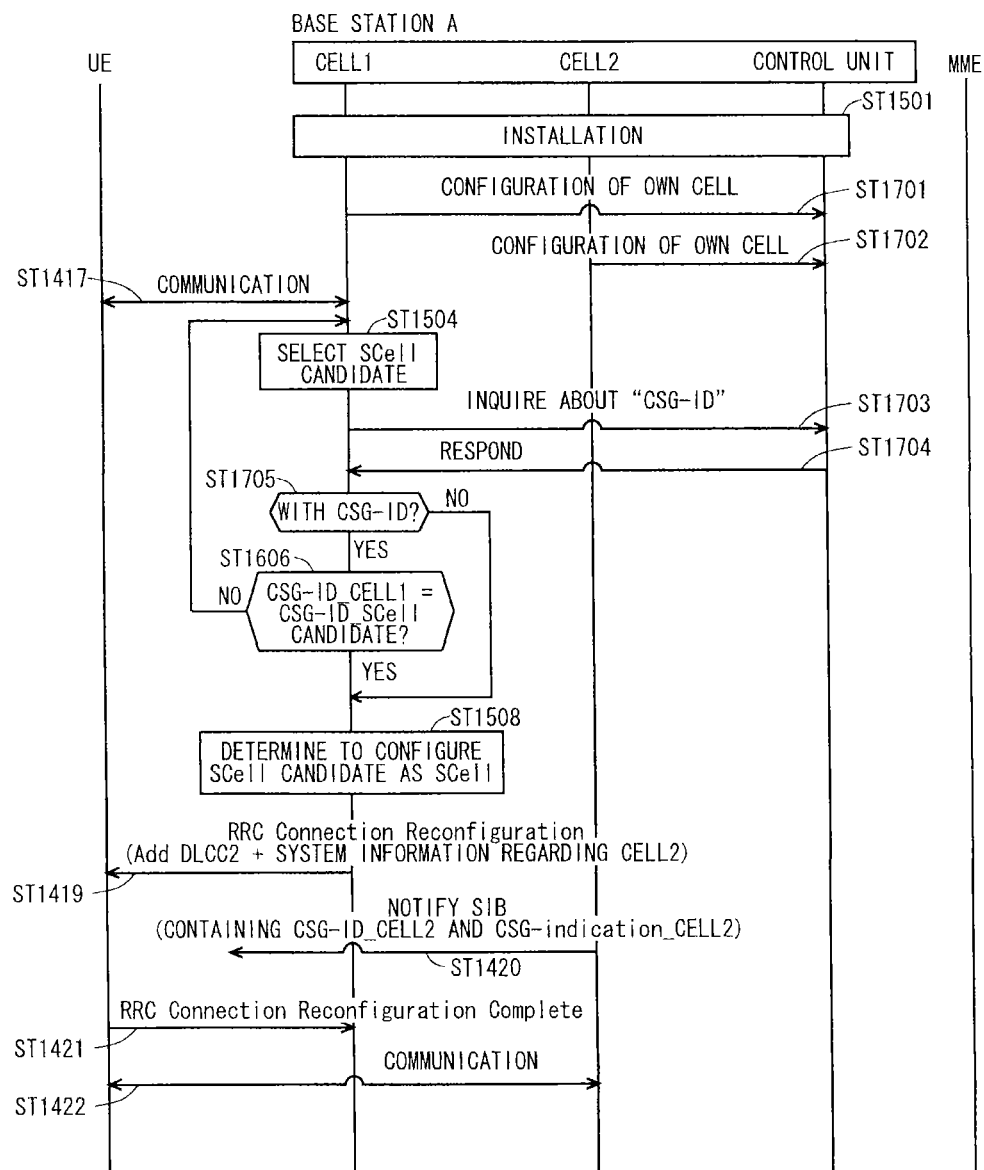
FIG. 17 is a diagram showing another example of the sequence of the communication system in the third embodiment.

Next, another specific example of the sequence of the communication system in the third embodiment is described with reference to FIG. 17. FIG. 17 is a diagram showing another example of the sequence of the communication system in the third embodiment. The processes of Steps ST1401 to ST1416 of FIG. 14 in the third embodiment are similar to those of the second embodiment, which are not illustrated and described here. Illustration and description are given from the process of Step ST1417 of FIG. 14. The sequence shown in FIG. 17 is similar to the sequences shown in FIGS. 14 to 16, where the same steps are denoted by the same step numbers and common description is not given here.

This operation example describes a case in which a base station A providing a plurality of cells (CCs) including a cell1 and a cell2 is present, where the UE selects the cell1 of the base station A as the best cell and camps on the cell1 to start communication, and thereafter, the cell2 is configured as a SCell. A case in which each cell notifies the control unit of the base station of "CSG-ID" of the own cell is disclosed as a specific example of the method in which a PCell knows whether or not another cell belongs to a CSG and knows a CSG-ID to which another cell belongs. The case of the time when a base station is installed is disclosed as a specific example of the timing at which "CSG-ID" is notified.

In Steps ST1701 and ST1702, each cell of the base station notifies the control unit of the base station of the configuration of the own cell. The configuration of the own cell contains "CSG-ID" in a case where the own cell belongs to the CSG. In this operation example, in a case of belonging to the CSG, the cell1 notifies the control unit of "CSG-ID" of the cell1 in Step ST1701. In a case of belonging to the CSG, the cell2 notifies the control unit of "CSG-ID" of the cell2 In Step ST1702.

In Step ST1703, the cell being a PCell inquires the control unit about the configuration of the cell being a SCell candidate selected in Step ST1504. The cell being a PCell may inquire the control unit about "CSG-ID" in a case of belonging to the CSG of the SCell candidate. In this operation example, the cell1 being a PCell inquires the control unit about "CSG-ID" in a case of belonging to the CSG of the cell2 selected as a SCell candidate.

In Step ST1704, the control unit responds to the inquiry from the cell being a PCell in Step ST1703. The control unit may notify the cell being a PCell of "CSG-ID" in a case of belonging to the CSG of an inquiry target cell. In this operation example, the control unit notifies the cell1 being a PCell of "CSG-ID" of the cell2 being an inquiry target cell in a case that the cell2 belongs to the CSG.

In Step ST1705, the cell being a PCell judges whether or not the cell being a SCell candidate selected in Step ST1504 has a CSG-ID. In other words, the cell being a PCell judges whether or not the SCell belongs to a CSG. In this judgment, the response results to the inquiry received from the control unit in Step ST1704 are used.

In a case of judging that the cell being a SCell candidate selected in Step ST1504 has a CSG-ID in Step ST1705, the cell being a PCell moves to Step ST1606. In other words, in a case of judging that the cell being a SCell candidate selected in Step ST1504 has a CSG-ID in Step ST1705, the cell being a PCell judges that the cell being a SCell candidate belongs to the CSG and moves to Step ST1606.

In a case of judging that the cell being a SCell candidate selected in Step ST1504 does not have a CSG-ID in Step ST1705, the cell being a PCell moves to, for example, Step ST1508, which is not specific to the present embodiment. In other words, in a case of judging that the cell being a SCell candidate selected in Step ST1504 does not have a CSG-ID in Step ST1705, the cell being a PCell judges that the cell being a SCell candidate does not belong to the CSG and moves to, for example, Step ST1508, which is not specific to the present embodiment.

Through the processes of Steps ST1705 and ST1606, only a cell (CC) belonging to the same CSG as that of the PCell can be configured as a SCell, which is specific to the present embodiment.

The third embodiment described above can achieve the following effects in addition to the effects of the second embodiment. Also as to the SCell, subscribers who are allowed to use can be specified by an operator. The SCell belongs to the CSG, whereby a user-friendly communication system can be constructed, in which wishes of users are taken into consideration, such as services that users want to receive or charging setting that users want to apply for.

The present embodiment can be used in combination with the first embodiment, second embodiment, and first modification of the second embodiment described above.

Fourth Embodiment

A fourth embodiment discloses another solution to the same problem as that of the third embodiment described above. The solution in the fourth embodiment is described below. The present embodiment mainly describes a portion different from the solution in the second embodiment described above, and a portion not to be described is similar to the second embodiment.

The base station cannot configure a cell (CC) belonging to a CSG as a SCell. The base station may render the cell (CC) belonging to the CSG inactive as a SCell. The base station can configure a cell (CC) not belonging to the CSG as a SCell. The base station may render the cell (CC) not belonging to the CSG active as a SCell.

The use of the solution in the present embodiment enables to prevent a user equipment unregistered with a CSG to which a cell belongs from using the resource of that cell as a SCell.

Further, the following may be done. A base station cannot configure a cell operating in a closed access mode as a SCell among the cells (CCs) belonging to the CSG. The base station may render a cell operating in a closed access mode inactive as a SCell among the cells (CCs) belonging to a CSG.

The base station can configure as a SCell, a cell (CC) not belonging to the CSG, a cell (CC) operating in an open access mode among the cells (CCs) belonging to the CSG, or a cell (CC) operating in a hybrid access mode among the cells (CCs) belonging to the CSG. The base station may render active as a SCell, a cell (CC) not belonging to the CSG, a cell (CC) operating in an open access mode among the cells (CCs) belonging to the CSG, or a cell (CC) operating in a hybrid access mode among the cells (CCs) belonging to the CSG.

As described above, if even access modes of cells belonging to the CSG are taken into consideration, cells that can be configured as a SCell increases compared with the above-mentioned method in which access modes are not taken into consideration. This enables to prevent a user equipment unregistered with the CSG to which a cell belongs from using a resource of the cell as a SCell while more easily improving a data rate using carrier aggregation compared with the above-mentioned method in which access modes are not taken into consideration.

The following is disclosed as a specific example of the operation of the MME. The MME regards access control for a user equipment via a cell configured as a SCell by a base station as access not from a user equipment via a CSG cell, and does not perform access control. The MME may regard the access control from a user equipment via a CSG cell configured as a SCell by a base station as access not from a user equipment via a CSG cell operating in a closed access mode and may not perform access control. The MME may perform only access control for a user equipment via a PCell. The MME may perform only access control from a user equipment via a PCell belonging to a CSG. The MME may only perform access control for a user equipment via a PCell being a CSG cell.

The following three (1) to (3) are disclosed as specific examples of the method in which a PCell knows whether or not another cell belongs to a CSG and, in a case where another cell belongs to the CSG, an access mode. Hereinafter, an access mode may be referred to as "operation mode".

(1) Before determining to configure a cell as a SCell, a PCell selects a SCell candidate cell. The PCell inquires the SCell candidate cell about whether or not the SCell candidate cell belongs to a CSG and, in a case where the SCell candidate cell belongs to a CSG, an operation mode.

The PCell may inquire about "CSG indication" and "CSG-ID" in place of inquiring about "whether or not belonging to the CSG" and "operation mode". In that case, if a response from the SCell does not contain a CSG-ID and a CSG indication is "FALSE", the PCell may judge that an indication that the SCell does not belong to a CSG or an indication the SCell belongs to a CSG and operates in an open access mode is shown.

In a case where the response from the SCell contains a CSG-ID and a CSG indication is "TRUE", the PCell may judge that it is shown that the SCell operates in a closed access mode in a case of belonging to a CSG. In a case where the response from the SCell includes a CSG-ID and a CSG indication is "FALSE", it may be judged that the SCell belongs to a CSG and operates in a hybrid access mode is shown.

(2) Each cell notifies the control unit of the base station of "whether or not the own cell belongs to a CSG" and, in a case where the own cell belongs to the CSG, notifies "CSG-ID". Before determining to configure a cell as a SCell, a PCell selects a SCell candidate cell. The PCell inquires the control unit about whether or not a SCell candidate cell belongs to a CSG and about an operation mode in a case where the SCell candidate cell belongs to the CSG. In place of inquiring about "whether or not belonging to the CSG" and about "operation mode", the PCell may inquire about "CSG indication" and "CSG-ID". The information shown by the combination of "CSG indication" and "CSG-ID" is similar to that of the specific example (1) described above.

(3) Each cell notifies another cell of "whether or not the own cell belongs to a CSG" and, in a case where the own cell belongs to the CSG, notifies "operation mode". In place of notifying "whether or not belonging to the CSG" and "operation mode", each cell may notify "CSG indication" and "CSG-ID". The information shown by the combination of "CSG indication" and "CSG-ID" is similar to that of the specific example (1) described above.

"Whether or not belonging to a CSG" in the specific examples (1) to (3) may be "indication of belonging to a CSG" or "indication of not belonging to the CSG".

A specific example of the timing at which "whether or not belonging to the CSG" and "operation mode" is similar to the specific example of the timing at which "SCell use configuration" is notified in the first modification of the second embodiment described above, which is not described here.

The PCell may select a SCell candidate cell set before determining to configure a cell as a SCell. A specific example of a SCell candidate cell set is similar to that of the first modification of the second embodiment described above, which is not described here.

A specific example of the operation of a user equipment is described below. The user equipment regards that a cell whose configuration content as a SCell has been notified is not a cell belonging to the CSG, and omits CSG access control, that is, CSG access restriction, in a user equipment. The user equipment may regard that a cell whose configuration content as a SCell has been notified is not a cell belonging to a CSG operating in a closed access mode and omit CSG access control, that is, CSG access restriction, in a user equipment. A specific example of the method in which a user equipment omits CSG access restriction is similar to that of the third embodiment described above, which is not described here.

Figure 18:
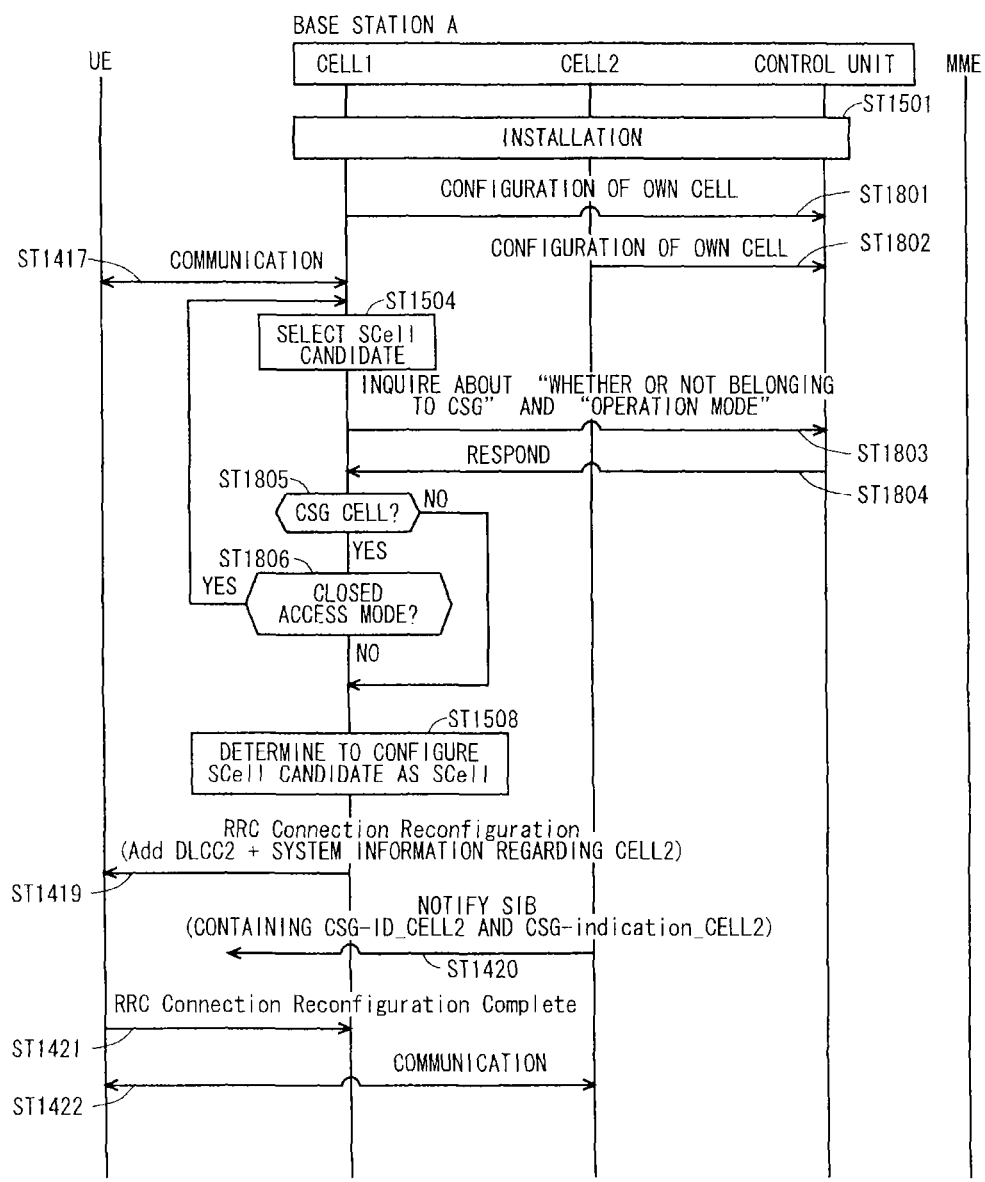
FIG. 18 is a diagram showing an example of a sequence of a communication system in a fourth embodiment.

Next, a specific example of a sequence of a communication system in the fourth embodiment is described with reference to FIG. 18. FIG. 18 is a diagram showing an example of the sequence of the communication system in the fourth embodiment. The processes of Steps ST1401 to ST1416 of FIG. 14 in the fourth embodiment are similar to those of the second embodiment, which are not illustrated and described here. Illustration and description are given from the process of Step ST1417 of FIG. 14. The sequence shown in FIG. 18 is similar to the sequences shown in FIGS. 14 and 15, where the same steps are denoted by the same step numbers and common description is not given here.

This operation example describes a case in which a base station A providing a plurality of cells (CCs) including a cell1 and a cell2 is present, where a UE selects the cell1 of the base station A as the best cell and camps on the cell1 to start communication, and thereafter, the cell2 is configured as a SCell. As a specific example of the method in which a PCell knows whether or not another cell belongs to a CSG and knows an operation mode in a case where another cell belongs to the CSG, a case in which each cell notifies the control unit of the base station of "whether or not the own cell belongs to a CSG" and "operation mode" in a case of belonging to the CSG is disclosed. The case of the time when a base station is installed is disclosed as a specific example of the timing at which "whether or not belonging to the CSG" and "operation mode" are notified.

In Step ST1501, a base station is installed. In this operation example, the base station A providing a plurality of cells (CCs) including the cell1 and the cell2 is installed.

In Steps ST1801 and ST1802, each cell of the base station notifies the control unit of the base station of the configuration of the own cell. The configuration of the own cell includes "whether or not belonging to the CSG" and "operation mode" in a case of belonging to the CSG. In this operation example, in Step ST1801, the cell1 notifies the control unit of "whether or not the cell1 belongs to a CSG" and "operation mode" in a case of belonging to the CSG. In Step ST1802, the cell2 notifies the control unit of "whether or not the cell2 belongs to a CSG" and "operation mode" in a case of belonging to the CSG.

Then, the processes of Steps ST1401 to ST1407 shown in FIG. 14 described above are performed, so that the UE selects the cell1 of the base station A as the best cell and camps on the cell1. Then, the processes of Steps ST1408 to ST1416 shown in FIG. 14 described above are performed, and then, the process proceeds to Step ST1417.

In Step ST1417, the cell being a PCell starts communication with the UE. In this operation example, the cell1 starts communication with the UE as a PCell.

In Step ST1504, the cell being a PCell selects another cell as a SCell candidate. In this operation example, the cell1 serving as a PCell selects the cell2 as a SCell candidate.

In Step ST1803, the cell being a PCell inquires the control unit about the configuration of the cell being a SCell candidate selected in Step ST1504. The cell being a PCell may inquire the control unit about "whether or not the SCell candidate belongs to a CSG" and "operation mode" in a case of belonging to a CSG. In this operation example, the cell1 being a PCell inquires the control unit about "whether or not the cell2 selected as a SCell candidate belongs to a CSG" and "operation mode" in a case of belonging to the CSG.

In Step ST1804, the control unit responds to the inquiry from for the cell being a PCell in Step ST1803. The control unit may notify the cell being a PCell of "whether or not an inquiry target cell belongs to a CSG" or "operation mode" in a case of belonging to the CSG. In this operation example, the control unit notifies the cell1 being a PCell of "whether or not the cell2 being an inquiry target cell belongs to a CSG" and "operation mode" in a case of belonging to the CSG.

In Step ST1805, the cell being a PCell judges whether or not the cell being a SCell candidate selected in Step ST1504 belongs to a CSG. In this judgment, the response results to the inquiry received from the control unit in Step ST1804 are used.

In a case of judging that the cell being a SCell candidate selected in Step ST1504 belongs to the CSG in Step ST1805, the cell being a PCell moves to Step ST1806. In a case of judging that the cell being a SCell candidate selected in Step ST1504 does not belong to the CSG in Step ST1805, the cell being a PCell moves to Step ST1508.

In Step ST1806, the cell being a PCell judges whether or not the operation mode of the cell being a SCell candidate selected in Step ST1504 is a closed access mode. In this judgment, the response results to the inquiry received from the control unit in Step ST1804 are used.

In a case of judging that the operation mode of the cell being a SCell candidate selected in Step ST1504 is not a closed access mode in Step ST1806, the cell being a PCell moves to Step ST1508. That is, in a case of judging that the operation mode of the cell being a SCell candidate selected in Step ST1504 is an open access mode or hybrid access mode in Step ST1806, the cell being a PCell moves to Step ST1508.

In a case of judging that the operation mode of the cell being a SCell candidate selected in Step ST1504 is a closed access mode in Step ST1806, the cell being a PCell returns to Step ST1504 to select another cell as a SCell candidate.

Through the processes of Steps ST1805 and ST1806, a cell (CC) not belonging to the CSG can be configured as a SCell, which is specific to the present embodiment. Alternatively, a cell (CC) not belonging to the CSG, a cell (CC) operating in an open access mode among the cells (CCs) belonging to the CSG, or a cell (CC) operating in a hybrid access mode among the cells (CCs) belonging to the CSG can be configured as a SCell.

In Step ST1508, the cell being a PCell determines to configure the cell being a SCell candidate as a SCell. In this operation example, the cell1 being a PCell determines to configure the cell2 being a SCell candidate as a SCell. In the present embodiment, in determination of a SCell, CSG access restriction is omitted assuming that the access is not from a user equipment via a CSG cell or that even if the access is from a user equipment via a CSG cell, which is not from an equipment via a CSG cell operating in a closed access mode. Specifically, the processes corresponding to Steps ST1410 to ST1415 are not performed in determination of a SCell in Step ST1508.

Next, another specific example of the sequence of the communication system in the fourth embodiment is described with reference to FIG. 19. FIG. 19 is a diagram showing another example of the sequence of the communication system in the fourth embodiment. The processes of Steps ST1401 to ST1416 of FIG. 14 in the fourth embodiment are similar to those of the second embodiment, which are not illustrated and described here. Illustration and description are given from the process of Step ST1417 of FIG. 14. The sequence shown in FIG. 19 is similar to the sequences shown in FIGS. 14, 15, and 18, where the same steps are denoted by the same step numbers and common description is not given here.

This operation example describes a case in which a base station A providing a plurality of cells (CCs) including a cell1 and a cell2 is present, where a UE selects the cell1 of the base station A as the best cell and camps on the cell1 to start communication, and then, the cell2 is configured as a SCell. As a specific example of the method in which a PCell knows whether or not another cell belongs to a CSG and knows an operation mode in a case where another cell belongs to the CSG, a case in which each cell notifies the control unit of the base station of "CSG indication" and "CSG-ID" of the own cell is disclosed. The case of the time when a base station is installed is disclosed as a specific example of the timing at which "CSG indication" and "CSG-ID" are notified.

In Steps ST1901 and ST1902, each cell of the base station notifies the control unit of the base station of the configuration of the own cell. The configuration of the own cell includes "CSG indication" and "CSG-ID". In this operation example, in Step ST1901, the cell1 notifies the control unit of "CSG indication" and "CSG-ID" of the cell1. In Step ST1902, the cell2 notifies the control unit of "CSG indication" and "CSG-ID" of the cell2.

In Step ST1903, the cell being a PCell inquires the control unit about the configuration of the cell being a SCell candidate selected in Step ST1504. The cell being a PCell may inquire the control unit about "CSG indication" and "CSG-ID" of the SCell candidate. In this operation example, the cell1 being a PCell inquires the control unit about "CSG indication" and "CSG-ID" of the cell2 selected as a SCell candidate.

In Step ST1904, the control unit responds to the inquiry from the cell being a PCell in Step ST1903. The control unit may notify the cell being a PCell of "CSG indication" and "CSG-ID" of the inquiry target cell. In this operation example, the control unit notifies the cell1 being a PCell of "CSG indication" and "CSG-ID" of the cell2 being an inquiry target cell.

In Step ST1905, the cell being a PCell judges whether or not the cell being a SCell candidate selected in Step ST1504 has a CSG-ID. In other words, the cell being a PCell judges whether or not the SCell belongs to the CSG. In this judgment, the response results to the inquiry received from the control unit in Step ST1904 are used.

In a case of judging that the cell being a SCell candidate selected in Step ST1504 has a CSG-ID in Step ST1905, the cell being a PCell moves to Step ST1906. In other words, in a case of judging that the cell being a SCell candidate selected in Step ST1504 has a CSG-ID in Step ST1905, the cell being a PCell judges that the cell being a SCell candidate belongs to the CSG, and then moves to Step ST1906.

In a case of judging that the cell being a SCell candidate selected in Step ST1504 does not have a CSG-ID in Step ST1905, the cell being a PCell moves to Step ST1508. In other words, in a case of judging that the cell being a SCell candidate selected in Step ST1504 does not have a CSG-ID in Step ST1905, the cell being a PCell judges that the cell being a SCell candidate does not belong to the CSG, and then moves to Step ST1508.

In Step ST1906, the cell being a PCell judges whether or not the CSG indication of the cell being a SCell candidate selected in Step ST1504 is "TRUE". In other words, the cell judges whether or not the access mode of the SCell is a closed access mode. In this judgment, the response results to the inquiry received from the control unit in Step ST1904 are used.

In a case of judging that the CSG indication of the cell being a SCell candidate selected in Step ST1504 is not "TRUE", that is, is "FALSE" in Step ST1906, the cell being a PCell moves to Step ST1508. In other words, in a case of judging that the operation mode of the cell being a SCell candidate selected in Step ST1504 is an open access mode or hybrid access mode in Step ST1906, the cell being a PCell moves to Step ST1508.

In a case of judging that the CSG indication of the SCell candidate selected in Step ST1504 is "TRUE" in Step ST1906, the cell being a PCell returns to Step ST1504 to select another cell as a SCell candidate. In other words, in a case of judging that the operation mode of the cell being a SCell candidate selected in Step ST1504 is a closed access mode in Step ST1906, the cell being a PCell returns to Step ST1504 to select another cell as a SCell candidate.

Through the processes of Steps ST1905 and ST1906, a cell (CC) not belonging to the CSG can be configured as a SCell, which is specific to the present embodiment. Alternatively, a cell (CC) not belonging to the CSG, a cell (CC) operating in an open access mode among the cells (CCs) belonging to the CSG, or a cell (CC) operating in a hybrid access mode among the cells (CCs) belonging to the CSG can be configured as a SCell.

The fourth embodiment described above can achieve the following effects in addition to the effects of the second embodiment. Also as to the SCell, subscribers who are allowed to use can be specified by an operator. The SCell belongs to the CSG, whereby a user-friendly communication system can be constructed, in which wishes of users are taken into consideration, such as services that users want to receive or charging setting that users want to apply for.

The present embodiment can be used in combination with the first embodiment, second embodiment, first modification of the second embodiment, and third embodiment descried above.

Fifth Embodiment

A fifth embodiment discloses another solution to the same problem of the third embodiment described above, that is, a problem that occurs in a case where the second embodiment described above is used. The present embodiment solves the problem of the second embodiment described above by a method different from the solution of the second embodiment.

Before determining to configure a cell as a SCell, a PCell selects a SCell candidate cell. The cell being a PCell notifies a user equipment of the configuration content of the SCell candidate cell. The user equipment that has received the configuration content of the SCell candidate cell performs CSG access restriction on a cell whose configuration content has been notified as a SCell candidate cell. The user equipment notifies the PCell of the judgment results of CSG access restriction. The PCell that has received the judgment results determines a SCell based on the judgment results.

The PCell may select a SCell candidate cell set before determining to configure a cell as a SCell. The contents of the configuration of the SCell candidate cell which are notified a user equipment by a PCell may be the configuration content of the SCell candidate cell set. Alternatively, CSG access restriction that is performed by a user equipment may be directed to a SCell candidate cell set. A specific example of the SCell candidate cell set is similar to that of the first modification of the second embodiment described above, which is not described here.

With the use of the solution of the present embodiment, a user equipment performs CSG access restriction on a SCell. This enables to prevent a cell belonging to a CSG with which a user equipment has been unregistered from being configured as a SCell for the user equipment while improving a data rate using carrier aggregation. Accordingly, it is possible to prevent a user equipment unregistered with a CSG to which a cell belongs from using a resource of the cell as a SCell.

A specific example of the operation of a user equipment is disclosed below. The user equipment performs CSG access restriction on a cell whose configuration content has been notified as a SCell candidate cell. The user equipment may perform CSG access restriction in a case where the SCell candidate cell is a CSG cell. The following three (1) to (3) are disclosed as specific examples of the method in which a user equipment performs CSG access restriction.

(1) A user equipment performs access restriction with the CSG-indication and CSG-ID of the SCell candidate cell in the configuration content as a SCell candidate cell. For example, the CSG-ID of the SCell candidate cell contained in the configuration content as a SCell candidate cell and the CSG-ID in the USIM of the user equipment are compared. In a case where the CSG-ID of the SCell candidate cell contained in the configuration content as a SCell candidate cell is contained in the whitelist of, for example, the USIM of the user equipment as a result of the comparison, it is judged that access is allowed. Meanwhile, in a case where the CSG-ID of the SCell candidate cell contained in the configuration content as a SCell candidate cell is not contained in the whitelist of the USIM of the user equipment as a result of the comparison, it is judged that access is not allowed.

(2) A user equipment performs access restriction with the CSG-indication and CSG-ID broadcast from a cell configured as a SCell candidate cell using the broadcast information. For example, the CSG-ID broadcast from a cell configured as a SCell candidate cell using the broadcast information and the CSG-ID in the USIM of the user equipment are compared. In a case where the CSG-ID broadcast from the cell configured as a SCell candidate cell using the broadcast information is contained in the whitelist of, for example, the USIM of the user equipment, it is judged that access is allowed. Meanwhile, in a case where the CSG-ID broadcast from the cell configured as a SCell candidate cell using the broadcast information is not contained in the whitelist of, for example, the USIM of the user equipment, it is judged that access is not allowed.

(3) Combination of (1) and (2) above.

The following three (1) to (3) are disclosed as specific examples of the conditions when a user equipment notifies a PCell of the judgment results of CSG access restriction.

(1) A user equipment makes a notification in a case of having performed CSG access restriction. In this specific example, the judgment results are always notified. This makes it easier to detect a communication error occurring in a radio area. Accordingly, an effect that a system more resistant to a communication error can be constructed compared with the specific examples (2) and (3) can be achieved.

(2) A user equipment makes a notification in a case where the judgment results of CSG access restriction show "access is not allowed". In a case of not receiving the judgment results of CSG access restriction from a user equipment for a certain period, the PCell may judge that the judgment results of CSG access restriction show "access is allowed". In this specific example, an effect that a radio resource can be used more effectively compared with the specific example (1) can be achieved.

(3) A user equipment makes a notification in a case where the judgment results of CSG access restriction show "access is allowed". In a case of not receiving the judgment results of CSG access restriction from a user equipment for a certain period, the PCell may judge that the judgment results of CSG access restriction show "access is not allowed". In this specific example, an effect that a radio resource can be used more effectively compared with the specific example (1) can be achieved.

A specific example of the method in which a user equipment notifies a PCell of the judgment results of CSG access restriction is described. The user equipment notifies the PCell of the judgment results of CSG access restriction through RRC signaling or using an RRC message.

The following two (1) and (2) are disclosed as specific examples of the method in which a user equipment notifies a PCell of the judgment results of CSG access restriction using an RRC message.

(1) RRC signaling or RRC message is newly provided. Parameters to be mapped to the newly-provided RRC signaling are the judgment results of CSG access restriction.

The judgment results of CSG access restriction may be notified together with a user equipment identifier. The user equipment identifier may be UE-ID or IMSI.

(2) Existing RRC signaling or RRC message is used. The parameters required to be added to the existing RRC signaling are the judgment results of CSG access restriction. The specific example (2) is more effective than the specific example (1) in that signaling is not required to be newly provided, whereby a communication system can be prevented from becoming complex.

Next, a specific example of the method in which a user equipment notifies the judgment results of CSG access restriction with the existing RRC signaling is disclosed below. The method disclosed in Non-Patent Document 2 is used. Specifically, the method of responding to "RRC Connection Reconfiguration message" of RRC signaling, which is studied to be used in addition or modification of a SCell, is used.

The existing method of responding to "RRC Connection Reconfiguration message" is described. In a case where the user equipment has successfully finished the reconfiguration instructed by "RRC Connection Reconfiguration message", the user equipment notifies a base station of "RRC Connection Reconfiguration complete". In a case where the user equipment has not successfully finished the reconfiguration instructed by "RRC Connection Reconfiguration message", the user equipment notifies the base station of "RRC Connection reestablishment REQUEST" for requesting RRC connection re-establishment.

A specific example of a case in which the existing responding method is used is disclosed below. In a case where the judgment results of CSG access restriction show "access is allowed", the user equipment recognizes that the reconfiguration instructed by "RRC Connection Reconfiguration message" has been successfully finished, and then notifies a PCell of "RRC Connection Reconfiguration complete". Upon notification of "RRC Connection Reconfiguration complete", if the judgment results of CSG access restriction show "access is allowed", it is not required to newly provide RRC signaling and to add new parameters. This enables to construct a communication system having excellent backward compatibility.

Alternatively, parameters being the judgment results of CSG access restriction may be added to "RRC Connection Reconfiguration message". Accordingly, the judgment results of CSG access restriction can be explicitly notified. This allows explicit distinction from "RRC Connection Reconfiguration complete" in a case where the judgment results of CSG access restriction are not notified, to thereby achieve an effect that a stable communication system can be constructed.

Meanwhile, in a case where the judgment results of CSG access restriction show "access is not allowed", the existing method of responding to "RRC Connection Reconfiguration message" suffers from a drawback described below. In the existing responding method, in a case where the reconfiguration instructed by "RRC Connection Reconfiguration message" has been not successfully finished, "RRC Connection reestablishment REQUEST" is notified as described above.

Note that if the judgment results of CSG access restriction show "access is not allowed", there is no problem in RRC connection with a PCell, which does not require RRC connection re-establishment. Therefore, in a case where the judgment results of CSG access restriction show "access is not allowed", a user equipment does not notify a PCell of "RRC Connection reestablishment REQUEST" though it has not successfully finished the reconfiguration instructed by "RRC Connection Reconfiguration message". This enables to prevent unnecessary RRC connection re-establishment, leading to an effect that control delays of a communication system can be prevented.

The following two (a1) and (a2) are disclosed as specific examples of the notification method in a case where the judgment results of CSG access restriction show "access is not allowed".

(a1) RRC signaling or RRC message is newly provided. A parameter to be mapped to the newly-provided RRC signaling is "access is not allowed".

(a2) The existing RRC signaling or RRC message is used. A parameter required to be added to the existing RRC signaling is "access is not allowed". The specific example (a2) is more effective than the specific example (a1) in that signaling needs not to be newly provided, which enables to prevent a communication system from becoming complex. Specific examples of the existing RRC signaling include "RRC Connection Reconfiguration complete".

A specific example of the operation of a base station is disclosed below. The base station selects a SCell candidate cell before a PCell determines to configure the SCell candidate cell as a SCell. The PCell notifies the user equipment of the configuration content of the SCell candidate cell. The PCell receives, from the user equipment, the judgment results of CSG access restriction performed by the user equipment. The PCell that has received the judgment results determines a SCell based on the judgment results.

Disclosed below is a specific example in which a user equipment determines a SCell based on the judgment results of CSG access restriction performed by the user equipment. A case in which "access is allowed" is received from the user equipment as the judgment results of CSG access restriction performed by the user equipment is disclosed. The PCell determines to configure a SCell candidate cell as a SCell. Alternatively, the PCell may judge that a SCell candidate cell can be rendered active.

Disclosed here is a case in which "access is not allowed" is received from a user equipment as the judgment results of CSG access restriction performed by the user equipment. The PCell determines not to configure a SCell candidate cell as a SCell. Alternatively, the PCell determines to eliminate a SCell candidate cell from the SCell candidate cell. Still alternatively, the PCell may judge that the SCell candidate cell cannot be rendered active.

A specific example of the operation of an MME is disclosed below. The MME does not perform access control for a user equipment via a cell configured as a SCell by the base station. The MME may recognize that access control by a cell configured as a SCell by the base station has been finished on the user equipment side and omit CSG access control by the MME. The MME may only perform access control for a user equipment via a PCell. The MME may only perform access control for a user equipment via a PCell belonging to a CSG. The MME may only perform access control for a user equipment via a PCell being a CSG cell.

Next, a specific example of a sequence of a communication system in the fifth embodiment is described with reference to FIG. 20. FIG. 20 is a diagram showing an example of the sequence of the communication system in the fifth embodiment. The processes of Steps ST1401 to ST1416 of FIG. 14 in the fifth embodiment are similar to those of the second embodiment, which are not illustrated and described here. Illustration and description are given from the process of Step ST1417 of FIG. 14. The sequence shown in FIG. 20 is similar to the sequences shown in FIGS. 14 and 15, where the same steps are denoted by the same step numbers and common description is not given here.

This operation example describes a case in which a base station A providing a plurality of cells (CCs) including a cell1 and a cell2 is present, where a user equipment (UE) selects the cell1 of the base station A as the best cell and camps on the cell1 to start communication, and thereafter, the cell2 is configured as a SCell.

A case in which access restriction is performed with the CSG-indication and CSG-ID of a SCell candidate cell in the configuration content as a SCell candidate cell is disclosed as a specific example of the method in which a user equipment performs CSG access restriction. Disclosed below is a case in which a user equipment performs CSG access restriction as a specific example of the conditions when a user equipment notifies a PCell of the judgment results of CSG access restriction. A case in which "RRC Connection Reconfiguration complete" being the existing RRC signaling is used for "access is allowed" as well as "access is not allowed" is disclosed as a specific example of the method in which a user equipment notifies a PCell of the judgment results of CSG access restriction.

After the processes of Steps ST1401 to ST1416 shown in FIG. 14 described above are performed, in Step ST1417, the cell being a PCell, which is the cell1 in this operation example, starts communication with a user equipment (UE). Then, in Step ST1504, the cell being a PCell selects another cell as a SCell candidate. In this operation example, the cell1 serving as a PCell selects the cell2 as a SCell candidate.

In Step ST2001, the cell being a PCell notifies a user equipment (UE) of the configuration content of the SCell candidate cell using dedicated RRC signaling. In this operation example, the cell2 as a SCell candidate cell and the configuration content of the cell2 are notified using "RRC Connection Reconfiguration message" of dedicated RRC signaling. On that occasion, the system information of the cell2 is notified as well. Specifically, the information related to access to the cell2, for example, CSG-ID_cell2 or the like is notified as a CSG identity and CSG-indication_cell2 or the like is notified as a CSG indication.

In Step ST2002, the cell2 broadcasts a SIB to user equipments being served thereby. Specifically, the information related to access to the cell2, for example, CSG-ID_cell2 or the like is broadcast as a CSG identity and CSG-indication_cell2 or the like is broadcast as CSG indication. This operation example discloses a case in which access restriction is performed with the CSG-indication and CSG-ID of a SCell candidate cell in the configuration content as a SCell candidate cell. Therefore, the user equipment may or may not receive the broadcast information from the cell2.

In Step ST2003, the user equipment (UE) judges whether or not the CSG indication in the configuration content of the SCell candidate cell that has been received in Step ST2001 is "TRUE". In this operation example, the user equipment judges whether or not CSG-indication_cell2 is "TRUE". In a case of judging that the CSG indication is "TRUE" in Step ST2003, the user equipment moves to Step ST2004. In a case of judging that the CSG indication is not "TRUE", that is, is "FALSE", in Step ST2003, the user equipment moves to Step ST2005.

In Step ST2004, the user equipment (UE) judges whether or not the own user equipment has been registered with the CSG indicated by the CSG identity in the configuration content of the SCell candidate cell that has been received in Step ST2001. In a case of judging that the own user equipment has been registered in Step ST2004, the user equipment moves to Step ST2005. In a case of judging that the own user equipment has been unregistered in Step ST2004, the user equipment moves to Step ST2006.

Through the processes of Steps ST2003 and ST2004, a user equipment can perform CSG access restriction on a cell whose configuration content has been notified as a SCell candidate cell, which is specific to the present embodiment.

In Step ST2005, the user equipment (UE) sets "access is allowed" or "access is OK" as the judgment results of CSG access restriction. In this operation example, the user equipment sets "access is OK" in "RRC Connection Reconfiguration complete" as the judgment results of CSG access restriction.

In Step ST2006, the user equipment (UE) sets "access is not allowed" or "access is NG" as the judgment results of CSG access restriction.

In Step ST2007, the user equipment notifies the cell being a PCell of "RRC Connection Reconfiguration Complete" in response to "RRC Connection Reconfiguration" received in Step ST2007. The user equipment may notify the cell being a PCell of "RRC Connection Reconfiguration Complete". "RRC Connection Reconfiguration Complete" includes the access judgment results set in Step ST2005 or Step ST2006.

In Step ST2008, the cell being a PCell judges whether or not the judgment results of CSG access restriction on the cell being a SCell candidate selected in Step ST1504 in the user equipment show that access is allowed or OK. The PCell may judge whether or not the judgment results of CSG access restriction on the cell being a SCell candidate in the user equipment show that access is not allowed. The access judgment results received from the user equipment in Step ST2007 are used in this judgment.

In a case of judging that the judgment results of CSG access restriction on the cell being a SCell candidate selected in Step ST1504 in the user equipment show that access is allowed in Step ST2008, the cell being a PCell moves to Step ST1508. In a case of judging that the judgment results of CSG access restriction on the cell being a SCell candidate selected in Step ST1504 in the user equipment show that access is not allowed, the cell being a PCell returns to Step ST1504 to select another cell as a SCell candidate. In this operation example, the cell1 being a PCell judges that the cell2 being a SCell candidate is accessible as a SCell, and then moves to Step ST1508.

Through the process of Step ST2008, the cell being a PCell can determine a SCell based on the judgment results of CSG access restriction by a user equipment, which is specific to the present embodiment.

The fifth embodiment described above can achieve the following effects. As in the third embodiment described above, subscribers who are allowed to use the SCell can be specified by an operator. In addition, it is possible to configure a cell corresponding to one or a plurality of CSG-IDs in a whitelist of a UE as SCells. Further, the SCell belongs to a CSG, whereby a user-friendly communication system can be constructed, in which wishes of users are taken into consideration, such as services that users want to receive or charging setting that users want to apply for. Besides, as in the second embodiment described above, the operation as a communication system can be stabilized while improving a data rate using carrier aggregation, which enables to appropriately provide services.

The present embodiment can be used in combination with the first embodiment described above.

First Modification of Fifth Embodiment

The present modification describes a point to be further improved in the fifth embodiment described above. The present modification mainly describes a portion different from the solution in the fifth embodiment described above, and a portion not to be described is similar to the fifth embodiment.

The PCell selects a SCell candidate cell before determining to configure a cell as a SCell. Whether or not a user equipment (UE) unregistered with a CSG can use each cell (CC) as a SCell can be configured. This configuration may be referred to as "SCell use configuration of a UE unregistered with a CSG". The PCell notifies the user equipment of the configuration content of the SCell candidate cell and "SCell use configuration of a UE unregistered with a CSG" of the cell. The user equipment that has received the configuration content of the SCell candidate cell and "SCell use configuration of a UE unregistered with a CSG" of the cell performs CSG access restriction on the SCell candidate cell also in consideration of "SCell use configuration of a UE unregistered with a CSG".

Alternatively, the PCell selects a SCell candidate cell before determining to configure a cell as a SCell. The configuration can be made as to whether or not a user equipment (UE) unregistered with a CSG can use each cell (CC) as a SCell. This configuration may be referred to as "SCell use configuration of a UE unregistered with a CSG". In a case where "SCell use configuration of a UE unregistered with a CSG" of the SCell candidate cell is "cannot be used", the PCell notifies the user equipment of the configuration content of the SCell candidate cell.

The user equipment that has received the configuration content of the SCell candidate cell performs CSG access restriction on a cell whose configuration content has been notified as a SCell candidate cell. The user equipment notifies the PCell of the judgment results of CSG access restriction. The PCell that has received the judgment results may determine a SCell based on the judgment results. In other words, in a case where "SCell use configuration of a UE unregistered with a CSG" of the SCell candidate cell is "can be used", the PCell may not perform determination of a SCell based on the judgment results of CSG access restriction of a user equipment.

The following three (1) to (3) are disclosed as specific examples of the SCell use configuration of a UE unregistered with a CSG. (1) Whether or not a UE unregistered with a CSG can use a cell as a SCell. (2) Indication that a UE unregistered with a CSG can use a cell as a SCell. This enables to achieve an effect of a smaller amount of information compared with the specific example of (1). (3) Indication that a UE unregistered with a CSG cannot use a cell as a SCell. This enables to achieve an effect of a smaller amount of information compared with the specific example (1).

A specific example of the method in which a PCell knows "SCell use configuration of a UE unregistered with a CSG" of another cell is similar to the specific example of the method in which a PCell knows "SCell use configuration" of another cell in the first modification of the second embodiment described above, which is not described here.

A specific example of the timing at which "SCell use configuration of a UE unregistered with a CSG" is notified is similar to the specific example of the timing at which "SCell use configuration" is notified in the first modification of the second embodiment described above, which is not described here.

The PCell may select a SCell candidate cell set before determining to configure a cell as a SCell. The contents of the configuration of the SCell candidate cell, which are notified the user equipment by the PCell, may be the configuration content of the SCell candidate cell set. CSG access restriction performed by the user equipment may be directed to the SCell candidate cell set. A specific example of the SCell candidate cell set is similar to that of the first modification of the second embodiment described above, which is not described here.

A specific example of the method in which a user equipment performs CSG access restriction on the SCell candidate cell also in consideration of "SCell use configuration of a UE unregistered with a CSG" is disclosed below. In a case where it is shown that "SCell use configuration of a UE unregistered with a CSG" can be used, a user equipment judges that a SCell candidate cell can be used as a SCell even if the UE has been unregistered with the CSG, and does not perform CSG access restriction on the SCell candidate cell. In a case where it is shown that "SCell use configuration of a UE unregistered with a CSG" cannot be used, the user equipment performs CSG access restriction.

Figure 21:
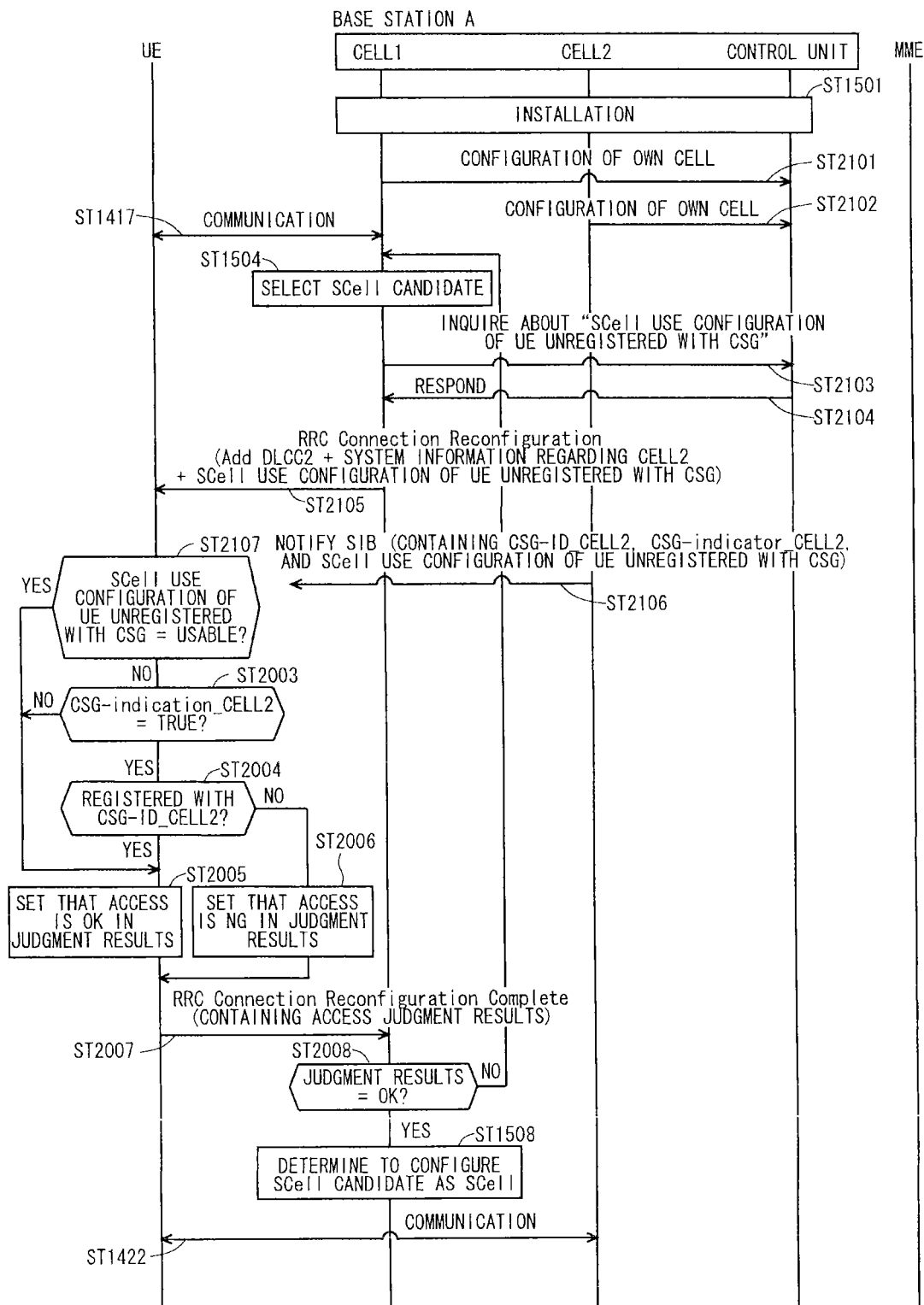
FIG. 21 is a diagram showing an example of a sequence of a communication system in a first modification of the fifth embodiment.

Next, a specific example of a sequence of a communication system in the first modification of the fifth embodiment is described with reference to FIG. 21. FIG. 21 is a diagram showing an example of the sequence of the communication system in the first modification of the fifth embodiment. The processes of Steps ST1401 to ST1416 of FIG. 14 described above in the first modification of the fifth embodiment are similar to those of the second embodiment, which are not illustrated and described here. Illustration and description are given from the process of Step ST1417 of FIG. 14. The sequence shown in FIG. 21 is similar to the sequences shown in FIGS. 14, 15, and 20, where the same steps are denoted by the same step numbers and common description is not given here.

This operation example describes a case in which a base station A providing a plurality of cells (CCs) including a cell1 and a cell2 is present, where the user equipment (UE) selects the cell1 of the base station A as the best cell and camps on the cell1 to start communication, and thereafter, the cell2 is configured as a SCell.

A case in which a user equipment performs access restriction with the CSG-indication and CSG-ID of a SCell candidate cell in the configuration content as a SCell candidate cell is described as a specific example of a method in which a user equipment performs CSG access restriction. A case where a user equipment performs CSG access restriction is disclosed as a specific example of the conditions when the user equipment notifies a PCell of the judgment results of CSG access restriction. A case in which "RRC Connection Reconfiguration complete" being the existing RRC signaling is used for "access is allowed" as well as "access is not allowed" is disclosed as a specific example of the method in which a user equipment notifies a PCell of the judgment results of CSG access restriction.

A case in which each cell notifies the control unit of the base station of "SCell use configuration of a UE unregistered with a CSG" of the own cell is disclosed as a specific example of the method in which a PCell knows "SCell use configuration of a UE unregistered with a CSG". A case of the time when a base station is installed is disclosed as a specific example of the timing at which "SCell use configuration of a UE unregistered with a CSG" is notified.

In Step ST1501, a base station is installed. In this operation example, the base station A providing a plurality of cells (CCs) including the cell1 and cell2 is installed.

In Steps ST2101 and ST2102, each cell of the base station notifies the control unit of the base station of the configuration of the own cell. The configuration of the own cell includes "SCell use configuration of a UE unregistered with a CSG". In this operation example, in Step ST2101, the cell1 notifies the control unit of "SCell use configuration of a UE unregistered with a CSG" of the cell1. In Step ST2102, the cell2 notifies the control unit of "SCell use configuration of a UE unregistered with a CSG" of the cell2.

Then, the processes of Steps ST1401 to T1407 shown in FIG. 14 described above are performed, so that the user equipment (UE) selects the cell1 of the base station A as the best cell and camps on the cell1. Then, the processes of Steps ST1408 to ST1416 shown in FIG. 14 described above are performed, and then, the process moves to Step ST1417.

In Step ST1417, the cell being a PCell starts communication with the user equipment. In this operation example, the cell1 starts communication with the user equipment as a PCell.

In Step ST1504, the cell being a PCell selects another cell as a SCell candidate. In this operation example, the cell1 serving as a PCell selects the cell2 as a SCell candidate.

In Step ST2103, the cell being a PCell inquires the control unit about the configuration of the cell being a SCell candidate selected in Step ST1504. The cell being a PCell may inquire the control unit about "SCell use configuration of a UE unregistered with a CSG" of the SCell candidate. In this operation example, the cell1 being a PCell inquires the control unit about "SCell use configuration of a UE unregistered with a CSG" of the cell2 selected as a SCell candidate.

In Step ST2104, the control unit responds to the inquiry from the cell being a PCell in Step ST2103. The control unit may notify the cell being a PCell of "SCell use configuration of a UE unregistered with a CSG" of the inquiry target cell. In this operation example, the control unit notifies the cell1 being a PCell of "SCell use configuration of a UE unregistered with a CSG" of the cell2 being an inquiry target cell.

In Step ST2105, the cell being a PCell notifies the user equipment of the SCell candidate cell and the configuration content of the SCell candidate cell using dedicated RRC signaling. In this operation example, the cell2 as a SCell candidate cell and the configuration content of the cell2 are notified using "RRC Connection Reconfiguration message" of dedicated RRC signaling. On that occasion, the system information of the cell2 and "SCell use configuration of a UE unregistered with a CSG" are notified as well. Specifically, the information related to access to the cell2, for example, CSG-ID_cell2 or the like is notified as a CSG identity and CSG-indication_cell2 or the like is notified as a CSG indication.

In Step ST2106, the cell2 broadcasts the SIB to user equipments being served thereby. On that occasion, "SCell use configuration of a UE unregistered with a CSG" of the cell2 may be broadcast as well. Specifically, the information related to access to the cell2, for example, CSG-ID_cell2 or the like is broadcast as a CSG identity and CSG-indication_cell2 or the like is broadcast as a CSG indication. This operation example discloses a case in which access restriction is performed using the CSG-indication and CSG-ID of a SCell candidate cell in the configuration content as a SCell candidate cell. Therefore, the user equipment may or may not receive the broadcast information from the cell2.

In Step ST2107, the user equipment (UE) judges whether or not the SCell candidate cell received in Step ST2105 can be used as a SCell by a UE unregistered with the CSG. "SCell use configuration of a UE unregistered with a CSG" received from the cell in Step ST2105 is used in this judgment.

In a case of judging that the SCell candidate cell received in Step ST2105 can be used as a SCell by a UE unregistered with a CSG in Step ST2107, the user equipment (UE) moves to Step ST2005. In a case of judging that the SCell candidate cell received in Step ST2105 cannot be used as a SCell by a UE unregistered with a CSG in Step ST2107, the user equipment moves to Step ST2003.

The first modification of the fifth embodiment described above can achieve the following effects in addition to the effects of the fifth embodiment described above. Whether or not the UE unregistered with a CSG can use a cell as a SCell can be set in units of cells in a base station. Accordingly, the cells can be operated with more precision.

The present modification can be used in combination with the first embodiment described above.

Sixth Embodiment

A sixth embodiment describes another solution to the same problem as that of the third embodiment described above, that is, the problem occurring in a case where the second embodiment described above is used. The solution in the sixth embodiment is described below. The present embodiment solves the problem in the second embodiment by a method different from the solution of the second embodiment.

A base station (cell) configures a SCell in consideration of the CSG registration situation of the user equipment. This enables to prevent the user equipment from configuring, as a SCell, a cell belonging to a CSG with which the user equipment has been unregistered for the user equipment. Accordingly, the user equipment unregistered with the CSG to which the cell belongs can be prevented from using the resource of the cell as a SCell while improving a data rate using carrier aggregation. The CSG registration situation of a user equipment corresponds to a situation in which a user equipment (UE) is allowed to access a SCell candidate cell.

A specific example of the method in which a base station (cell) configures a SCell in consideration of the CSG registration situation of the user equipment is disclosed below. The cell can configure a cell (CC) that does not belong to a CSG as a SCell. The cell can configure, as a SCell, a cell (CC) operating in an open access mode or a cell (CC) operating in a hybrid access mode among the cells (CCs) belonging to the CSG. The cell can configure, as a SCell, a cell (CC) belonging to the same CSG as a CSG with which the user equipment has been registered among the cells (CCs) belonging to the CSG. The cell cannot configure, as a SCell, a cell (CC) that operates in a closed access mode and belongs to the CSG with which the user equipment has been unregistered among the cells (CCs) belonging to the CSG.

In a case of configuring, as a SCell, a cell (CC) operating in a hybrid access mode among the cells (CCs) belonging to the CSG, the base station (cell) may perform as follows. The base station (cell) can configure, as a SCell, the cell (CC) for a user equipment registered with the CSG to which the cell belongs in preference to a user equipment unregistered with the CSG.

The following three (1) to (3) are disclosed as specific examples of the method in which a PCell knows whether or not another cell belongs to the CSG, an operation mode in a case where another cell belongs to the CSG, and a CSG-ID in a case where another cell belongs to the CSG.

(1) A PCell selects a SCell candidate cell before determining to configure a cell as a SCell. The PCell inquires the SCell candidate cell about whether or not the SCell candidate cell belongs to the CSG, a CSG-ID to which the SCell candidate cell belongs, and an operation mode of the SCell candidate cell.

The PCell may inquire about "CSG indication" and "CSG-ID". In that case, in a case where a response from the SCell does not contain a CSG-ID and the CSG indication is "FALSE", the PCell may judge that the SCell does not belong to the CSG or that the SCell belongs to the CSG and operates in an open access mode. In a case where a response from the SCell contains a CSG-ID and the CSG indication is "TRUE", the PCell may judge that the SCell belongs to the CSG and operates in a closed access mode. In a case where a response from the SCell contains a CSG-ID and the CSG indication is "FALSE", the PCell may judge that the SCell belongs to the CSG and operates in a hybrid access mode.

The PCell may select a SCell candidate cell set before determining to configure a cell as a SCell. In this case, the PCell may inquire the SCell candidate cell set about the above.

(2) Each cell notifies the control unit of the base station of "whether or not the own cell belongs to a CSG", "CSG-ID" in a case where the own cell belongs to the CSG, and "operation mode" in a case where the own cell belongs to the CSG. The PCell selects a SCell candidate cell before determining to configure a cell as a SCell. The PCell inquires the control unit about whether or not a SCell candidate cell belongs to the CSG, a CSG-ID to which the SCell candidate cell belongs, and an operation mode. The PCell may inquire about "CSG indication" and "CSG-ID". The information shown by the combination of "CSG indication" and "CSG-ID" is similar to that of the specific example (1) described above. The PCell may select a SCell candidate cell set before determining to configure a cell as a SCell. In this case, the PCell may inquire the SCell candidate cell set about the above.

(3) Each cell notifies another cell of "whether or not the own cell belongs to a CSG", "CSG-ID" in a case where the own cell belongs to the CSG", and "operation mode" in a case where the own cell belongs to the CSG. Each cell may notify "CSG indication" and "CSG-ID". The information shown by the combination of "CSG indication" and "CSG-ID" is similar to that of the specific example (1) described above.

"Whether or not belonging to a CSG" in the specific examples (1) to (3) described above may be "indication of belonging to the CSG" or "indication of not belonging to the CSG".

A specific example of the timing at which "whether or not belonging to the CSG", "CSG-ID", and "operation mode" are notified is similar to the specific example of the timing at which "SCell use configuration" is notified in the first modification of the second embodiment described above, which is not described here.

The following two (1) and (2) are disclosed as specific examples of the method in which a base station (cell) knows a CSG registration situation of a user equipment.

(1) A base station (cell) knows a CSG registration situation of a user equipment via an MME. The MME may notify the cell of the CSG registration situation of the user equipment during a telephone call, during communication, or during CONNECTED via the cell. This notification may be a registration situation of the user equipment with one or a plurality of CSGs to which a base station providing cells belongs. As a result, the cell does not notify the information not to be used in selection of a SCell, leading to an effect that communication resources can be used effectively. The following two (a1) and (a2) are disclosed as specific examples of a trigger to the notification.

(a1) The MME makes a notification spontaneously. (a2) The MME makes a notification, triggered by a request to the MME by a cell. The cell may make the request in determination of a SCell candidate cell. Alternatively, the cell may request a notification of a registration situation of the user equipment with the CSG to which the SCell candidate cell belongs. It suffices that in that case, the MME notifies the registration situation of the user equipment with the CSG to which the SCell candidate cell belongs.

(2) The base station (cell) knows a CSG registration situation of a user equipment via a UE. The user equipment during a telephone call, during communication, or during CONNECTED may notify a cell of the CSG registration situation of the user equipment. The following two (b1) and (b2) are disclosed as specific examples of the trigger to the notification.

(b1) The user equipment makes a notification spontaneously. (b2) The user equipment makes a notification, triggered by a request to the user equipment by a cell. The cell may request a notification of a registration situation of the user equipment with one or a plurality of CSGs to which the base station providing the cell belongs. It suffices that in that case, the user equipment notifies a registration situation of the user equipment with one or a plurality of CSGs to which the base station providing the cell belongs. As a result, the information not to be used in selection of a SCell is not notified in the cell, leading to an effect that radio resources can be used effectively. Alternatively, the cell may make the request in determining a SCell candidate cell. Still alternatively, the cell may request the notification of the registration situation of the user equipment with the CSG to which a SCell candidate cell belongs. It suffices that in that case, the user equipment notifies the registration situation of the user equipment with the CSG to which the SCell candidate cell belongs.

Disclosed below is a specific example of the method in which a base station (cell) knows a CSG registration situation of a user equipment via an MME. "UE Context" is used. "INITIAL CONTEXT SETUP REQUEST" that is "UE Context" setup request to be notified a base station from an MME or "UE context modification", which is disclosed in Non-Patent Document 11, may be used. This method is effective in that signaling does not need to be newly provided, which enables to prevent a communication system from becoming complex.

"CSG membership Status" included in "INITIAL CONTEXT SETUP REQUEST" may be used for notifying the registration situation of the user equipment. This does not require additional parameters and enables to construct a communication system having excellent backward compatibility. Alternatively, "CSG membership Status" may be newly provided in "UE context modification". As a result, the base station (cell) can know a CSG registration situation of a user equipment via an MME when "UE Context" is changed other than when a user equipment first starts communication with the base station (cell). Therefore, an effect that a flexible communication system can be constructed can be achieved.

The following three (1) to (3) are disclosed as specific examples of changes required to be made to the existing parameters. "INITIAL CONTEXT SETUP REQUEST" is described here for the sake of convenience, which also holds true for "UE context modification.

(1) In the conventional technique, in a case where a user equipment is accessed via a cell operating in a hybrid access mode, "CSG membership Status" being the existing parameter is contained in "INITIAL CONTEXT SETUP REQUEST". For this reason, in the conventional technique, in a case where a user equipment is accessed via a cell that does not belong to a CSG, via a cell operating in an open access mode among the cells belonging to the CSG, or via a cell operating in a closed access mode among the cells belonging to the CSG, the MME cannot notify the cell of the registration situation of the user equipment.

Therefore, "INITIAL CONTEXT SETUP REQUEST" contains "CSG membership Status" in all cases irrespective of a cell via which a user equipment is accessed. This enables the MME to notify the cell of the registration situation of the user equipment even in a case where a user equipment is accessed via a cell that does not belong to a CSG, via a cell operating in an open access mode among the cells belonging to the CSG, or via a cell operating in a closed access mode among the cells belonging to the CSG.

A parameter different from "CSG membership Status" may be newly provided. Alternatively, "INITIAL CONTEXT SETUP REQUEST" may contain "CSG membership Status" in a case where a user equipment is accessed via a cell capable of carrier aggregation. This results in that the cell does not notify the information not to be used in selection of a SCell, leading to an effect that communication resources can be used effectively.

(2) In the conventional technique, "CSG membership Status" is notified a cell via which a user equipment makes access. Therefore, in the conventional technique, an MME cannot notify a cell of the CSG registration situation of a user equipment other than the CSG to which the cell belongs.

Therefore, "CSG membership Status" of "INITIAL CONTEXT SETUP REQUEST" may contain registration situations of all CSG-IDs with which a UE is registered irrespective of a cell via which the user equipment makes access. This enables to notify a registration situation of a user equipment with a CSG other than a CSG to which a cell via which access is made belongs. A parameter different from "CSG membership Status" may be provided.

Alternatively, a registration situation of a user equipment regarding a CSG, to which another cell of the base station providing a cell via which the user equipment makes access belongs, may be notified. This results in that the cell does not notify the information not to be used in selection of a SCell, leading to an effect that communication resources can be used effectively.

(3) Combination of (1) and (2) above.

A specific example of the operation of the MME is disclosed below. The MME omits CSG access restriction, assuming that a PCell performs access control for a user equipment via a cell configured as a SCell by a base station. The MME may only perform access control for a user equipment via a PCell. The MME may only perform access control for a user equipment via a PCell belonging to a CSG. The MME may only perform access control for a user equipment via a PCell being a CSG cell.

A specific example of the operation of a user equipment is disclosed below. The user equipment omits CSG access control in a user equipment, assuming that the cell notified of the configuration content as a SCell is a cell accessible to the own user equipment. A specific example of the method in which a user equipment omits CSG access restriction is similar to that of the third embodiment described above, which is not described here.

Figure 22:
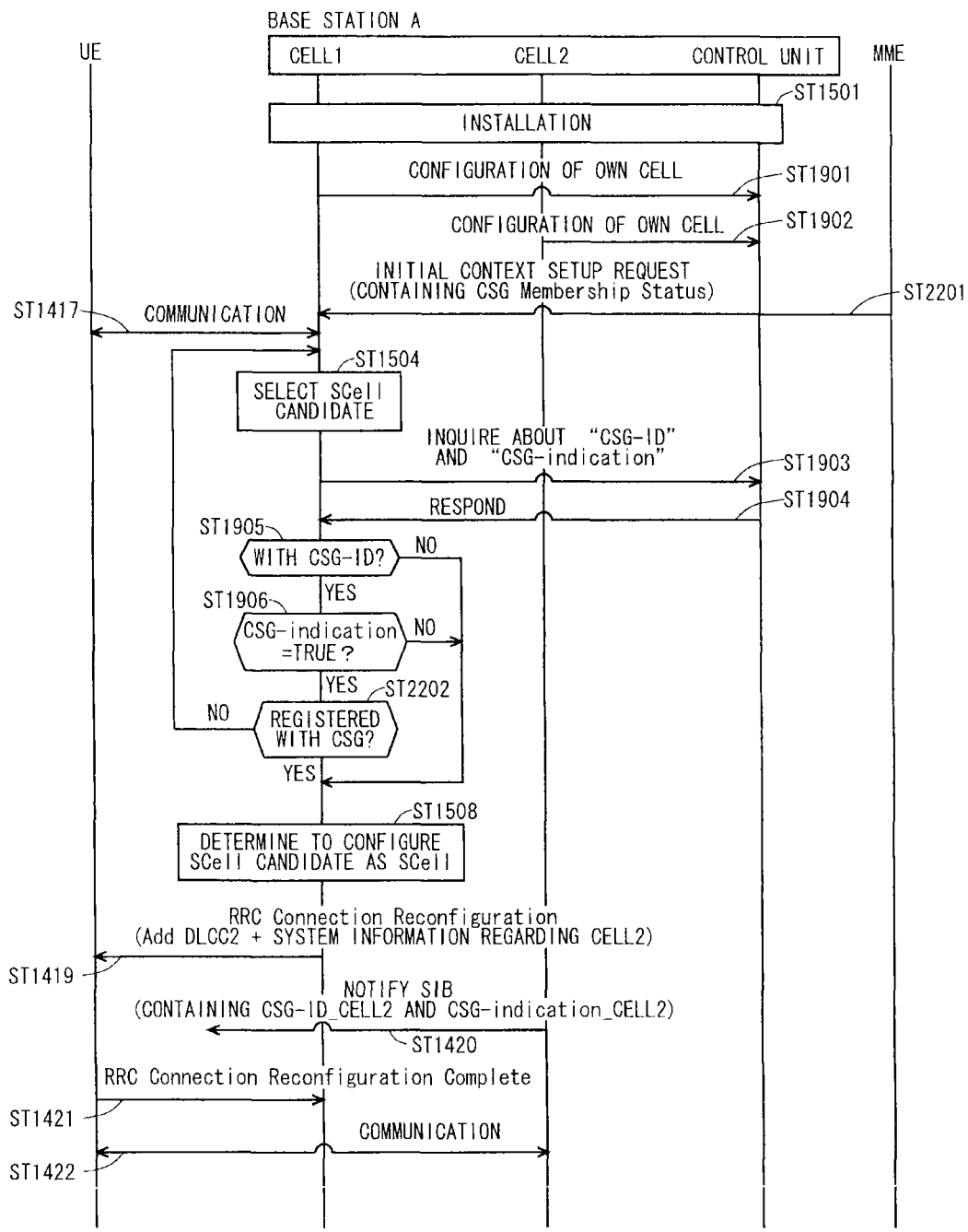
FIG. 22 is a diagram showing an example of a sequence of a communication system in a sixth embodiment.

Next, a specific example of a sequence of a communication system in the sixth embodiment is described with reference to FIG. 22. FIG. 22 is a diagram showing an example of the sequence of the communication system in the sixth embodiment. The processes of Steps ST1401 to ST1416 of FIG. 14 in the sixth embodiment are similar to those of the second embodiment, which are not illustrated and described here. Illustration and description are given from the process of Step ST1417 of FIG. 14. The sequence shown in FIG. 22 is similar to the sequences shown in FIGS. 14, 15, and 19, where the same steps are denoted by the same step numbers and common description is not given here.

This operation example describes a case in which a base station A providing a plurality of cells (CCs) including a cell1 and a cell2 is present, where the UE selects the cell1 of the base station A as the best cell and camps on the cell1 to start communication, and thereafter, the cell2 is configured as a SCell. A case in which each cell notifies the control unit of the base station of "CSG indication" and "CSG-ID" of the own cell is disclosed as a specific example of the method in which a PCell knows whether or not another cell belongs to a CSG, a CSG-ID in a case where another cell belongs to the CSG, and an operation mode in a case where another cell belongs to the CSG. A case of the time when a base station is installed is disclosed as a specific example of the timing at which "CSG indication" and "CSG-ID" are notified. A case in which a base station (cell) knows a CSG registration situation of a user equipment via an MME is disclosed as a specific example of the method in which the base station (cell) knows a CSG registration situation of a user equipment. Additionally, a case in which "INITIAL CONTEXT SETUP REQUEST" is used is disclosed as a specific example of the notification method in a case where a base station (cell) knows a CSG registration situation of a user equipment via an MME.

The processes of Step ST1501 shown in FIG. 15 and Steps ST1901 and ST1902 shown in FIG. 19 described above are performed, and then, the processes of Steps ST1401 to T1407 shown in FIG. 14 described above are performed, so that the user equipment (UE) selects the cell1 of the base station A as the best cell and camps on the cell1.

In Step ST2201, the MME requests "UE Context" setup of the user equipment from the base station (cell). The MME may request "UE Context" setup of the user equipment from a PCell. Alternatively, the MME may notify the base station (cell) of the CSG registration situation of the user equipment. "INITIAL CONTEXT SETUP REQUEST" may be used as this request. "INITIAL CONTEXT SETUP REQUEST" may contain "CSG Membership Status".

Then, the processes of Steps ST1408 to ST1416 shown in FIG. 14 described above are performed, and then, in Step ST1417, the cell being a PCell starts communication with the user equipment (UE). In this operation example, the cell1 starts communication with the user equipment as a PCell.

Then, the processes of Steps ST1504 and ST1903 to Step ST1905 are performed, and then, in Step ST1906, the cell being a PCell judges whether or not the CSG indication of the cell being a SCell candidate selected in Step ST1504 is "TRUE". In other words, the cell being a PCell judges whether or not the access mode of the SCell is a closed access mode. The response results to the inquiry received from the control unit in Step ST1904 are used in this judgment.

In a case of judging that the CSG indication of the cell being a SCell candidate selected in Step ST1504 is not "TRUE", that is, is "FALSE" in Step ST1906, the cell being a PCell moves to Step ST1508. In other words, in a case of judging that the operation mode of the cell being a SCell candidate selected in Step ST1504 is an open access mode or hybrid access mode in Step ST1906, the cell being a PCell moves to Step ST1508.

In a case of judging that the CSG indication of the SCell candidate selected in Step ST1504 is "TRUE" in Step ST1906, the cell being a PCell moves to Step ST2202. In other words, in a case of judging that the operation mode of the cell being a SCell candidate selected in Step ST1504 is a closed access mode in Step ST1906, the cell being a PCell moves to Step ST2202.

In Step ST2202, the cell being a PCell judges whether or not the user equipment has been registered with a CSG to which the cell being a SCell candidate selected in Step ST1504 belongs. The response results to the inquiry received from the control unit in Step ST1904 are used for the CSG to which the cell being a SCell candidate belongs in this judgment. Alternatively, the notification received from the MME in Step ST2201 is used for the CSG registration situation of the user equipment in this judgment.

In a case of judging that the user equipment has been registered with the CSG to which the cell being a SCell candidate belongs in Step ST2202, the cell being a PCell moves to Step ST1508. In a case of judging that the user equipment has been unregistered with the CSG to which the cell being a SCell candidate has been unregistered in Step ST2202, the cell being a PCell returns to Step ST1504 to select another cell as a cell being a SCell candidate.

Through the processes of Steps ST1905, ST1906, and ST2202, a cell (CC) that does not belong to a CSG, a cell (CC) operating in an open access mode among the cells (CCs) belonging to the CSG, a cell (CC) operating in a hybrid access mode among the cells (CCs) belonging to the CSG, or a cell (CC) belonging to the same CSG as that of the CSG with which the user equipment has been registered among the cells (CCs) belonging to the CSG can be configured as a SCell, which is specific to the present embodiment. Alternatively, among the cells (CCs) belonging to the CSG, a cell (CC) that operates in a closed access mode and belongs to a CSG with which the user equipment has been unregistered cannot be configured as a SCell.

The sixth embodiment described above can achieve the following effects. As in the third embodiment described above, subscribers who are allowed to use the SCell can be specified by an operator. The SCell belongs to the CSG, whereby a user-friendly communication system can be constructed, in which wishes of users are taken into consideration, such as services that users want to receive or charging setting that users want to apply for. At the same time, as in the second embodiment described above, the operation as a communication system can be stabilized while improving a data rate using carrier aggregation, which enables to appropriately provide services.

The present embodiment can be used in combination with the first embodiment described above.

Seventh Embodiment

A seventh embodiment discloses another solution to the same problem as that of the second embodiment described above. The solution in the seventh embodiment is described below. Each cell (CC) is not allowed to configure a CSG-ID per cell (CC). One or a plurality of cells (CCs) provided by the same base station belong to one CSG. In a base station capable of carrier aggregation, each cell (CC) may not be allowed to configure a CSG-ID per cell (CC). One or a plurality of cells (CCs) provided by a base station capable of carrier aggregation may belong to one CSG.

A specific example of the operation of the MME is disclosed below. The MME omits access control for a user equipment via a cell configured as a SCell by a base station, as in the case of the access control for a user equipment via a PCell. The MME may only perform access control for a user equipment via a PCell. The MME may only perform access control for a user equipment via a PCell belonging to a CSG. The MME may only perform access control for a user equipment via a PCell being a CSG cell.

The following two (1) and (2) are disclosed as specific examples of the operation of the base station.

(1) A base station is allowed to configure any cell of the base station as a SCell in a case of performing carrier aggregation. Additionally, in a case of performing carrier aggregation, the base station is allowed to configure any cell as a SCell even in a case where a cell belonging to the CSG is provided by the base station.

(2) A base station is allowed to render any cell of the base station active as a SCell in a case of performing carrier aggregation. Additionally, in a case of performing carrier aggregation, the base station is allowed to render any cell active as a SCell even in a case where a cell belonging to the CSG is provided by the base station.

In configuring a cell as a SCell, a cell (PCell) may not notify a user equipment of the CSG-indication and CSG-ID of the SCell.

A specific example of the operation of the user equipment is disclosed below. The user equipment omits CSG access control, that is, CSG access restriction, on a cell whose configuration content has been notified as a SCell, as in the case of the access control of a PCell. A specific example of the method in which a user equipment omits CSG access restriction is similar to that of the third embodiment described above, which is not described here.

A specific example of the sequence of the communication system in the seventh embodiment is similar to the sequence shown in FIG. 14, which is not described here.

The seventh embodiment described above can achieve the following effects. As in the third embodiment described above, subscribers who are allowed to use the SCell can be specified by an operator. The SCell belongs to the CSG, whereby a user-friendly communication system can be constructed, in which wishes of users are taken into consideration, such as services that users want to receive or charging setting that users want to apply for. At the same time, the operation as a communication system can be stabilized while improving a data rate using carrier aggregation as in the second embodiment described above, which enables to appropriately provide services.

In the seventh embodiment, control as a communication system can be made more easily in a user equipment or base station compared with the third embodiment, fourth embodiment, fifth embodiment, and sixth embodiment described above. Therefore, a more enhanced effect of preventing control delays can be achieved compared with the third embodiment, fourth embodiment, fifth embodiment, and sixth embodiment.

Eighth Embodiment

Non-Patent Document 1 described above discloses that handovers in an LTE system include a handover via an X2 interface (also referred to as X2 handover) and a handover via an S1 interface (also referred to as S1 handover). It is also disclosed that the S1 handover is used in mobility from an eNB or HeNB to a CSG cell or hybrid cell.

FIG. 23 is a diagram showing the sequence of the communication system regarding the handover method from an eNB or HeNB to a CSG cell or hybrid cell, which is disclosed in Non-Patent Document 1.

In Step ST2300, a source eNB starts communication with a user equipment (UE). In Step ST2301, the source eNB notifies the user equipment of a measurement configuration.

In Step ST2313, the user equipment performs a measurement report in accordance with the measurement configuration notified in Step ST2301. The measurement report contains the PCI of a measurement target cell and the like.

In Step ST2314, the source eNB reconfigures the measurement configuration of requesting the reception and report of the system information of a measurement target cell as required. The source eNB configures a measurement gap as required. The measurement gap is a period in which data transmission/reception at a frequency at which the user equipment currently receives services is stopped for measuring another system or another frequency.

In Step ST2302, the user equipment performs a measurement report in accordance with the measurement reconfiguration notified in Step ST2314. This measurement report contains the CSG-ID of the measurement target cell and the member indication for the measurement target cell. The member indication is a membership status that is judged based on the CSG-ID that the user equipment has received from the target cell and the whitelist in the user equipment. The CSG-ID of the measurement target cell and the like can be obtained when the user equipment receives the system information of the measurement target cell.

In Step ST2303, the source eNB determines handover (HO) in consideration of the measurement report received from the user equipment in Step ST2302.

In Step ST2304, the source eNB notifies the MME of a handover request. The handover request is also referred to as handover required. The handover request contains the CSG-ID of the target cell determined in Step ST2303. In a case where the target cell is a hybrid cell, the handover request contains an access mode of the target cell (Cell Access Mode).

In Step ST2305, the MME performs access control. Specifically, the MME judges whether or not the user equipment has been registered with the CSG-ID of the target cell received in Step ST2304, to thereby judge whether or not the user equipment can access the target cell. The CSG subscription data of the user equipment stored in the MME is used for judging whether or not the user equipment has been registered with the CSG-ID of the target cell.

In Step ST2306, the MME judges whether or not handover is allowed in consideration of the access control results of Step ST2305, that is, the judgment results as to whether or not the user equipment can access a target cell.

Specifically, in a case of judging that the user equipment cannot access a target cell in Step ST2305, the MME judges that handover is not allowed in Step ST2306. In a case of judging that handover is not allowed in Step ST2306, the MME ends the process and moves to other process. The other process is not specific to the present invention, which is not described here.

In a case of judging that the user equipment can access a target cell in ST2305, the MME judges that handover is allowed in Step ST2306 and moves to Step ST2307.

In Step ST2307, the MME notifies a target eNB being a target cell of a handover request. This handover request contains the CSG-ID of the target eNB received from the source eNB. In a case where the target eNB is a hybrid cell, the handover request contains a membership status.

In Step ST2308, the target eNB judges whether or not the CSG-ID contained in the handover request received in Step ST2307 is identical to the CSG-ID broadcast by the own eNB. Hereinafter, this judgment may be referred to as "CSG-ID check".

In Step ST2309, the target eNB judges whether or not the CSG-ID check results are OK, that is, are good using the judgment results of Step ST2308. In a case of judging that the CSG-IDs are identical to each other in Step ST2308, the target eNB judges that the CSG-ID check results are good in Step ST2309 and moves to Step ST2310. In a case of judging that the CSG-IDs are not identical to each other, that is, are different from each other in Step ST2308, the target eNB judges that the CSG-ID check results are not good in Step ST2309, ends the process, and moves to other process. The other process is not specific to the present invention, which is not described here.

In Step ST2310, the target eNB notifies the MME of handover request acknowledge. In Step ST2311, the MME that has received the handover request acknowledge from the target eNB in Step ST2310 notifies the source eNB of a handover command. In Step ST2312, the source eNB that has received the handover command from the MME in Step ST2311 notifies the user equipment of the handover command.

Non-Patent Document 1 describes that the PCell can only be changed through handover. However, Non-Patent Document 1 does not pose a problem regarding the relationship between a CSG to which a CC (cell) being a handover destination belongs and a CSG to which a user equipment belongs and does not disclose a solution to the problem.

R2-104788 (hereinafter, referred to as "Non-Patent Document 12") by 3GPP discloses that the PCell should be changed in reconfiguration. However, Non-Patent Document 12 does not pose a problem regarding the relationship between a CSG to which a CC (cell) being a handover destination belongs and a CSG to which a user equipment belongs and does not disclose a solution to the problem.

A problem to be solved in the eighth embodiment is described below. The conventional technique does not disclose an appropriate access control method in a change of a PCell to a CSG cell in the same base station (eNB) or a hybrid cell. Further, as to access from a user equipment via a CSG cell, the MME performs access control as described above. That is, the base station does not perform CSG access restriction. Therefore, for a UE unregistered with a CSG to which a cell belongs, that cell (CC) may be treated as a CC being a PCell change destination. This causes a problem that services cannot be provided appropriately.

A solution in the eighth embodiment is described below. The MME performs access control of a CC being a PCell change destination (hereinafter, also referred to as "target CC"). The PCell (hereinafter, also referred to as "source CC") notifies the MME of the CSG-ID of the target CC.

The source cell (PCell) may change the method of obtaining the CSG-ID of the target CC depending on whether or not the target cell is provided by the same base station. Alternatively, the source cell (PCell) may change the method of obtaining the CSG-ID of the target CC depending on whether or not the target cell is controlled by the same control unit.

A specific example of the method in which the source cell judges whether or not the target cell is provided by the same base station is disclosed below. The source cell makes a judgment based on the cell identification information of a measurement target cell (target cell) contained in the measurement report of the user equipment. Specific examples of the cell identification information include PCI and GCI. In a case where a cell having the cell identification information of the measurement target cell is provided by the same base station as that of the source cell, the source cell judges that the target cell is provided by the same base station. In a case where a cell having the cell identification information of the measurement target cell is not provided by the same base station as that of the source cell, the source cell judges that the target cell is not provided by the same base station. The entity for judgment in the source cell may be a source cell (PCell) or control unit.

Disclosed below is a specific example of the method in which the PCell knows the CSG-ID of the target CC in a case where the target cell is not provided by the same base station as that of the PCell (source CC). The PCell obtains the CSG-ID from the measurement report of the user equipment. This specific example is also given as a specific example of the method in which the PCell knows the CSG-ID of the target CC in a case where the target cell is not controlled by the same control unit as that of the PCell (source CC).

The following four (1) to (4) are disclosed as specific examples of the method in which the PCell knows the CSG-ID of the target CC in a case where the target cell is provided by the same base station as that of the PCell (source CC). The specific examples (1) to (4) below can be also given as specific examples of the method in which the PCell knows the CSG-ID of the target cell in a case where the target cell is controlled by the same control unit as that of the PCell (source CC).

(1) The PCell obtains the CSG-ID from the measurement report of the user equipment. This specific example is similar to the handover method from an eNB or HeNB to a CSG cell or hybrid cell, which is disclosed in Non-Patent Document 1. Therefore, this specific example can achieve an effect that a communication system can be prevented from becoming complex differently from the specific examples (2) to (4) described below.

(2) The PCell inquires the target CC about "CSG-ID". As a result, the PCell needs not to obtain the CSG-ID of the measurement target cell (target CC) from the measurement report of the user equipment. Further, differently from the specific example (1), the user equipment needs not to receive the system information of the measurement target cell in this specific example. Therefore, it is not required to provide a measurement gap to a user equipment, leading to an effect that a reduction in data rate of a user equipment can be prevented.

(3) Each cell notifies the control unit of the base station of "CSG-ID" of the own cell. The PCell inquires the control unit about "CSG-ID" of the target CC. As a result, the PCell needs not to obtain the CSG-ID of the measurement target cell (target CC) from the measurement report of the user equipment. Further, differently from the specific example (1), the user equipment needs not to receive the system information of the measurement target cell in this specific example. Therefore, it is not required to provide a measurement gap to a user equipment, leading to an effect that a reduction in data rate of a user equipment can be prevented. Alternatively, the control unit may notify each cell (PCell) of "CSG-ID" of each cell before an inquiry from the PCell.

(4) Each cell notifies another cell of "CSG-ID" of the own cell. As a result, the PCell needs not to obtain the CSG-ID of the measurement target cell (target CC) from the measurement report of the user equipment. Further, differently from the specific example (1), the user equipment needs not to receive the system information of the measurement target cell in this specific example. Therefore, it is not required to provide a measurement gap to a user equipment, leading to an effect that a reduction in data rate of a user equipment can be prevented.

The specific examples (2) to (4) can be implemented easily because the PCell (source CC) and target CC are provided by the same base station. Alternatively, those examples can be implemented easily because the PCell (source CC) and target CC are controlled by the same control unit.

The following two (1) and (2) are disclosed as specific examples of the method in which a source CC notifies the MME of the CSG-ID of the target CC.

(1) S1 signaling is newly provided. A parameter to be mapped to the newly provided S1 signaling is the CSG-ID of the target CC, which may be notified together with the user equipment identifier. The user equipment identifier may be UE-ID or IMSI.

(2) The existing S1 signaling is used. Specific examples of the existing signaling include a handover request. The handover request is also referred to as handover required. This specific example is similar to the handover method from an eNB or HeNB to a CSG cell or hybrid cell, which is disclosed in Non-Patent Document 1. Therefore, this specific example can achieve an effect that a communication system can be prevented from becoming complex.

The MME performs access control using the CSG-ID of the target CC received from the source CC.

Next, a specific example of a sequence of a communication system in the eighth embodiment is described with reference to FIG. 24. FIG. 24 is a diagram showing an example of the sequence of the communication system in the eighth embodiment. The processes of Steps ST1401 to ST1416 of FIG. 14 described above in the present embodiment are similar to those of the second embodiment, which are not illustrated and described here. The sequence shown in FIG. 24 is similar to the sequence shown in FIG. 23, where the same steps are denoted by the same step numbers and common description is not given here.

This operation example describes a case in which a base station A providing a plurality of cells (CCs) including a cell1 and a cell2 is present, where the UE selects the cell1 of the base station A as the best cell and camps on the cell1 to start communication, and thereafter, the cell2 is configured as a CC being a PCell change destination. A case in which each cell notifies the control unit of the base station of "CSG-ID" of the own cell is disclosed as a specific example of the method in which a PCell knows the CSG-ID of the target CC.

In Step ST2400, a base station is installed. In this operation example, the base station A providing a plurality of cells (CCs) including the cell1 and cell2 is installed. In Steps ST2401 and ST2402, each cell of the base station notifies the control unit of the base station of the configuration of the own cell. The configuration of the own cell contains "CSG-ID". In this operation example, in Step ST2401, the cell1 notifies the control unit of "CSG-ID" of the cell1. In Step ST2402, the cell2 notifies the control unit of "CSG-ID" of the cell2.

Then, the processes of Steps ST1401 to ST1416 shown in FIG. 14 described above are performed, and then, in Step ST2300, the source CC being a source eNB starts communication with a user equipment (UE). In this operation example, the cell1 starts communication with the user equipment (UE) as the source CC being a source cell (PCell).

In Step ST2403, the source CC (cell1) notifies the user equipment (UE) of the measurement configuration. In Step ST2404, the user equipment (UE) performs a measurement report to the source CC (cell1) in accordance with the measurement configuration notified in Step ST2403. The measurement report contains, for example, the PCI of the measurement target cell.

In Step ST2303, the source CC (cell1) being a source eNB determines handover in consideration of the measurement report received from the user equipment (UE) in Step ST2404. Alternatively, the source CC (cell1) being a source cell (PCell) may judge whether or not the target cell is provided by the same base station and determine the method of obtaining the CSG-ID of the target CC. In this operation example, the source CC (cell1) judges that the target CC (cell2) is provided by the same base station.

In this operation example, the method in which each cell notifies the control unit of the base station of "CSG-ID" of the own cell is selected as the method of obtaining the CSG-ID of the target CC. In this case, the source CC does not reconfigure, for the user equipment (UE), the measurement configuration of requesting the reception and report of the system information of the measurement target cell in Step ST2314 of FIG. 23. As a result, the user equipment needs not to receive the system information of the measurement target cell. Therefore, it is not required to provide a measurement gap to the user equipment, leading to an effect that a reduction in data rate of the user equipment can be prevented. This is because the PCell obtains the CSG-ID of the target CC from the control unit or the like. The method of obtaining the CSG-ID may be determined independently of the handover determination.

In Step ST2405, the cell inquires the control unit about the configuration of the target CC determined in Step ST2303. The cell may inquire the control unit about "CSG-ID" and "access mode" of the target CC. In this operation example, the cell1 being a PCell inquires the control unit about "CSG-ID" and "access mode" of the cell2 selected as the target CC. The cell may inquire about "CSG-ID" and "CSG indication" in place of inquiring about "CSG-ID" and "access mode".

In Step ST2406, the control unit responds to the inquiry from the cell in Step ST2405. The control unit may notify the cell of "CSG-ID" and "access mode" of the inquiry target cell. In this operation example, the control unit notifies the cell1 being a PCell of "CSG-ID" and "access mode" of the cell2 being an inquiry target cell. The control unit may notify "CSG-ID" and "CSG indication" in place of notifying "CSG-ID" and "access mode".

In Step ST2407, the PCell notifies the MME of a handover request. The handover request is also referred to as handover required. The handover request contains the CSG-ID of the target CC determined in Step ST2303. The handover request may contain an access mode of the target CC (cell access mode).

In Step ST2305, the MME performs access control. Specifically, the MME judges whether or not the user equipment has been registered with the CSG-ID of the target CC received in Step ST2407, to thereby judge whether or not the user equipment can access the target CC. The CSG subscription data of the user equipment stored in the MME is used in judging whether or not the user equipment has been registered with the CSG-ID of the target CC. The HSS may be inquired about the CSG subscription data of the user equipment, or the information stored in the HSS may be used as the CSG subscription data of the user equipment. Access control may include, for example, the processes of Steps ST1411 to ST1414 shown in FIG. 14 described above.

In Step ST2306, the MME judges whether or not handover is allowed in consideration of the results of access control in Step ST2305 as described above. The MME moves to Step ST2408 in a case of judging that handover is allowed or ends the process and moves to other process in a case of judging that handover is not allowed.

In Step ST2408, the MME notifies the cell2 being a target CC of a handover request. The handover request contains the CSG-ID of the target CC being a target eNB received from the source CC being a source eNB. This handover request may contain a membership status. With the use of the handover request, the method is similar to the handover method from an eNB or HeNB to a CSG cell or hybrid cell, which is disclosed in Non-Patent Document 1 described above. This achieves an effect that a communication system can be prevented from becoming complex.

In Step ST2409, the cell2 being a target CC checks the CSG-ID. Specifically, the cell2 being a target CC judges whether or not the CSG-ID contained in the handover request received in Step ST2408 and the CSG-ID broadcast by the own eNB are identical to each other. Alternatively, the cell2 may judge whether or not handover can be accepted (hereinafter, also referred to as "judgment as to whether or not handover can be accepted" or "check of the acceptance of handover). Still alternatively, the cell2 may perform both of the CSG-ID check and the judgment as to whether or not handover can be accepted.

In Step ST2410, the cell2 being a target CC checks whether or not the CSG-ID check results are OK, that is, are good, using the judgment results of Step ST2409. In a case of judging that the CSG-IDs are identical to each other in Step ST2409, the cell2 being a target CC judges that the CSG-ID check results are good in Step ST2410, and then moves to Step ST2310. In a case of judging that the CSG-IDs are different from each other in Step ST2409, the cell2 being a target CC judges that the CSG-ID check results are not good in Step ST2410. Then, the cell2 ends the process and moves to other process. The other process is not specific to the present invention, which is not described here.

In judging whether or not handover can be accepted in Step ST2409, in Step ST2410, the cell2 being a target CC judges whether or not the judgment results as to whether or not handover can be accepted are OK, that is, whether or not handover can be accepted. In a case of performing both of the CSG-ID check and the judgment as to whether or not handover can be accepted in Step ST2409, in Step ST2410, the cell2 being a target CC judges whether or not the CSG-ID check results and the judgment results as to whether or not handover can be accepted are OK, that is, are good. The cell2 moves to Step ST2310 in a case of judging that the results are good in Step ST2410, or ends the process and moves to other process in a case of judging that the results are not good.

In Step ST2310, the cell2 being a target CC notifies the MME of handover request acknowledge. In Step ST2311, the MME that has received the handover request acknowledge from the cell2 in Step ST2310 notifies the cell1 being a source CC of a handover command. In Step ST2312, the cell1 that has received the handover command from the MME in Step ST2311 notifies the user equipment (UE) of the handover command.

The eighth embodiment described above can achieve the following effects. The operation as a communication system can be stabilized while improving a data rate using carrier aggregation, which enables to appropriately provide services. Additionally, it is not required to provide a measurement gap to the user equipment, which enables to prevent a reduction in data rate of the user equipment.

While the present embodiment has mainly described the case in which handover is used in changing a PCell, the present embodiment is also applicable to the case in which a reconfiguration is used in changing a PCell.

The present embodiment can be used in combination with the first embodiment, second embodiment, first modification of the second embodiment, third embodiment, fourth embodiment, fifth embodiment, first modification of the fifth embodiment, sixth embodiment, and seventh embodiment described above.

First Modification of Eighth Embodiment

A first modification of the eighth embodiment discloses another solution to the same problem as that of the eighth embodiment described above. The present modification mainly describes a portion different from the solution in the eighth embodiment described above, and a portion not to be described is similar to the eighth embodiment.

In a case where a target cell is provided by the same base station, the source cell (PCell) can omit "judgment as to whether or not handover can be accepted" or "check of CSG-ID" in the target cell (CC). For example, in Step ST2409 of FIG. 24, "judgment as to whether or not handover can be accepted" or "check of CSG-ID" can be omitted. Signaling required for "judgment as to whether or not handover can be accepted" or "check of CSG-ID" can be omitted.

Alternatively, both of "judgment as to whether or not handover can be accepted" and "check of CSG-ID" can be omitted. Still alternatively, "judgment as to whether or not handover can be accepted" or "check of CSG-ID" in the target cell may be performed by the source cell (CC). Specific examples of the case in which the source cell (PCell) is provided by the base station as that of the target cell include the case in which the PCell is changed.

The following effects can be achieved through the above. Control delays in a communication system can be prevented. In addition, the processing load of the base station can be reduced. Further, power consumption of the base station can be reduced.

The omission described above can be made easily in a case where the PCell (source CC) and target CC are provided by the same base station. Alternatively, the omission described above can be made easily in a case where the PCell (source CC) and target CC are controlled by the same control unit.

A specific example of the method in which a source cell determines whether or not the target cell is provided by the same base station is similar to that of the eighth embodiment, which is not described here.

The following four (1) to (4) are disclosed as specific examples of the process (hereinafter, also referred to as "control step") such as the judgment that may be omitted and signaling.

(1) Notification of handover request acknowledge from the target CC to the MME, which is, for example, the process of Step ST2310 in FIG. 24. In a case of notifying the MME of the CSG-ID of the target CC, the PCell may notify that a response from the target CC to the MME is omitted. For example, in Step ST2407 of FIG. 24, the PCell may notify that a response from the target CC to the MME is omitted. This notification may be an information element of a message by which the source CC being a PCell notifies the MME of the CSG-ID of the target CC. This notification may be replaced by the indication showing a PCell change. According to this specific example, the MME can judge explicitly whether or not a response to a handover request is present after the notification of the handover request. This leads to an effect that a stable communication system can be constructed.

(2) Notification of a handover command from the MME to the PCell being a source CC, which is, for example, the process of Step ST2311 in FIG. 24. A message by which the source CC can recognize that handover is allowed by the MME may be provided. Specific examples of the new message include a notification from a target CC that has received a handover request from the MME. Specific examples of the notification include handover request acknowledge.

(3) Judgment as to whether or not the CSG-ID contained in a handover request at a target CC and the CSG-ID broadcast by the own eNB are identical to each other, that is, "check of CSG-ID". Or, "judgment as to whether or not handover can be accepted", or both of "judgment as to whether or not handover can be accepted" and "check of CSG-ID". For example, any one or both of the processes of Steps ST2409 and ST2410 of FIG. 24.

The specific example (3) is effective particularly in a case where the specific examples (2) to (4) of the method in which a PCell knows the CSG-ID of a target CC. This is because it is not required to obtain the CSG-ID from a user equipment, with few problems such as a communication error.

In a case where the judgment described above is omitted, the notification of a handover request from the MME to the target CC may be omitted. For example, the process of Step ST2408 of FIG. 24 may be omitted. A handover command or handover request from the MME to the source CC may be notified. The handover command or handover request may contain a membership status. In a case of notifying the MME of the CSG-ID of a target CC, the PCell may notify that the target CC omits the above-mentioned judgment. Alternatively, the PCell may notify that the source CC performs the above-mentioned judgment. This notification may be an information element of a message by which the PCell notifies the MME of the CSG-ID of the target CC. This notification may be replaced by a PCell change.

According to the specific example (3), the MME can explicitly judge a destination to be notified of a handover request. This leads to an effect that a stable communication system can be constructed.

In a case where the source cell (CC) performs "judgment as to whether or not handover can be accepted" by a target cell in the specific example (3), the situations regarding the processing load and resource use of a target CC may be taken into consideration. The following is disclosed as a specific example of the method in which a PCell being a source cell knows the situations regarding the processing load and resource use of another cell. The situations regarding the processing load, resource use, and the like may be contained in the configuration of the own cell.

(4) Combination of (1) to (3) above.

The specific examples (2) to (4) can be performed easily in a case where the source CC being a PCell and the target CC are provided by the same base station. Alternatively, those examples can be performed easily in a case where the source CC being a PCell and the target CC are controlled by the same control unit.

Figure 25:
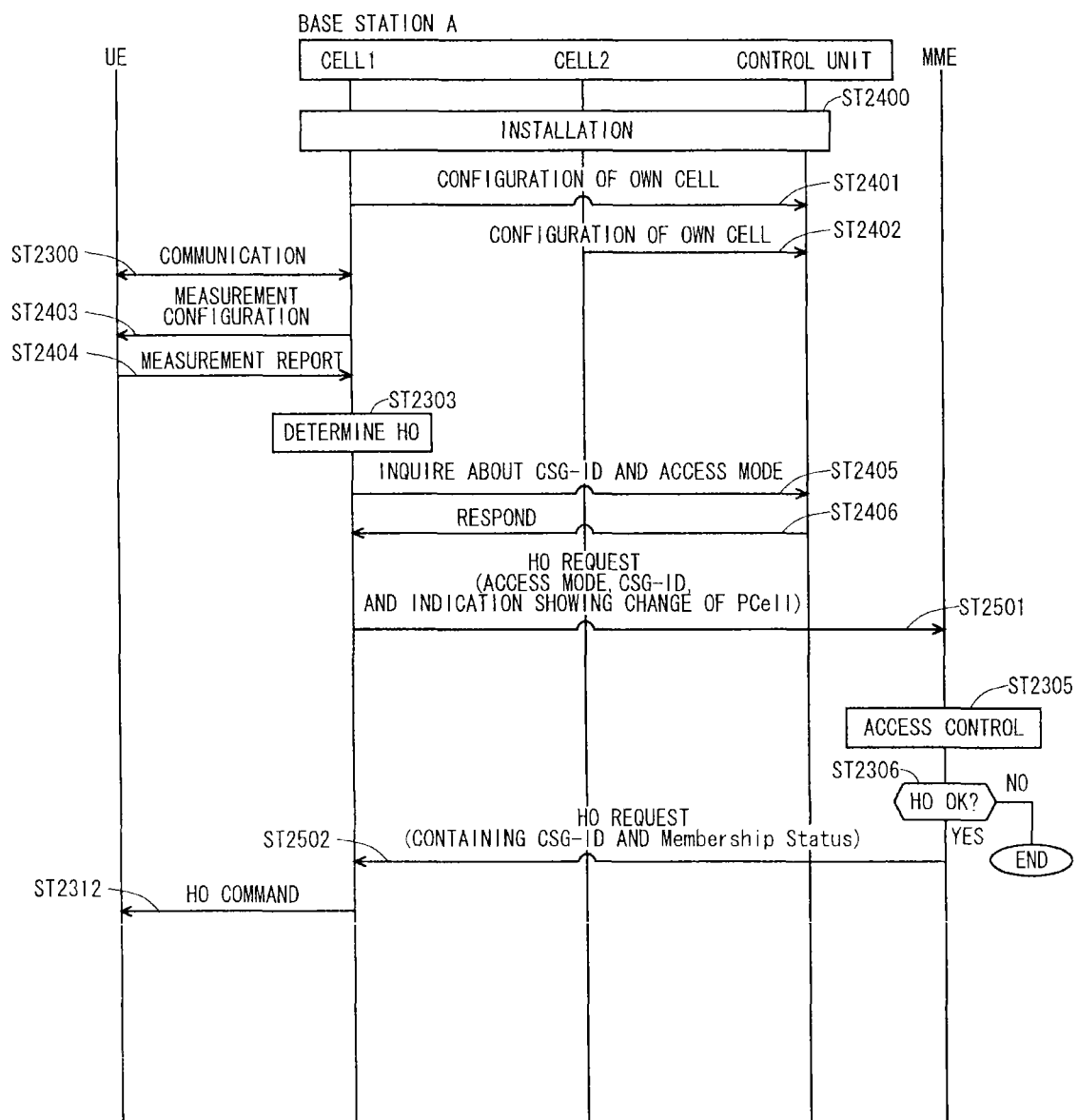
FIG. 25 is a diagram showing an example of a sequence of a communication system in a first modification of the eighth embodiment.

Next, a specific example of a sequence of a communication system in the first modification of the eight embodiment is described with reference to FIG. 25. FIG. 25 is a diagram showing an example of the sequence of the communication system in the first modification of the eighth embodiment. The processes of Steps ST1401 to ST1416 of FIG. 14 described above in the present embodiment are similar to those of the second embodiment, which are not illustrated and described here. The sequence shown in FIG. 25 is similar to the sequences shown in FIGS. 23 and 24, where the same steps are denoted by the same step numbers and common description is not given here.

This operation example describes a case in which a base station A providing a plurality of cells (CCs) including a cell1 and a cell2 is present, where the UE selects the cell1 of the base station A as the best cell and camps on the cell1 to start communication, and thereafter, the cell2 is configured as a CC being a PCell change destination. A case in which each cell notifies the control unit of the base station of "CSG-ID" of the own cell is disclosed as a specific example of the method in which the PCell knows the CSG-ID of the target CC. As specific examples of the control step that can be omitted, the following cases are disclosed: notification of handover request acknowledge from the target CC to the MME in the specific example (1) described above; notification of a handover command from the MME to the PCell being a source CC in the specific example described (2) above; check of CSG-ID at the target CC, that is, judgment as to whether or not the CSG-ID contained in the handover request and the CSG-ID broadcast by the own eNB are identical to each other, in the specific example (3) described above; and judgment as to whether or not handover can be accepted.

After the processes of Steps ST2400 to ST2402 are performed as described above, the processes of Steps ST1401 to ST1416 shown in FIG. 14 described above are performed, and then, the processes of Steps ST2300, ST2403, ST2404, ST2303, ST2405, and ST2406 are performed in order.

Then, in Step ST2501, the cell1 being a PCell notifies the MME of a handover request. The handover request is also referred to as handover required. The handover request contains the CSG-ID of the target CC determined in Step ST2303. The handover request may contain an access mode of the target CC (cell access mode). Alternatively, the handover request may contain a PCell change.

In this operation example, a PCell change is indicated, so that it is notified that the notification of the handover request acknowledge from the target CC to the MME is omitted and that the judgment as to whether or not the CSG-ID contained in the handover request at the target CC and the CSG-ID broadcast by the own eNB are identical to each other, that is, check of CSG-ID, is omitted. In a case where the source CC being a PCell performs "judgment as to whether or not handover can be accepted" or "check of CSG-ID", which may be performed prior to, for example, Step ST2501. The configuration information of the target CC received in Step ST2406 may be used for the "judgment as to whether or not handover can be accepted" or "check of CSG-ID".

Then, the processes of Steps ST2305 and ST2306 are performed. Then, in Step ST2502, the MME notifies the cell1 being a source CC of the handover request or handover command. Upon receipt of the indication showing a PCell change in Step ST2501, the MME may change a destination to be notified of the handover request from the target CC to the source CC.

The first modification of the eighth embodiment described above can achieve the following effects in addition to the effects of the eighth embodiment. The control steps are omitted in the present modification, whereby control delays in the communication system can be prevented. In addition, the processing load of the base station can be reduced. Further, power consumption of the base station can be reduced.

While the present modification has mainly described the case in which handover is used in PCell change, the present modification is also applicable to the case in which a reconfiguration is used in PCell change.

The present modification can be used in combination with the first embodiment, second embodiment, first modification of the second embodiment, third embodiment, fourth embodiment, fifth embodiment, first modification of the fifth embodiment, sixth embodiment, seventh embodiment, and eighth embodiment described above.

Second Modification of Eighth Embodiment

A second modification of the eighth embodiment describes another solution to the same problem as that of the eighth embodiment. A solution in the second modification of the eighth embodiment is described below. The present modification mainly describes a portion different from the solution in the eighth embodiment, and a portion not to be described is similar to the eighth embodiment. In the present modification, the base station performs access control on the target CC, which may be performed by a PCell.

The PCell being a source cell may change the access control method for a target CC depending on whether or not the target cell is provided by the same base station. Alternatively, the PCell being a source cell may change the access control method for a target CC depending on whether or not the target cell is controlled by the same control unit.

A specific example of the method in which a source cell judges whether or not the target cell is provided by the same base station is similar to that of the eighth embodiment, which is not described here.

Disclosed below is a specific example of the access control method for a target CC in a case where the target cell is not provided by the same base station as that of the source CC being a PCell. For example, as shown in FIG. 23 described above, the MME performs access control on the target CC. This specific example is also given as a specific example of an access control method for a target CC in a case where the target cell is not controlled by the same control unit as that of the source CC being a PCell.

Disclosed below is a specific example of the access control method for a target CC in a case where the target cell is provided by the same base station as that of the source CC being a PCell. The specific example disclosed below is also given as a specific example of an access control method for a target CC in a case where the target cell is controlled by the same control unit as that of the source CC being a PCell.

The cell is allowed to configure or select, as a target CC, a cell (CC) that does not belong to a CSG. The cell is allowed to configure or select, as a target CC, a cell (CC) operating in an open access mode or a cell (CC) operating in a hybrid access mode among the cells (CCs) belonging to the CSG. The cell is allowed to configure or select, as a target CC, a cell (CC) belonging to the same CSG as the CSG with which the user equipment has been registered among the cells (CCs) belonging to the CSG. The cell is not allowed to configure or select, as a target CC, a cell (CC) that operates in a closed access mode and belongs to a CSG with which a user equipment has been unregistered among the cells (CCs) belonging to the CSG.

The base station (cell) may perform as follows in a case of configuring or selecting, as a target CC, a cell (CC) operating in a hybrid access mode among the cells (CCs) belonging to the CSG. The base station is allowed to configure or select, as a target CC, a cell (CC) for a user equipment registered with a CSG to which the cell belongs in preference to a user equipment unregistered therewith.

A specific example of the method in which a PCell knows whether or not another cell belongs to a CSG and knows the operation mode and CSG-ID in a case where another cell belongs to the CSG is similar to that of the sixth embodiment, which is not described here.

A specific example of the method in which a base station (cell) knows a CSG registration situation of a user equipment is similar to that of the sixth embodiment, which is not described here.

Next, a specific example of a sequence of a communication system in the second modification of the eighth embodiment is described with reference to FIG. 26. FIG. 26 is a diagram showing an example of the sequence of the communication system in the second modification of the eighth embodiment. The processes of Steps ST1401 to ST1416 of FIG. 14 described above in the present modification are similar to those of the second embodiment, which are not illustrated and described here. The sequence shown in FIG. 26 is similar to the sequences shown in FIGS. 23 and 24, where the same steps are denoted by the same step numbers and common description is not given here.

This operation example describes a case in which a base station A providing a plurality of cells (CCs) including a cell1 and a cell2 is present, where the UE selects the cell1 of the base station A as the best cell and camps on the cell1 to start communication, and thereafter, the cell2 is configured as a CC being a PCell change destination. A case in which each cell notifies the control unit of the base station of "CSG-ID" of the own cell is disclosed as a specific example of the method in which a PCell knows the CSG-ID of the target CC. A case in which a base station (cell) knows a CSG registration situation of a user equipment via an MME is disclosed as a specific example of the method in which the base station knows the CSG registration situation of the user equipment. Also, a case in which "INITIAL CONTEXT SETUP REQUEST" is used is disclosed as a specific example of the notification method in a case where a base station (cell) knows the CSG registration situation of the user equipment via the MME.

The processes of Steps ST2400 to ST2402 are performed, and thereafter, the processes of Steps ST1401 to T1407 shown in FIG. 14 described above are performed, so that the user equipment (UE) selects the cell1 of the base station A as the best cell and camps on the cell1.

In Step ST2601, the MME requests "UE Context" setup of the user equipment from a base station (cell). The MME may request "UE Context" setup of the user equipment from a PCell. Alternatively, the MME may notify a base station (cell) of the CSG registration situation of the user equipment. "INITIAL CONTEXT SETUP REQUEST" may be used as the request. Alternatively, "INITIAL CONTEXT SETUP REQUEST" may contain "CSG Membership Status".

Then, the processes of Steps ST1408 to ST1416 shown in FIG. 14 described above are performed, and thereafter, the processes of Steps ST2300, ST2403, and ST2404 are performed. Then, in Step ST2602, the cell inquires the control unit of the base station about the configuration of the target CC determined in Step ST2303. The cell may inquire the control unit of the base station about "CSG indication" and "CSG-ID" of the determined target CC. In this operation example, the cell1 being a PCell inquires the control unit of the base station A about "CSG indication" and "CSG-ID" of the cell2 determined as a target CC.

In Step ST2603, the control unit of the base station responds to the inquiry from the cell in Step ST2602. The control unit of the base station may notify the cell of "CSG indication" and "CSG-ID" of the inquiry target cell. In this operation example, the control unit of the base station A notifies the cell1 being a PCell of "CSG indication" and "CSG-ID" of the cell2 being an inquiry target cell.

In Step ST2604, the cell judges whether or not the target CC determined in Step ST2303 has a CSG-ID. In other words, the cell judges whether or not the target CC belongs to a CSG. In this judgment, the cell uses the response results to the inquiry, which have been received from the control unit of the base station in Step ST2603.

In a case of judging that the target CC determined in Step ST2303 has a CSG-ID in Step ST2604, the cell moves to Step ST2605. In other words, in a case of judging that the target CC determined in Step ST2303 has a CSG-ID in Step ST2604, the cell judges that the target CC belongs to the CSG, and then moves to Step ST2605.

In a case of judging that the target CC determined in Step ST2303 does not have a CSG-ID in Step ST2604, the cell moves to Step ST2312. In other words, in a case of judging that the target CC determined in Step ST2303 does not have a CSG-ID in Step ST2604, the cell judges that the target CC does not belong to the CSG, and then moves to Step ST2312.

In Step ST2605, the cell judges whether or not the CSG indication of the target CC determined in Step ST2303 shows "TRUE". In other words, the cell judges whether or not the access mode of the target CC is a closed access mode. In this judgment, the cell uses the response results to the inquiry, which have been received from the control unit of the base station in Step ST2603.

In a case of judging that the CSG indication of the target CC determined in Step ST2303 does not show "TRUE", that is, shows "FALSE", in Step ST2605, the cell moves to Step ST2312. In other words, in a case of judging that the operation mode of the target CC determined in Step ST2303 is an open access mode or hybrid access mode in Step ST2605, the cell moves to Step ST2312.

In a case of judging that the CSG indication of the target CC determined in Step ST2303 shows "TRUE" in Step ST2605, the cell moves to Step ST2606. In other words, in a case of judging that the operation mode of the target CC determined in Step ST2303 is a closed access mode in Step ST2605, the cell moves to Step ST2606.

In Step ST2606, the cell judges whether or not the user equipment has been registered with a CSG to which the cell being a target CC determined in the Step ST2303 belongs. As to the CSG to which the target CC belongs in this judgment, the response results to the inquiry, which have been received from the control unit of the base station in Step ST2603, are used. As to the CSG registration situation of the user equipment in this judgment, the notification received from the MME in Step ST2601 is used.

In a case of judging that the user equipment has been registered with the CSG to which the target CC belongs in Step ST2606, the cell moves to Step ST2312. In a case of judging that the user equipment has been unregistered with the CSG to which the target CC belongs in Step ST2606, the cell ends the process and moves to other process. The other process is not specific to the present invention, which is not described here.

Through the processes of Steps ST2604, ST2605, and ST2606, a cell (CC) that does not belong to a CSG, a cell (CC) operating in an open access mode among the cells (CCs) belonging to the CSG, a cell (CC) operating in a hybrid access mode among the cells (CCs) belonging to the CSG, or a cell (CC) belonging to the same CSG as the CSG to which the user equipment has been registered among the cells (CCs) belonging to the CSG can be configured or selected as a target CC, which is specific to the present modification. Alternatively, a cell (CC) that operates in a closed access mode and belongs to a CSG with which the user equipment has been unregistered among the cells (CCs) belonging to the CSG cannot be configured or selected as a target CC.

The PCell may select a target CC candidate cell before determining a target CC and perform the processes of Steps ST2602 to ST2606 on the candidate cell, and then perform the process of Step ST2303, though different from the sequence shown in FIG. 26.

In Step ST2607, the cell judges whether or not a target CC can accept handover. In a case of judging that the target CC determined in Step ST2303 can accept handover in Step ST2607, the cell moves to Step ST2312. In a case of judging that the target CC determined in Step ST2303 cannot accept handover in Step ST2607, the cell ends the process and moves to other process. The other process is not specific to the present invention, which is not described here.

The situations regarding the processing load and resource use of the target CC and the like may be taken into consideration in the judgment of Step ST2607. The following is disclosed as a specific example of the method in which a PCell knows the situations regarding the processing load and resource use of another cell. The situations regarding the processing load, resource use, and the like may be included in the configuration of the own cell.

The second modification of the eighth embodiment described above can achieve the following effects as in the eighth embodiment. The operation as a communication system can be stabilized while improving a data rate using carrier aggregation, which enables to appropriately provide services.

While the present modification has mainly described a case in which handover is used in PCell change, the present modification is also applicable to a case in which a reconfiguration is used in PCell change.

The present modification can be used in combination with the first embodiment, second embodiment, first modification of the second embodiment, third embodiment, fourth embodiment, fifth embodiment, first modification of the fifth embodiment, sixth embodiment, seventh embodiment, eighth embodiment, and first modification of the eighth embodiment described above.

Third Modification of Eighth Embodiment

A third modification of the eighth embodiment discloses another solution to the same problem as that of the eighth embodiment. The present modification mainly describes a portion different from the solutions in the eighth embodiment and the second modification of the eighth embodiment, and a portion not to be described is similar to the eighth embodiment and the second modification of the eighth embodiment.

In the present modification, the PCell being a source cell changes the access control method for a target CC depending on whether or not the target cell is provided by the same base station. Alternatively, the PCell being a source cell may change the access control method for a target CC depending on whether or not the target cell is controlled by the same control unit.

A specific example of the method in which a source cell judges whether or not a target cell is provided by the same base station is similar to that of the eighth embodiment, which is not described here.

Disclosed below is a specific example of the access control method for a target CC in a case where the target cell is not provided by the same base station as that of the source CC being a PCell. For example, as shown in FIG. 23 described above, the MME performs access control on a target CC. This specific example is also given as a specific example of the access control method for a target CC in a case where the target cell is not controlled by the same control unit as that of the source CC being a PCell.

Disclosed below is a specific example of the access control method for a target CC in a case where a target cell is provided by the same base station as that of the source CC being a PCell. If the target CC satisfies the preset conditions, access control in PCell change is omitted. This specific example is also given as a specific example of the access control method for a target CC in a case where the target cell is controlled by the same control unit as that of the source CC being a PCell.

The following three (1) to (3) are disclosed as specific examples of the preset conditions.

(1) Case where access control has been performed on a target CC. A specific example of the case where access control has been performed is described below. A target CC is selected from SCells. A target CC may be selected from access-controlled SCells. Specific examples of the access-controlled SCells include the SCells that are configured in the third embodiment, fourth embodiment, fifth embodiment, sixth embodiment, or seventh embodiment described above.

(2) Case where a target CC is a cell (CC) that does not require access control. Specific examples of the cell that does not require access control include a cell (CC) that does not belong to a CSG, a cell (CC) operating in an open access mode among the cells (CCs) belonging to the CSG, and a cell (CC) operating in a hybrid access mode among the cells (CCs) belonging to the CSG. A method similar to that of the fourth embodiment described above can be used as a specific example of the method in which a PCell knows whether or not another cell belongs to a CSG or knows an operation mode in a case where another cell belongs to the CSG, which is not described here.

(3) Combination of (1) and (2) above.

If the target CC satisfies the preset other conditions, access control in PCell change may be performed.

The following three (1) to (3) are disclosed as specific examples of the other conditions.

(1) Case where access control has not been performed on a target CC. A specific example of the case in which access control has not been performed is described below. The target CC is selected from cells other than the SCell. The target CC may be selected from cells other than the access-controlled SCell. The target CC may be selected from the SCells on which access control is not performed. Specific examples of the SCell on which access control has not been performed include the SCell configured in the second embodiment described above.

(2) Case where a target CC is a cell (CC) that requires access control. Specific examples of the cell that requires access control include a cell (CC) belonging to a CSG. A target CC may be a cell (CC) operating in a closed access mode among the cells (CCs) belonging to the CSG. A method similar to that of the fourth embodiment described above can be used as a specific example of the method in which a PCell knows whether or not another cell belongs to a CSG and knows an operation mode in a case where another cell belongs to a CSG, which is not described here.

(3) Combination of (1) and (2) above.

Figure 27:
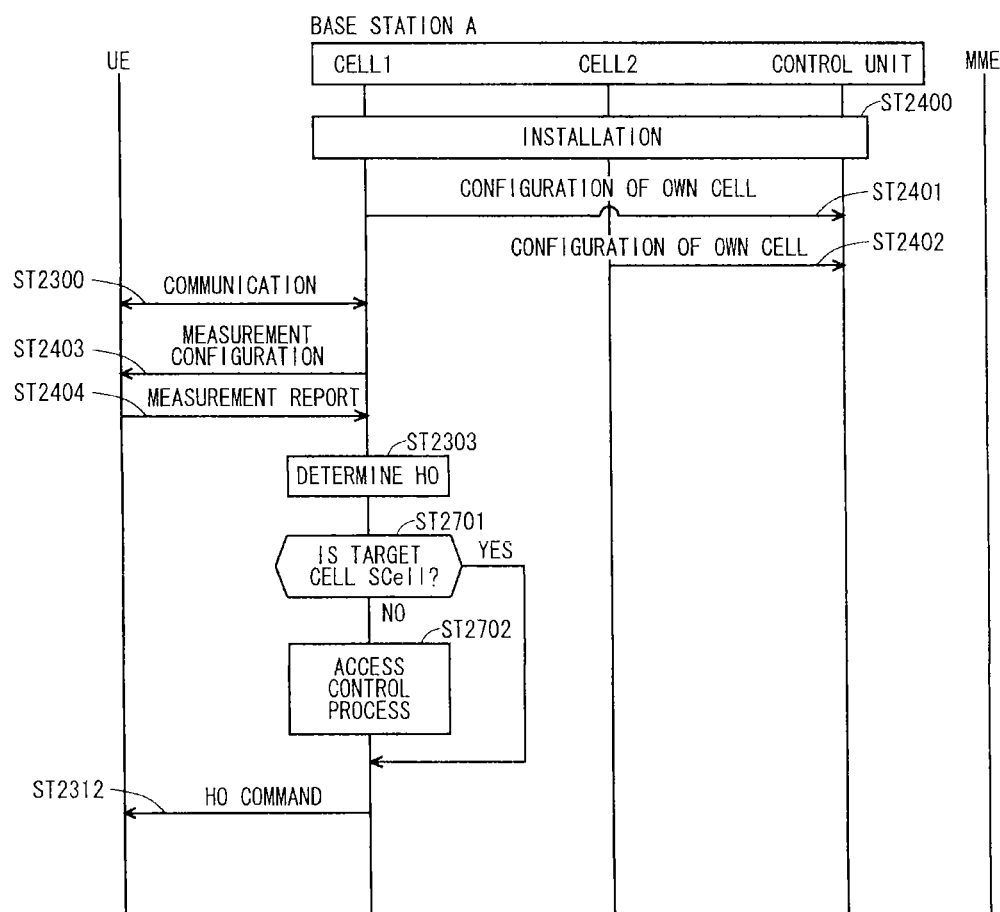
FIG. 27 is a diagram showing an example of a sequence of a communication system in a third modification of the eighth embodiment.

Next, a specific example of a sequence of a communication system in the third modification of the eighth embodiment is described with reference to FIG. 27. FIG. 27 is a diagram showing an example of the sequence of the communication system in the third modification of the eighth embodiment. The processes of Steps ST1401 to ST1416 of FIG. 14 described above in the present modification are similar to those of the second embodiment, which are not illustrated and described here. The sequence shown in FIG. 27 is similar to the sequences shown in FIGS. 23 and 24, where the same steps are denoted by the same step numbers and common description is not given here.

This operation example describes a case in which a base station A providing a plurality of cells (CCs) including a cell1 and a cell2 is present, where the UE selects the cell1 of the base station A as the best cell and camps on the cell1 to start communication, and thereafter, the cell2 is configured as a CC being a PCell change destination. A case in which access controlled has been performed on a target CC is disclosed as a specific example of the conditions under which access control is omitted in PCell change. A case in which a target CC is selected from SCells is disclosed as a specific example in which access control has been performed.

After the processes of Steps ST2400 to ST2402 are performed, the processes of Steps ST1401 to ST1416 shown in FIG. 14 described above are performed, and then, the processes of Steps ST2300, ST2403, and ST2404 are performed. Then, in Step ST2701, the cell judges whether or not the target CC determined in Step ST2303 is included in the SCells. In a case of judging that the target CC determined in Step ST2303 is included in the SCells in Step ST2701, the cell moves to Step ST2312. In a case of judging that the target CC determined in Step ST2303 is not included in the SCells in Step ST2701, the cell moves to Step ST2702.

In Step ST2702, the cell performs access control in PCell change. The following four (1) to (4) are disclosed as specific examples of access control.

(1) Access control in PCell change that is disclosed in the eighth embodiment is performed. Specific examples thereof include the processes of Steps ST2405 to ST2311 shown in FIG. 24 described above.

(2) Access control in PCell change that is disclosed in the first modification of the eighth embodiment is performed. Specific examples thereof include the processes of Steps ST2405 to ST2502 shown in FIG. 25 described above.

(3) Access control in PCell change that is disclosed in the second modification of the eighth embodiment is performed. Specific examples thereof include the processes of Steps ST2602 to ST2607 shown in FIG. 26 described above.

(4) Combination of (1) to (3) above.

The third modification of the eighth embodiment above can achieve the following effects in addition to the effects of the eighth embodiment and the second modification of the eighth embodiment. Control steps are omitted in the present modification, which enables to prevent control delays in a communication system. In addition, a processing load of the base station can be reduced. Further, consumption power of the base station can be reduced.

While the present modification has mainly described a case in which handover is used in PCell change, the present modification is also applicable to a case in which a reconfiguration is used in PCell change.

The present modification can be used in combination with the first embodiment, second embodiment, first modification of the second embodiment, third embodiment, fourth embodiment, fifth embodiment, first modification of the fifth embodiment, sixth embodiment, seventh embodiment, eighth embodiment, and first modification of the eighth embodiment described above.

As to the LTE-A, carrier aggregation between the eNB and RRH or between the eNB and repeater is studied (see Non-Patent Document 1). Non-Patent Document 1 does not describe the relationship between the eNB and RRH or the relationship between the CSG to which the eNB and repeater belong and the CSG to which the user equipment belongs. As a result, the operation of a communication system is not determined uniquely, leading to a problem that services cannot be provided appropriately.

To tackle this problem, all the embodiments including the modifications are applicable assuming that the cell (CC) in the present invention is a CC provided by an eNB, a CC included in an RRH, or a CC provided by a repeater. Accordingly, the operation as a communication system can be stabilized while improving a data rate using carrier aggregation between the eNB and RRH or between the eNB and repeater, which enables to appropriately provided services.

As to the LTE-A, coordinated multiple point transmission and reception (CoMP) is studied (see Non-Patent Documents 6 and 7). The CoMP studied relates to the technique of improving the coverage of high data rates, improving a cell-edge throughput, and increasing a system throughput through transmission or reception coordinated among multiple geographically separated points. The types of CoMP are classified into downlink CoMP (DL CoMP) and uplink CoMP (UL CoMP).

The base stations (NB, eNB, HNB, HeNB), remote radio unit (RRU), remote radio equipment (RRE), remote radio head (RRH), relay, and the like are studied as specific examples of the multiple points, transmission points, or reception points. The unit (cell) that performs coordinated multiple point transmission is referred to as a multi-point unit (multi-point cell), coordinated multiple point transmission and reception cooperation set (CoMP cooperation set), or coordinated multiple point transmission and reception transmission point(s) (CoMP transmission point(s)).

Non-Patent Documents 6 and 7 do not describe the relationship between the CSG to which the multiple points belong and the CSG to which the user equipment belongs in the coordinated multiple point transmission and reception cooperation set. Accordingly, the operation of a communication system cannot be determined uniquely, leading to a problem that services cannot be provided appropriately.

To tackle this problem, all the embodiments including the modifications are applicable assuming that the cell (CC) in the present invention is a transmission point or reception point in CoMP. Accordingly, services can be provided appropriately while improving the coverage of high data rates, improving a cell-edge throughput, and increasing a system throughput using the coordinated multiple point transmission and reception.

While the LTE-advanced system has been mainly described in the respective embodiments above, the communication system of the present invention is also applicable to other communication systems.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS 71 user equipment device (UE), 72 base station device, 72-1 eNB, 72-2 Home-eNB, 73 MME/S-GW unit (MME unit), 74 HeNBGW, CC component carrier, DL downlink, UL uplink.

The invention claimed is:

1. A communication system comprising:
a communication terminal device; and
a plurality of cells configured to perform radio communication with the communication terminal device, wherein
the plurality of cells include a cell for specific subscribers that specifies a connectable communication terminal device,
on a condition that a connection is established between the communication terminal device and a primary cell that is one of the plurality of cells, the communication terminal device judges whether or not access to a candidate cell that is a candidate for a secondary cell to perform radio communication in parallel with the primary cell is allowed, and notifies the primary cell of a judgment result, and
the primary cell configures the candidate cell as the secondary cell when the judgment result of the communication terminal device indicates that the communication terminal device is allowed access to the candidate cell.

2. The communication system according to claim 1, wherein
the candidate cell notifies the communication terminal device of specific subscribers information that is information regarding the specific subscribers of the candidate cell, on the condition that the connection is established between the communication terminal device and the primary cell that is one of the plurality of cells, and
the communication terminal device judges whether or not access to the candidate cell is allowed based on the specific subscribers information notified from the candidate cell.

3. A communication terminal device in a communication system comprising:
the communication terminal device; and
a plurality of cells configured to perform radio communication with the communication terminal device, wherein
the plurality of cells include a cell for specific subscribers that specifies a connectable communication terminal device, and
on a condition that a connection is established between the communication terminal device and a primary cell that is one of the plurality of cells, the communication terminal device judges whether or not access to a candidate cell that is a candidate for a secondary cell to perform radio communication in parallel with the primary cell is allowed, and notifies the primary cell of a judgment result.

4. A primary cell in a communication system comprising:
a communication terminal device; and
a plurality of cells configured to perform radio communication with the communication terminal device, wherein
the plurality of cells include a cell for specific subscribers that specifies a connectable communication terminal device,
on a condition that a connection is established between the communication terminal device and a primary cell that is one of the plurality of cells, the communication terminal device judges whether or not access to a candidate cell that is a candidate for a secondary cell to perform radio communication in parallel with the primary cell is allowed, and notifies the primary cell of a judgment result, and
the primary cell configures the candidate cell as the secondary cell when the judgment result of the communication terminal device indicates that the communication terminal device is allowed access to the candidate cell.

* * * * *